US012517874B2

(12) United States Patent
Pathak et al.

(10) Patent No.: US 12,517,874 B2
(45) Date of Patent: Jan. 6, 2026

(54) DATA ANALYTICS SYSTEMS FOR FILE SYSTEMS INCLUDING TIERING

(71) Applicant: Nutanix, Inc., San Jose, CA (US)

(72) Inventors: Bhushan Pathak, Pune (IN); Deepak Tripathi, San Jose, CA (US); Manoj Premanand Naik, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/478,790

(22) Filed: Sep. 29, 2023

(65) Prior Publication Data

US 2024/0111733 A1 Apr. 4, 2024

(30) Foreign Application Priority Data

Sep. 30, 2022 (IN) ............................ 202211056304

(51) Int. Cl.

*G06F 16/00* (2019.01)
*G06F 16/11* (2019.01)
*G06F 16/13* (2019.01)
*G06F 16/185* (2019.01)
*G06F 16/188* (2019.01)

(52) U.S. Cl.

CPC .......... *G06F 16/185* (2019.01); *G06F 16/119* (2019.01); *G06F 16/128* (2019.01); *G06F 16/13* (2019.01); *G06F 16/188* (2019.01)

(58) Field of Classification Search

CPC ...... G06F 16/185; G06F 16/188; G06F 16/13; G06F 16/119; G06F 16/128
USPC .......................................................... 707/740
See application file for complete search history.

(56) References Cited

U.S. PATENT DOCUMENTS

| | | | |
|---|---|---|---|
| 5,276,867 | A | 1/1994 | Kenley et al. |
| 5,615,363 | A | 3/1997 | Jenness |
| 5,664,144 | A | 9/1997 | Yanai et al. |
| 5,870,555 | A | 2/1999 | Pruett et al. |
| 5,873,085 | A | 2/1999 | Enoki et al. |
| 5,924,096 | A | 7/1999 | Draper et al. |
| 6,055,543 | A | 4/2000 | Christensen et al. |

(Continued)

FOREIGN PATENT DOCUMENTS

| | | | |
|---|---|---|---|
| CN | 105100210 | A | 11/2015 |
| CN | 108090118 | A | 5/2018 |

(Continued)

OTHER PUBLICATIONS

US 11,048,595 B2, 06/2021, Venkatesh et al. (withdrawn)

(Continued)

*Primary Examiner* — Chelcie L Daye
(74) *Attorney, Agent, or Firm* — Stoel Rives LLP

(57) ABSTRACT

Data analytics systems are described herein which may provide requests for file tiering to one or more file servers. The data analytics systems may receive metadata and/or event data from one or more file servers and may utilize the metadata and/or event data to select files for tiering. In some examples, files may be selected using a sliding window methodology. In some examples, files may be selected in part based on user behavior with the files in the file system. In some examples, file analytics systems may send requests to retry tiering operations which failed. The retry requests may be sent in a manner that is based on the error which caused the failure.

33 Claims, 9 Drawing Sheets

(56) References Cited

U.S. PATENT DOCUMENTS

| | | | |
|---|---|---|---|
| 6,085,234 | A | 7/2000 | Pitts et al. |
| 6,101,508 | A | 8/2000 | Wolff |
| 6,212,531 | B1 | 4/2001 | Blea et al. |
| 6,289,356 | B1 | 9/2001 | Hitz et al. |
| 6,341,340 | B1 | 1/2002 | Tsukerman et al. |
| 6,442,602 | B1 | 8/2002 | Choudhry |
| 6,539,381 | B1 | 3/2003 | Prasad et al. |
| 6,539,382 | B1 | 3/2003 | Byrne et al. |
| 6,963,914 | B1 | 11/2005 | Breitbart et al. |
| 6,968,345 | B1 | 11/2005 | Muhlestein |
| 7,120,631 | B1 | 10/2006 | Vahalia et al. |
| 7,146,524 | B2 | 12/2006 | Patel et al. |
| 7,159,056 | B2 | 1/2007 | Goldick |
| 7,162,467 | B2 | 1/2007 | Eshleman et al. |
| 7,356,679 | B1 | 4/2008 | Le et al. |
| 7,366,738 | B2 | 4/2008 | Yorke et al. |
| 7,409,511 | B2 | 8/2008 | Edwards et al. |
| 7,506,213 | B1 | 3/2009 | Cabrera, III et al. |
| 7,548,939 | B2 | 6/2009 | Kalach et al. |
| 7,606,868 | B1 | 10/2009 | Le et al. |
| 7,702,843 | B1 | 4/2010 | Chen et al. |
| 7,725,671 | B2 | 5/2010 | Prahlad et al. |
| 7,739,316 | B2 | 6/2010 | Thompson et al. |
| 7,752,492 | B1 | 7/2010 | Armangau et al. |
| 7,752,669 | B2 | 7/2010 | Palliyil et al. |
| 7,774,391 | B1 | 8/2010 | Le et al. |
| 7,805,469 | B1 | 9/2010 | Nagaralu et al. |
| 7,805,511 | B1 | 9/2010 | Panicker et al. |
| 7,840,533 | B2 | 11/2010 | Prahlad et al. |
| 7,890,529 | B1 | 2/2011 | Srinivasan et al. |
| 7,937,453 | B1 | 5/2011 | Hayden et al. |
| 8,095,810 | B2 | 1/2012 | Matsuzawa et al. |
| 8,095,931 | B1 | 1/2012 | Chen et al. |
| 8,261,268 | B1 | 9/2012 | Forgette |
| 8,352,482 | B2 | 1/2013 | Hansen |
| 8,352,608 | B1 | 1/2013 | Keagy et al. |
| 8,365,167 | B2 | 1/2013 | Beaty et al. |
| 8,396,890 | B2 | 3/2013 | Lim |
| 8,407,448 | B1 | 3/2013 | Hayden et al. |
| 8,447,728 | B2 | 5/2013 | Prahlad et al. |
| 8,463,617 | B2 | 6/2013 | Ranous et al. |
| 8,473,462 | B1 | 6/2013 | Banerjee |
| 8,484,163 | B1 | 7/2013 | Yucel et al. |
| 8,484,356 | B1 | 7/2013 | Douglis et al. |
| 8,510,836 | B1 | 8/2013 | Nachenberg |
| 8,539,076 | B2 | 9/2013 | Nakano et al. |
| 8,543,790 | B2 | 9/2013 | Chen et al. |
| 8,549,518 | B1 | 10/2013 | Aron et al. |
| 8,549,650 | B2 | 10/2013 | Hanson |
| 8,584,239 | B2 | 11/2013 | Aziz et al. |
| 8,601,473 | B1 | 12/2013 | Aron et al. |
| 8,635,351 | B2 | 1/2014 | Astete et al. |
| 8,676,958 | B1 | 3/2014 | Hendon et al. |
| 8,688,660 | B1 | 4/2014 | Sivasubramanian et al. |
| 8,706,692 | B1 | 4/2014 | Luthra et al. |
| 8,725,679 | B2 | 5/2014 | Nair et al. |
| 8,751,515 | B1 | 6/2014 | Xing et al. |
| 8,762,335 | B2 | 6/2014 | Prahlad et al. |
| 8,805,951 | B1 | 8/2014 | Faibish et al. |
| 8,825,848 | B1 | 9/2014 | Dotan et al. |
| 8,838,923 | B2 | 9/2014 | Prahlad et al. |
| 8,843,459 | B1 | 9/2014 | Aston et al. |
| 8,843,997 | B1 | 9/2014 | Hare |
| 8,850,130 | B1 | 9/2014 | Aron et al. |
| 8,863,124 | B1 | 10/2014 | Aron |
| 8,898,668 | B1 | 11/2014 | Costea et al. |
| 8,914,429 | B2 | 12/2014 | Pitts |
| 8,935,563 | B1 | 1/2015 | Rajaa et al. |
| 8,949,557 | B2 | 2/2015 | Kamei et al. |
| 8,966,188 | B1 | 2/2015 | Bardale |
| 8,972,637 | B1 | 3/2015 | Hushon et al. |
| 8,983,952 | B1 | 3/2015 | Zhang et al. |
| 8,984,027 | B1 | 3/2015 | Patwardhan et al. |
| 8,996,783 | B2 | 3/2015 | Huang et al. |
| 9,009,106 | B1 | 4/2015 | Aron et al. |
| 9,043,567 | B1 | 5/2015 | Modukuri et al. |
| 9,069,708 | B2 | 6/2015 | Gill et al. |
| 9,152,628 | B1 | 10/2015 | Stacey et al. |
| 9,154,535 | B1 | 10/2015 | Harris |
| 9,201,698 | B2 | 12/2015 | Ashok et al. |
| 9,201,704 | B2 | 12/2015 | Chang et al. |
| 9,201,887 | B1 | 12/2015 | Earl et al. |
| 9,213,513 | B2 | 12/2015 | Hartz et al. |
| 9,244,674 | B2 | 1/2016 | Waterman et al. |
| 9,244,969 | B1 | 1/2016 | Love et al. |
| 9,256,475 | B1 | 2/2016 | Aron et al. |
| 9,256,612 | B1 | 2/2016 | Bhatt et al. |
| 9,262,449 | B2 | 2/2016 | Amarendran et al. |
| 9,268,586 | B2 | 2/2016 | Voccio et al. |
| 9,274,817 | B1 | 3/2016 | Fan et al. |
| 9,286,298 | B1 | 3/2016 | Gillett |
| 9,292,327 | B1 | 3/2016 | Von Thenen et al. |
| 9,311,327 | B1 | 4/2016 | Xing |
| 9,336,132 | B1 | 5/2016 | Aron et al. |
| 9,336,232 | B1 | 5/2016 | Srivastav et al. |
| 9,348,702 | B2 | 5/2016 | Hsu et al. |
| 9,372,710 | B2 | 6/2016 | Kenchammana-Hosekote et al. |
| 9,405,566 | B2 | 8/2016 | Chawla et al. |
| 9,411,628 | B2 | 8/2016 | Bezbaruah et al. |
| 9,430,255 | B1 | 8/2016 | Beda et al. |
| 9,442,952 | B2 | 9/2016 | Preslan et al. |
| 9,448,887 | B1 | 9/2016 | Dayan et al. |
| 9,456,049 | B2 | 9/2016 | Soundararajan et al. |
| 9,497,257 | B1 | 11/2016 | Love et al. |
| 9,503,542 | B1 | 11/2016 | Wang et al. |
| 9,513,946 | B2 | 12/2016 | Sevigny et al. |
| 9,535,907 | B1 | 1/2017 | Stringham |
| 9,563,555 | B2 | 2/2017 | Flynn et al. |
| 9,571,561 | B2 | 2/2017 | Jang |
| 9,588,977 | B1 * | 3/2017 | Wang ...................... G06F 16/13 |
| 9,619,257 | B1 | 4/2017 | Aron et al. |
| 9,639,428 | B1 | 5/2017 | Boda et al. |
| 9,652,265 | B1 | 5/2017 | Narayanasamy et al. |
| 9,658,899 | B2 | 5/2017 | Jenkins |
| 9,690,670 | B1 | 6/2017 | Paulzagade et al. |
| 9,733,958 | B2 | 8/2017 | Cui et al. |
| 9,740,436 | B2 | 8/2017 | Fiebrich-Kandler et al. |
| 9,740,472 | B1 | 8/2017 | Sohi et al. |
| 9,740,723 | B2 | 8/2017 | Prahlad et al. |
| 9,747,287 | B1 | 8/2017 | Bhardwaj et al. |
| 9,762,460 | B2 | 9/2017 | Pawlowski et al. |
| 9,766,912 | B1 | 9/2017 | Jorgensen |
| 9,772,866 | B1 | 9/2017 | Aron et al. |
| 9,798,573 | B1 | 10/2017 | Koshy |
| 9,838,415 | B2 | 12/2017 | Powers et al. |
| 9,846,701 | B2 | 12/2017 | Faitelson et al. |
| 9,846,706 | B1 | 12/2017 | Basov et al. |
| 9,853,978 | B2 | 12/2017 | Tellvik et al. |
| 9,870,291 | B2 | 1/2018 | Bezbaruah et al. |
| 9,870,370 | B2 | 1/2018 | Faitelson et al. |
| 9,904,724 | B1 | 2/2018 | Chaulk et al. |
| 9,940,154 | B2 | 4/2018 | Ramani et al. |
| 9,946,573 | B2 | 4/2018 | Mcdermott |
| 10,009,215 | B1 | 6/2018 | Shorey |
| 10,050,862 | B2 | 8/2018 | Nambiar et al. |
| 10,083,022 | B2 | 9/2018 | Fukui et al. |
| 10,084,873 | B2 | 9/2018 | Dornemann |
| 10,095,506 | B2 | 10/2018 | Venkatesh et al. |
| 10,101,989 | B2 | 10/2018 | Sinha et al. |
| 10,114,706 | B1 | 10/2018 | Chougala et al. |
| 10,127,059 | B2 | 11/2018 | Astete et al. |
| 10,133,619 | B1 | 11/2018 | Nagpal et al. |
| 10,140,115 | B2 | 11/2018 | Fukui et al. |
| 10,152,233 | B2 | 12/2018 | Xu et al. |
| 10,152,606 | B2 | 12/2018 | Faitelson et al. |
| 10,210,048 | B2 | 2/2019 | Sancheti |
| 10,248,657 | B2 | 4/2019 | Prahlad et al. |
| 10,311,153 | B2 | 6/2019 | Mason, Jr. et al. |
| 10,318,743 | B2 | 6/2019 | Sinha et al. |
| 10,394,547 | B2 | 8/2019 | Fukui et al. |
| 10,419,426 | B2 | 9/2019 | Bakshan et al. |
| 10,452,853 | B2 | 10/2019 | Grafi |
| 10,516,688 | B2 | 12/2019 | Tamir et al. |
| 10,521,116 | B2 | 12/2019 | Parthasarathy |

(56) References Cited

U.S. PATENT DOCUMENTS 10,523,592 B2 12/2019 Byers et al.
10,530,742 B2 1/2020 Shah et al.
10,536,482 B2 1/2020 Gabaev et al.
10,540,164 B2 1/2020 Bafna et al.
10,540,165 B2 1/2020 Bafna et al.
10,540,166 B2 1/2020 Arikatla et al.
RE47,896 E 3/2020 Liberman Ben-ami et al.
10,594,582 B2 3/2020 Joshi et al.
10,594,730 B1 3/2020 Summers et al.
10,628,587 B2 4/2020 Stepanek et al.
10,635,558 B2 4/2020 Wu et al.
10,719,305 B2 7/2020 Sinha et al.
10,719,306 B2 7/2020 Deshmukh et al.
10,719,307 B2 7/2020 Kanada et al.
10,728,090 B2 7/2020 Deshmukh et al.
10,762,060 B1 9/2020 Faulkner et al.
10,809,998 B2 10/2020 Venkatesh et al.
10,817,203 B1 10/2020 Anand et al.
10,824,455 B2 11/2020 Arikatla et al.
10,831,465 B2 11/2020 Sharpe et al.
10,838,708 B2 11/2020 Sinha et al.
10,853,486 B2 12/2020 Faitelson et al.
10,855,631 B2 12/2020 Faitelson et al.
10,938,854 B2 3/2021 Strogov et al.
10,949,192 B2 3/2021 Venkatesh et al.
10,949,385 B2 3/2021 Cronan
11,036,690 B2 6/2021 Bhagwat et al.
11,057,422 B2 7/2021 Ranum et al.
11,086,826 B2 8/2021 Thummala et al.
11,106,447 B2 8/2021 Gupta et al.
11,275,755 B2 3/2022 Palus et al.
11,327,844 B1 5/2022 Aquino et al.
11,334,533 B2 5/2022 Kumar et al.
11,341,236 B2 5/2022 Miller et al.
11,347,843 B2 5/2022 Suwad et al.
11,360,860 B2 6/2022 Khandkar et al.
11,372,729 B2 6/2022 Pandey et al.
11,455,290 B1 9/2022 Brahmadesam et al.
11,516,251 B2 11/2022 Zurko et al.
11,537,713 B2 12/2022 Rajasekharan et al.
11,632,394 B1 4/2023 Rodriguez et al.
11,698,965 B2 7/2023 Constantinescu et al.
11,755,736 B1 9/2023 Vasudeva et al.
11,829,607 B2 11/2023 Patnaik et al.
11,934,670 B2 3/2024 Subramanian et al.
11,977,532 B2 5/2024 Liang et al.
12,182,364 B2 12/2024 Parker et al.
12,197,398 B2 1/2025 Tripathi et al.
12,367,108 B2 7/2025 Kotwal et al.
2002/0065835 A1 5/2002 Fujisaki
2002/0069196 A1 6/2002 Betros et al.
2002/0120763 A1 8/2002 Miloushev et al.
2003/0014442 A1 1/2003 Shiigi et al.
2003/0115218 A1 6/2003 Bobbitt et al.
2003/0163597 A1 8/2003 Hellman et al.
2003/0182301 A1 9/2003 Patterson et al.
2003/0195942 A1 10/2003 Muhlestein et al.
2004/0030822 A1 2/2004 Rajan et al.
2004/0054777 A1 3/2004 Ackaouy et al.
2004/0078440 A1 4/2004 Potter et al.
2004/0103104 A1 5/2004 Hara et al.
2004/0181425 A1 9/2004 Schwerin-wenzel et al.
2004/0199734 A1 10/2004 Rajamani et al.
2004/0210591 A1 10/2004 Hirschfeld et al.
2004/0225742 A1 11/2004 Loaiza et al.
2004/0267832 A1 12/2004 Wong et al.
2005/0022122 A1 1/2005 Barrus et al.
2005/0044197 A1 2/2005 Lai
2005/0120160 A1 6/2005 Plouffe et al.
2005/0120180 A1 6/2005 Schornbach et al.
2005/0125503 A1 6/2005 Iyengar et al.
2005/0172078 A1 8/2005 Wu et al.
2005/0193043 A1 9/2005 Hoover
2005/0193221 A1 9/2005 Yoneyama
2005/0193245 A1 9/2005 Hayden et al.
2005/0226059 A1 10/2005 Kavuri et al.
2005/0228798 A1 10/2005 Shepard et al.
2005/0267941 A1 12/2005 Addante et al.
2006/0010227 A1 1/2006 Atluri
2006/0047685 A1 3/2006 Dearing et al.
2006/0053139 A1 3/2006 Marzinski et al.
2006/0080445 A1 4/2006 Chang et al.
2006/0167921 A1 7/2006 Grebus et al.
2006/0206536 A1 9/2006 Sawdon et al.
2006/0206901 A1 9/2006 Chan
2006/0224918 A1 10/2006 Koike
2006/0225065 A1 10/2006 Chandhok et al.
2006/0235850 A1 10/2006 Hazelwood et al.
2006/0271510 A1 11/2006 Harward et al.
2006/0271931 A1 11/2006 Harris et al.
2007/0022129 A1 1/2007 Bahar et al.
2007/0038913 A1 2/2007 Allen et al.
2007/0088669 A1 4/2007 Jaschek et al.
2007/0100905 A1 5/2007 Masters et al.
2007/0171921 A1 7/2007 Wookey et al.
2007/0179995 A1 8/2007 Prahlad et al.
2007/0180302 A1 8/2007 Allen et al.
2007/0185934 A1 8/2007 Cannon et al.
2007/0198550 A1 8/2007 Irving et al.
2007/0244899 A1 10/2007 Faitelson et al.
2007/0250930 A1 10/2007 Aziz et al.
2007/0276823 A1 11/2007 Borden et al.
2007/0300220 A1 12/2007 Seliger et al.
2008/0040388 A1 2/2008 Petri et al.
2008/0040483 A1 2/2008 Nakatani et al.
2008/0071997 A1 3/2008 Loaiza et al.
2008/0098194 A1 4/2008 Hashimoto et al.
2008/0104349 A1 5/2008 Maruyama et al.
2008/0104589 A1 5/2008 Mccrory et al.
2008/0133486 A1 6/2008 Fitzgerald et al.
2008/0134178 A1 6/2008 Fitzgerald et al.
2008/0189468 A1 8/2008 Schmidt et al.
2008/0201414 A1 8/2008 Amir et al.
2008/0201457 A1 8/2008 London
2008/0208909 A1 8/2008 Rowley
2008/0244222 A1 10/2008 Supalov et al.
2008/0256138 A1 10/2008 Sim-tang
2008/0270677 A1 10/2008 Kolakowski
2008/0282350 A1 11/2008 Khilnani et al.
2008/0320499 A1 12/2008 Suit
2008/0320583 A1 12/2008 Sharma et al.
2009/0006801 A1 1/2009 Shultz et al.
2009/0037430 A1 2/2009 Mukkamala et al.
2009/0100248 A1 4/2009 Kami
2009/0158082 A1 6/2009 Jain et al.
2009/0171971 A1 7/2009 Goddard et al.
2009/0193272 A1 7/2009 Matsuzawa et al.
2009/0216975 A1 8/2009 Halperin et al.
2009/0228889 A1 9/2009 Yoshida
2009/0248870 A1 10/2009 Kamei et al.
2009/0249470 A1 10/2009 Litvin et al.
2009/0254572 A1 10/2009 Redlich et al.
2009/0265780 A1 10/2009 Korkus et al.
2009/0271412 A1 10/2009 Lacapra et al.
2009/0287887 A1 11/2009 Matsuki et al.
2009/0288084 A1 11/2009 Astete et al.
2010/0023521 A1 1/2010 Arcese et al.
2010/0027552 A1 2/2010 Hill
2010/0030825 A1 2/2010 Matsuzawa et al.
2010/0070725 A1 3/2010 Prahlad et al.
2010/0082716 A1 4/2010 Agetsuma et al.
2010/0082774 A1 4/2010 Pitts
2010/0095289 A1 4/2010 Nguyen et al.
2010/0138921 A1 6/2010 Na et al.
2010/0161657 A1 6/2010 Cha et al.
2010/0162268 A1 6/2010 Thomas et al.
2010/0169392 A1 7/2010 Lev et al.
2010/0174745 A1 7/2010 Ryan et al.
2010/0214908 A1 8/2010 Ralev
2010/0241785 A1 9/2010 Chen et al.
2010/0250824 A1 9/2010 Belay
2010/0275205 A1 10/2010 Nakajima
2011/0010560 A1 1/2011 Etchegoyen
2011/0022694 A1 1/2011 Dalal et al.

(56) References Cited

U.S. PATENT DOCUMENTS

| | | | |
|---|---|---|---|
| 2011/0022695 | A1 | 1/2011 | Dalal et al. |
| 2011/0022812 | A1 | 1/2011 | Van et al. |
| 2011/0022883 | A1 | 1/2011 | Hansen |
| 2011/0047340 | A1 | 2/2011 | Olson et al. |
| 2011/0078318 | A1 | 3/2011 | Desai et al. |
| 2011/0119763 | A1 | 5/2011 | Wade et al. |
| 2011/0125835 | A1 | 5/2011 | Soltis |
| 2011/0137879 | A1 | 6/2011 | Dubey et al. |
| 2011/0161299 | A1 | 6/2011 | Prahlad et al. |
| 2011/0178831 | A1 | 7/2011 | Ravichandran |
| 2011/0179414 | A1 | 7/2011 | Goggin et al. |
| 2011/0184993 | A1 | 7/2011 | Chawla et al. |
| 2011/0185292 | A1 | 7/2011 | Chawla et al. |
| 2011/0196899 | A1 | 8/2011 | Hughes et al. |
| 2011/0225574 | A1 | 9/2011 | Khalidi et al. |
| 2011/0239213 | A1 | 9/2011 | Aswani et al. |
| 2011/0251992 | A1 | 10/2011 | Bethlehem et al. |
| 2011/0252208 | A1 | 10/2011 | Ali et al. |
| 2011/0255538 | A1 | 10/2011 | Srinivasan et al. |
| 2011/0265076 | A1 | 10/2011 | Thorat et al. |
| 2011/0271279 | A1 | 11/2011 | Pate |
| 2011/0276578 | A1 | 11/2011 | Allalouf et al. |
| 2011/0276963 | A1 | 11/2011 | Wu et al. |
| 2011/0283277 | A1 | 11/2011 | Castillo et al. |
| 2011/0289561 | A1 | 11/2011 | Ivanov et al. |
| 2011/0295806 | A1 | 12/2011 | Erofeev |
| 2011/0307729 | A1 | 12/2011 | Matsuzawa et al. |
| 2011/0320690 | A1 | 12/2011 | Petersen et al. |
| 2012/0005440 | A1 | 1/2012 | Nakao et al. |
| 2012/0011401 | A1 | 1/2012 | Ranganathan et al. |
| 2012/0017114 | A1 | 1/2012 | Timashev et al. |
| 2012/0023495 | A1 | 1/2012 | Machida |
| 2012/0030456 | A1 | 2/2012 | Wu et al. |
| 2012/0054546 | A1 | 3/2012 | Kampouris et al. |
| 2012/0054736 | A1 | 3/2012 | Arcese et al. |
| 2012/0081395 | A1 | 4/2012 | Adi et al. |
| 2012/0084381 | A1 | 4/2012 | Alladi et al. |
| 2012/0151484 | A1 | 6/2012 | Frank et al. |
| 2012/0166866 | A1 | 6/2012 | Rao et al. |
| 2012/0233463 | A1 | 9/2012 | Holt et al. |
| 2012/0254445 | A1 | 10/2012 | Kawamoto et al. |
| 2012/0254567 | A1 | 10/2012 | Umbehocker |
| 2012/0266162 | A1 | 10/2012 | Baron |
| 2012/0272237 | A1 | 10/2012 | Baron |
| 2012/0278473 | A1 | 11/2012 | Griffiths |
| 2012/0290630 | A1 | 11/2012 | Aizman et al. |
| 2012/0304247 | A1 | 11/2012 | Badger et al. |
| 2012/0310881 | A1 | 12/2012 | Shadmon |
| 2012/0310892 | A1 | 12/2012 | Dam et al. |
| 2012/0324183 | A1 | 12/2012 | Chiruvolu et al. |
| 2013/0006938 | A1 | 1/2013 | Prahlad et al. |
| 2013/0046740 | A1 | 2/2013 | Li et al. |
| 2013/0047160 | A1 | 2/2013 | Conover |
| 2013/0055018 | A1 | 2/2013 | Joshi et al. |
| 2013/0061110 | A1 | 3/2013 | Zvibel |
| 2013/0061167 | A1 | 3/2013 | Rhodes et al. |
| 2013/0066930 | A1 | 3/2013 | Kamei et al. |
| 2013/0117744 | A1 | 5/2013 | Klein et al. |
| 2013/0132674 | A1 | 5/2013 | Sundrani |
| 2013/0145222 | A1 | 6/2013 | Birdsall |
| 2013/0151888 | A1 | 6/2013 | Bhattiprolu et al. |
| 2013/0152085 | A1 | 6/2013 | D'Amore et al. |
| 2013/0185716 | A1 | 7/2013 | Mn et al. |
| 2013/0198738 | A1 | 8/2013 | Reddin et al. |
| 2013/0212345 | A1 | 8/2013 | Nakajima |
| 2013/0227379 | A1 | 8/2013 | Gupta et al. |
| 2013/0227552 | A1 | 8/2013 | Reddin et al. |
| 2013/0227566 | A1 | 8/2013 | Higuchi et al. |
| 2013/0232491 | A1 | 9/2013 | Radhakrishnan et al. |
| 2013/0246335 | A1 | 9/2013 | Ahuja et al. |
| 2013/0246705 | A1 | 9/2013 | Diare |
| 2013/0247036 | A1 | 9/2013 | Fujiwara |
| 2013/0262396 | A1 | 10/2013 | Kripalani et al. |
| 2013/0283267 | A1 | 10/2013 | Cooper et al. |
| 2013/0297869 | A1 | 11/2013 | Mills et al. |
| 2014/0006708 | A1 | 1/2014 | Huynh et al. |
| 2014/0025796 | A1 | 1/2014 | Mbhor et al. |
| 2014/0041044 | A1 | 2/2014 | Hymel et al. |
| 2014/0059392 | A1 | 2/2014 | Ren et al. |
| 2014/0089354 | A1 | 3/2014 | Gonsalves et al. |
| 2014/0095544 | A1 | 4/2014 | Eshel et al. |
| 2014/0095555 | A1 | 4/2014 | Kim et al. |
| 2014/0095816 | A1 | 4/2014 | Hsu et al. |
| 2014/0115182 | A1 | 4/2014 | Sabaa et al. |
| 2014/0123138 | A1 | 5/2014 | Lee et al. |
| 2014/0146055 | A1 | 5/2014 | Bala et al. |
| 2014/0149794 | A1 | 5/2014 | Shetty et al. |
| 2014/0149983 | A1 | 5/2014 | Bonilla et al. |
| 2014/0173199 | A1 | 6/2014 | Gupta et al. |
| 2014/0181116 | A1 | 6/2014 | Wang |
| 2014/0188808 | A1 | 7/2014 | Wolf et al. |
| 2014/0189429 | A1 | 7/2014 | Gill et al. |
| 2014/0189677 | A1 | 7/2014 | Curzi et al. |
| 2014/0189685 | A1 | 7/2014 | Kripalani |
| 2014/0189686 | A1 | 7/2014 | Masters et al. |
| 2014/0196038 | A1 | 7/2014 | Kottomtharayil et al. |
| 2014/0201177 | A1 | 7/2014 | Suryanarayan et al. |
| 2014/0201725 | A1 | 7/2014 | Tian et al. |
| 2014/0207824 | A1 | 7/2014 | Brandwine et al. |
| 2014/0230024 | A1 | 8/2014 | Uehara et al. |
| 2014/0237464 | A1 | 8/2014 | Waterman et al. |
| 2014/0250300 | A1 | 9/2014 | Runkis et al. |
| 2014/0279909 | A1 | 9/2014 | Sudarsanam et al. |
| 2014/0310710 | A1 | 10/2014 | Lubsey et al. |
| 2014/0337576 | A1 | 11/2014 | Burton et al. |
| 2014/0359612 | A1 | 12/2014 | D'Amato et al. |
| 2014/0372717 | A1 | 12/2014 | Ciu et al. |
| 2015/0006788 | A1 | 1/2015 | Liu et al. |
| 2015/0007172 | A1 | 1/2015 | Hudzia et al. |
| 2015/0007180 | A1 | 1/2015 | Sharp et al. |
| 2015/0026682 | A1 | 1/2015 | Singh et al. |
| 2015/0032690 | A1 | 1/2015 | Hoque et al. |
| 2015/0039735 | A1 | 2/2015 | Zeyliger et al. |
| 2015/0039837 | A1 | 2/2015 | Quan et al. |
| 2015/0081644 | A1 | 3/2015 | Pitts |
| 2015/0082432 | A1 | 3/2015 | Eaton et al. |
| 2015/0095788 | A1 | 4/2015 | Thiele et al. |
| 2015/0106802 | A1 | 4/2015 | Ivanov et al. |
| 2015/0124622 | A1 | 5/2015 | Kovvali et al. |
| 2015/0142745 | A1 | 5/2015 | Tekade et al. |
| 2015/0142747 | A1 | 5/2015 | Zou |
| 2015/0178019 | A1 | 6/2015 | Hegdal et al. |
| 2015/0205639 | A1 | 7/2015 | Matsumoto et al. |
| 2015/0207815 | A1 | 7/2015 | Cai et al. |
| 2015/0213032 | A1 | 7/2015 | Powell et al. |
| 2015/0220324 | A1 | 8/2015 | Arcese et al. |
| 2015/0229656 | A1 | 8/2015 | Shieh |
| 2015/0242291 | A1 | 8/2015 | Chang et al. |
| 2015/0278046 | A1 | 10/2015 | Zellermayer et al. |
| 2015/0293830 | A1 | 10/2015 | Bhide et al. |
| 2015/0293896 | A1 | 10/2015 | Runkis et al. |
| 2015/0301903 | A1 | 10/2015 | Mutha et al. |
| 2015/0324217 | A1 | 11/2015 | Shilmover et al. |
| 2015/0326531 | A1 | 11/2015 | Cui et al. |
| 2015/0331757 | A1 | 11/2015 | Durge et al. |
| 2015/0347440 | A1 | 12/2015 | Habouzit et al. |
| 2015/0347542 | A1 | 12/2015 | Sullivan et al. |
| 2015/0378761 | A1 | 12/2015 | Sevigny et al. |
| 2016/0055065 | A1 | 2/2016 | Haustein et al. |
| 2016/0063272 | A1 | 3/2016 | Sharma et al. |
| 2016/0070492 | A1 | 3/2016 | Cherubini et al. |
| 2016/0077988 | A1 | 3/2016 | Tipton et al. |
| 2016/0078068 | A1 | 3/2016 | Agrawal et al. |
| 2016/0085480 | A1 | 3/2016 | Chiu et al. |
| 2016/0085574 | A1 | 3/2016 | Dornemann et al. |
| 2016/0087861 | A1 | 3/2016 | Kuan et al. |
| 2016/0110214 | A1 | 4/2016 | Vincent et al. |
| 2016/0110267 | A1 | 4/2016 | Earl et al. |
| 2016/0124665 | A1 | 5/2016 | Jain et al. |
| 2016/0162371 | A1 | 6/2016 | Prabhu et al. |
| 2016/0171241 | A1 | 6/2016 | Yun |
| 2016/0179416 | A1 | 6/2016 | Mutha et al. |
| 2016/0179419 | A1 | 6/2016 | Yamaguchi et al. |
| 2016/0188232 | A1 | 6/2016 | Ramachandran et al. |

(56) References Cited

U.S. PATENT DOCUMENTS

| | | | |
|---|---|---|---|
| 2016/0188407 | A1 | 6/2016 | Bronnikov et al. |
| 2016/0202916 | A1 | 7/2016 | Cui et al. |
| 2016/0210204 | A1 | 7/2016 | Clark et al. |
| 2016/0216993 | A1 | 7/2016 | Beckwith et al. |
| 2016/0224363 | A1 | 8/2016 | Joy |
| 2016/0301766 | A1 | 10/2016 | Ionescu et al. |
| 2016/0321291 | A1 | 11/2016 | Malhotra et al. |
| 2016/0328226 | A1 | 11/2016 | Arya et al. |
| 2016/0335134 | A1 | 11/2016 | Gupta et al. |
| 2016/0357611 | A1 | 12/2016 | Sapuram et al. |
| 2016/0359697 | A1 | 12/2016 | Scheib et al. |
| 2016/0359887 | A1 | 12/2016 | Yadav et al. |
| 2016/0378528 | A1 | 12/2016 | Zamir |
| 2016/0378616 | A1 | 12/2016 | Wigmore et al. |
| 2017/0004131 | A1 | 1/2017 | Ben Dayan et al. |
| 2017/0005990 | A1 | 1/2017 | Birger et al. |
| 2017/0012904 | A1 | 1/2017 | Matzek et al. |
| 2017/0019457 | A1 | 1/2017 | Latha R et al. |
| 2017/0024152 | A1 | 1/2017 | Bhagi et al. |
| 2017/0024224 | A1 | 1/2017 | Bakke et al. |
| 2017/0034189 | A1 | 2/2017 | Powell |
| 2017/0039078 | A1 | 2/2017 | Chen et al. |
| 2017/0039218 | A1 | 2/2017 | Prahlad et al. |
| 2017/0048223 | A1 | 2/2017 | Anantha Padmanaban et al. |
| 2017/0063907 | A1 | 3/2017 | Muddu et al. |
| 2017/0068469 | A1 | 3/2017 | Shankar et al. |
| 2017/0075921 | A1 | 3/2017 | Benton et al. |
| 2017/0090776 | A1 | 3/2017 | Kowles |
| 2017/0091047 | A1 | 3/2017 | Bangalore et al. |
| 2017/0109184 | A1 | 4/2017 | Ramani et al. |
| 2017/0115909 | A1 | 4/2017 | Wade et al. |
| 2017/0116050 | A1 | 4/2017 | Thukkaram et al. |
| 2017/0116210 | A1 | 4/2017 | Park et al. |
| 2017/0142134 | A1 | 5/2017 | Gilbert |
| 2017/0147446 | A1 | 5/2017 | Zhang et al. |
| 2017/0160983 | A1 | 6/2017 | Fiske et al. |
| 2017/0177638 | A1 | 6/2017 | Bhosale et al. |
| 2017/0206074 | A1 | 7/2017 | Arcese et al. |
| 2017/0206207 | A1 | 7/2017 | Bondurant et al. |
| 2017/0208113 | A1 | 7/2017 | Douros et al. |
| 2017/0220661 | A1 | 8/2017 | Cao et al. |
| 2017/0223031 | A1 | 8/2017 | Gu et al. |
| 2017/0228300 | A1 | 8/2017 | Thomas et al. |
| 2017/0235507 | A1 | 8/2017 | Sinha et al. |
| 2017/0235562 | A1 | 8/2017 | Bafna et al. |
| 2017/0235563 | A1 | 8/2017 | Bafna et al. |
| 2017/0235589 | A1 | 8/2017 | Gopalapura Venkatesh et al. |
| 2017/0235590 | A1 | 8/2017 | Sinha et al. |
| 2017/0235591 | A1 | 8/2017 | Kanada et al. |
| 2017/0235653 | A1 | 8/2017 | Arikatla et al. |
| 2017/0235654 | A1 | 8/2017 | Deshmukh et al. |
| 2017/0235751 | A1 | 8/2017 | Gupta et al. |
| 2017/0235758 | A1 | 8/2017 | Gopalapura Venkatesh et al. |
| 2017/0235760 | A1 | 8/2017 | Sharpe et al. |
| 2017/0235761 | A1 | 8/2017 | Bafna et al. |
| 2017/0235762 | A1 | 8/2017 | Sharpe et al. |
| 2017/0235763 | A1 | 8/2017 | Ventatesh et al. |
| 2017/0235764 | A1 | 8/2017 | Sharpe et al. |
| 2017/0235950 | A1 | 8/2017 | Gopalapura Venkatesh et al. |
| 2017/0237529 | A1 | 8/2017 | Eriksson et al. |
| 2017/0242599 | A1 | 8/2017 | Patnaik et al. |
| 2017/0262346 | A1 | 9/2017 | Pradhan et al. |
| 2017/0277556 | A1 | 9/2017 | Ishii et al. |
| 2017/0277903 | A1 | 9/2017 | Christodorescu et al. |
| 2017/0279674 | A1 | 9/2017 | Zhu |
| 2017/0286228 | A1 | 10/2017 | Redko et al. |
| 2017/0286442 | A1 | 10/2017 | Xie et al. |
| 2017/0302589 | A1 | 10/2017 | Leafe et al. |
| 2017/0371724 | A1 | 12/2017 | Wagner et al. |
| 2018/0004509 | A1 | 1/2018 | Narasimhan et al. |
| 2018/0004656 | A1 | 1/2018 | Battaje et al. |
| 2018/0004766 | A1 | 1/2018 | Darling |
| 2018/0039649 | A1 | 2/2018 | Fine et al. |
| 2018/0062993 | A1 | 3/2018 | Wu et al. |
| 2018/0089224 | A1 | 3/2018 | Muthuswamy et al. |
| 2018/0089226 | A1 | 3/2018 | Ben Dayan et al. |
| 2018/0107674 | A1 | 4/2018 | Cantwell et al. |
| 2018/0121035 | A1 | 5/2018 | Filippi et al. |
| 2018/0129426 | A1 | 5/2018 | Aron et al. |
| 2018/0137014 | A1 | 5/2018 | Li et al. |
| 2018/0143845 | A1 | 5/2018 | Chawla et al. |
| 2018/0145960 | A1 | 5/2018 | Bakshan et al. |
| 2018/0157521 | A1 | 6/2018 | Arikatla et al. |
| 2018/0157522 | A1 | 6/2018 | Bafna et al. |
| 2018/0157561 | A1 | 6/2018 | Venkatesh et al. |
| 2018/0157677 | A1 | 6/2018 | Bafna et al. |
| 2018/0157752 | A1 | 6/2018 | Arikatla et al. |
| 2018/0157860 | A1 | 6/2018 | Nair et al. |
| 2018/0159729 | A1 | 6/2018 | Deshmukh et al. |
| 2018/0159826 | A1 | 6/2018 | Yisan et al. |
| 2018/0173731 | A1 | 6/2018 | Nazari et al. |
| 2018/0205787 | A1 | 7/2018 | Ben Dayan et al. |
| 2018/0253192 | A1 | 9/2018 | Varadharajan et al. |
| 2018/0276390 | A1 | 9/2018 | Grafi |
| 2018/0278602 | A1 | 9/2018 | Koushik et al. |
| 2018/0287902 | A1 | 10/2018 | Chitalia et al. |
| 2018/0330108 | A1 | 11/2018 | Gordon et al. |
| 2018/0332105 | A1 | 11/2018 | Huang et al. |
| 2018/0349703 | A1 | 12/2018 | Rathod |
| 2018/0357251 | A1 | 12/2018 | Kumarasamy et al. |
| 2018/0367557 | A1 | 12/2018 | Brown et al. |
| 2018/0373762 | A1 | 12/2018 | Faitelson et al. |
| 2019/0026101 | A1 | 1/2019 | Venkatesh et al. |
| 2019/0034240 | A1 | 1/2019 | Nabi et al. |
| 2019/0073265 | A1 | 3/2019 | Brennan et al. |
| 2019/0079747 | A1 | 3/2019 | Sinha et al. |
| 2019/0108340 | A1 | 4/2019 | Bedhapudi et al. |
| 2019/0129808 | A1 | 5/2019 | Acharya et al. |
| 2019/0171527 | A1 | 6/2019 | Mutalik et al. |
| 2019/0179711 | A1 | 6/2019 | Luo et al. |
| 2019/0182294 | A1 | 6/2019 | Rieke et al. |
| 2019/0196718 | A1 | 6/2019 | Pai et al. |
| 2019/0207925 | A1 | 7/2019 | Anantha Padmanaban et al. |
| 2019/0303571 | A1 | 10/2019 | Chelarescu et al. |
| 2019/0332683 | A1 | 10/2019 | Thummala et al. |
| 2019/0347418 | A1 | 11/2019 | Strogov et al. |
| 2019/0354513 | A1 | 11/2019 | Kumar et al. |
| 2019/0370227 | A1 | 12/2019 | Gupta et al. |
| 2019/0370360 | A1 | 12/2019 | Mainali et al. |
| 2019/0392053 | A1 | 12/2019 | Chalakov et al. |
| 2020/0007530 | A1 | 1/2020 | Mohamad Abdul et al. |
| 2020/0026612 | A1 | 1/2020 | Ben Dayan et al. |
| 2020/0034069 | A1 | 1/2020 | Batra et al. |
| 2020/0036647 | A1 | 1/2020 | Gupta et al. |
| 2020/0081704 | A1 | 3/2020 | Bafna et al. |
| 2020/0081733 | A1 | 3/2020 | Buck et al. |
| 2020/0125580 | A1 | 4/2020 | Shao |
| 2020/0137157 | A1 | 4/2020 | Joseph et al. |
| 2020/0174975 | A1 | 6/2020 | Shaw et al. |
| 2020/0218614 | A1 | 7/2020 | Adduri et al. |
| 2020/0241972 | A1 | 7/2020 | Dain et al. |
| 2020/0250306 | A1 | 8/2020 | Pendyala et al. |
| 2020/0272492 | A1 | 8/2020 | Guturi et al. |
| 2020/0274869 | A1 | 8/2020 | Tahenakos et al. |
| 2020/0301880 | A1 | 9/2020 | George et al. |
| 2020/0302081 | A1 | 9/2020 | Faitelson et al. |
| 2020/0358621 | A1 | 11/2020 | Ngo |
| 2020/0380000 | A1 | 12/2020 | Busjaeger et al. |
| 2020/0396286 | A1 | 12/2020 | Nallathambi et al. |
| 2021/0004353 | A1 | 1/2021 | Jain et al. |
| 2021/0044604 | A1 | 2/2021 | Annen et al. |
| 2021/0097181 | A1 | 4/2021 | Reid et al. |
| 2021/0141630 | A1 | 5/2021 | Sharpe et al. |
| 2021/0152581 | A1 | 5/2021 | Hen et al. |
| 2021/0160257 | A1 | 5/2021 | Elyashiv et al. |
| 2021/0165783 | A1 | 6/2021 | Deshpande et al. |
| 2021/0182392 | A1 | 6/2021 | Hargrove |
| 2021/0200641 | A1 | 7/2021 | Bafna et al. |
| 2021/0216234 | A1 | 7/2021 | Singler, Jr. et al. |
| 2021/0224233 | A1 | 7/2021 | Bafna et al. |
| 2021/0226998 | A1 | 7/2021 | Narayanaswamy et al. |
| 2021/0247973 | A1 | 8/2021 | Gupta et al. |
| 2021/0255926 | A1 | 8/2021 | Wang et al. |
| 2021/0266329 | A1 | 8/2021 | Fuhry et al. |

(56) References Cited

U.S. PATENT DOCUMENTS

| | | | |
|---|---|---|---|
| 2021/0279227 A1 | 9/2021 | Peercy et al. | |
| 2021/0303537 A1 | 9/2021 | Liang et al. | |
| 2021/0349859 A1 | 11/2021 | Bafna et al. | |
| 2021/0365257 A1 | 11/2021 | Venkatesh et al. | |
| 2021/0390080 A1 | 12/2021 | Tripathi et al. | |
| 2021/0397587 A1 | 12/2021 | Thummala et al. | |
| 2021/0406136 A1 | 12/2021 | Venkatesh et al. | |
| 2022/0004377 A1 | 1/2022 | Sharpe et al. | |
| 2022/0012134 A1 | 1/2022 | Chatterjee et al. | |
| 2022/0114006 A1 | 4/2022 | Raghavan et al. | |
| 2022/0131879 A1 | 4/2022 | Naik et al. | |
| 2022/0188719 A1 | 6/2022 | Ramaswamy et al. | |
| 2022/0197748 A1* | 6/2022 | Behera | G06F 11/1443 |
| 2022/0210093 A1 | 6/2022 | Kumar et al. | |
| 2022/0300335 A1 | 9/2022 | Venkatesh et al. | |
| 2022/0318099 A1 | 10/2022 | Kotwal et al. | |
| 2022/0318203 A1 | 10/2022 | Kotwal et al. | |
| 2022/0318204 A1 | 10/2022 | Sinha et al. | |
| 2022/0318208 A1 | 10/2022 | Tripathi et al. | |
| 2022/0342866 A1 | 10/2022 | Kotwal | |
| 2023/0039072 A1 | 2/2023 | Shomo et al. | |
| 2023/0142344 A1 | 5/2023 | Nakar | |
| 2023/0289443 A1 | 9/2023 | Sinha et al. | |
| 2023/0325353 A1 | 10/2023 | Gursha et al. | |
| 2024/0111716 A1 | 4/2024 | Gupta et al. | |
| 2024/0168923 A1 | 5/2024 | Sinha et al. | |
| 2024/0430274 A1 | 12/2024 | Sinha et al. | |

FOREIGN PATENT DOCUMENTS

| | | |
|---|---|---|
| CN | 110516005 A | 11/2019 |
| CN | 110519112 A | 11/2019 |
| CN | 110569269 A | 12/2019 |
| CN | 106663056 B | 2/2020 |
| CN | 111078653 A | 4/2020 |
| CN | 112883009 A | 6/2021 |
| CN | 114840487 A | 8/2022 |
| CN | 115314320 A | 11/2022 |
| CN | 115827556 A | 3/2023 |
| EP | 1039380 B1 | 9/2000 |
| EP | 1145496 B1 | 10/2001 |
| EP | 1189138 A2 | 3/2002 |
| EP | 1062581 B1 | 10/2003 |
| EP | 1214663 B1 | 6/2006 |
| EP | 1677188 A3 | 7/2006 |
| EP | 1979814 B1 | 10/2008 |
| EP | 2759942 A1 | 7/2014 |
| EP | 2179371 B1 | 4/2019 |
| KR | 102024142 B1 | 9/2019 |
| WO | 2010050944 A1 | 5/2010 |
| WO | 2012058482 A1 | 5/2012 |
| WO | 2012126177 A2 | 9/2012 |
| WO | 2016014035 A1 | 1/2016 |
| WO | 2016018446 A1 | 2/2016 |
| WO | 2017196974 A1 | 11/2017 |
| WO | 2017223265 A1 | 12/2017 |
| WO | 2018014650 A1 | 1/2018 |
| WO | 2019226365 A1 | 11/2019 |
| WO | 2020190669 A1 | 9/2020 |
| WO | 2021082157 A1 | 5/2021 |
| WO | 2021089196 A1 | 5/2021 |

OTHER PUBLICATIONS

Dell EMC Unity: Cloud Tiering Appliance (CTA), By: Kenneth Padilla; Published 2021 https://www.delltechnologies.com/asset/en-us/products/storage/industry-market/h16376-dell-emc-unity-cloud-tiering-appliance.pdf (Year: 2021).*

[Published a US-2024-0111716-A1] U.S. Appl. No. 18/183,883 titled "Data Analytics Systems for File Systems Including Examples of Path Generation" filed Mar. 13, 2023.

[Published as US 20180157860 A1 on Jun. 7, 2018] U.S. Appl. No. 15/829,602 entitled "Handling Permissions for Virtualized File Servers", filed Dec. 1, 2017.

[Published as US 20220004377 A1 on Jan. 6, 2022] U.S. Appl. No. 17/448,315 titled "Virtualized File Server" filed Sep. 21, 2021.

[Published as US-2021-0349859-A1] U.S. Appl. No. 17/238,001 titled "Cloning Virtualized File Servers" filed Apr. 22, 2021.

[Published as US-2021-0365257-A1] U.S. Appl. No. 17/169,137 titled "Virtualized File Server Data Sharing" filed Feb. 5, 2021.

[Published as US-2021-0397587-A1] U.S. Appl. No. 17/364,453 titled "Virtualized Server Systems and Methods Including Domain Joining Techniques" filed Jun. 30, 2021.

[Published as US-2021-0406136-A1] U.S. Appl. No. 17/302,343 titled "Disaster Recovery for Distributed File Servers, Including Metadata Fixers" filed Apr. 30, 2021.

[Published as US-2022-0318099-A1] U.S. Appl. No. 17/304,044 titled "File Analytics Systems and Methods Including Retrieving Metadata From Filesystem Snapshots" filed Jun. 14, 2021.

[Published as US-2022-0318203-A1] U.S. Appl. No. 17/304,086, titled "File Analytics Systems Including Examples Providing Metrics Adjusted Forapplication Operation" filed Jun. 14, 2021.

[Published as US-2022-0318204-A1] U.S. Appl. No. 17/304,096, titled File Analytics Systems and Methods: filed Jun. 14, 2021.

[Published as US-2022-0318208-A1] U.S. Appl. No. 17/304,055 titled "Virtualized File Servers and Methods to Persistently Store File System Eventdata" filed Jun. 14, 2021.

[Published as US-2022-0342866-A1] U.S. Appl. No. 17/304,062, titled "File Analytics Systems and Methods Including Receiving and Processing Filesystem Event Data in Order" filed Jun. 14, 2021.

[Published as US-2023-0289443-A1] U.S. Appl. No. 17/693,206 titled "Title of Invention: Malicious Activity Detection, Validation, and Remediation in Virtualized File Servers" filed Mar. 11, 2022.

[Published as US-2024-0430274-A1] U.S. Appl. No. 18/499,144 titled "Ransomware Detection and/or Remediation as a Service in File Server Systems" filed Oct. 31, 2023.

EP Office Action dated Dec. 5, 2023 for EP application 21204885.4.

Extended European Search Report dated Feb. 23, 2022 for EP Application 212048854.

U.S. Appl. No. 19/005,002 titled "Malicious Activity Detection, Validation, and Remediation in Virtualized Fileservers" filed Dec. 30, 2024.

Isilon OneFS, Version 8.0.1; Web Administration Guide, Oct. 2016.

[Published as U.S. Appl. No. 15/422,220 A1 on Aug. 17, 2017] U.S. Appl. No. 15/422,220, entitled " Virtualized File Server" filed Feb. 1, 2017, pp. all.

[Published as US 2018/0157521 on Jun. 7, 2018] U.S. Appl. No. 15/829,781, entitled Virtualized Server Systems and Methods Including Load.

Balancing for Virtualized File Servers, filed Dec. 1, 2017, pp. all.

[Published as US 2018/0157522 on Jun. 7, 2018] U.S. Appl. No. 15/833,391, entitled "Virtualized Server Systems and Methods Including Scaling of File System Virtual Machines", filed Dec. 6, 2017, pp. all.

[Published as US 2018/0157561 on Jun. 7, 2018] U.S. Appl. No. 15/832,310 entitled "Disaster Recovery for Distributed File Servers, Including Metadata Fixers", filed Dec. 5, 2017, pp. all.

[Published as US 2018/0157677 on Jun. 7, 2018] U.S. Appl. No. 15/833,255, entitled "Cloning Virtualized File Servers", filed Dec. 6, 2017, pp. all.

[Published as US20180159729 A1 on Jun. 7, 2018] U.S. Appl. No. 15/829,340, entitled "Configuring Network Segmentation for a Virtualization Environment", filed Dec. 1, 2017, pp. all.

[Published as US 2019/0026101 on Jan. 27, 2019] U.S. Appl. No. 16/140,250 titled "Virtualized File Server Data Sharing" filed Sep. 24, 2018, pp. all.

[Published as US 2019/0079747 on Mar. 14, 2019] U.S. Appl. No. 16/160,618 titled "Virtualized File Server Backup to Cloud" filed Oct. 15, 2018, pp. all.

[Published as US US 2018/0157752 on Jun. 7, 2018] U.S. Appl. No. 15/829,731, entitled "Transparent Referrals for Distributed File Servers", filed Dec. 1, 2017, pp. all.

(56) References Cited

OTHER PUBLICATIONS

[Published as US-2021-0390080-A1] U.S. Appl. No. 16/944,323 titled "Actions Based on File Tagging in a Distributed File Server Virtual Machine (FSVM) Environment", filed Jul. 31, 2020, pp. all.
[Published as US-2022-0300335-A1] U.S. Appl. No. 17/443,009, titled "Scope-Based Distributed Lock Infrastructure for Virtualized File Server" filed Jul. 19, 2021, pp. all.
Dell EMC; Dell EMC Isilon OneFS Operating System; Scale-out NAS to maximize the data capital and business value of your unstructured data, 2020, pp. all.
Dell EMC; White Paper; Dell EMC Isilon Onefs Operating System; Powering the Isilon Scale-Out Storage Platform, Dec. 2019, pp. all.
[Published as 2022-0131879 on Apr. 21, 2022] U.S. Appl. No. 17/452,144 titled "Malicious Activity Detection and Remediation in Virtualized File Servers" filed Oct. 25, 2021, unpublished application for P289651.US.02.
"#StopRansomware Guide", https://www.cisa.gov/stopransomware/ransomware-guide, Retrieved Dec. 15, 2023, p. 58.
"Administering VMware vSAN—VMware vSphere 7.0", Update 1; docs.vmware.com/en/VMware-vSphere/7.0/vsan-701-administration-guide.pdf, 2015-2020, pp. 1-114.
"Amazon EFS lifecycle management", https://docs.aws.amazon.com/efs/latest/ug/lifecycle-management-efs.html, 2022, pp. 1-5.
"Amazon S3 Object Lock", https://aws.amazon.com/s3/features/object-lock/, Retrieved Apr. 8, 2024, pp. 1-5.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.
"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.
"Cisco Ransomware Defense", https://www.cisco.com/c/dam/global/en_ca/assets/pdfs/at-a-glance-c45-737465.pdf., 2016, pp. 1-2.
"Citrix XenDesktop 7.1 on Microsoft Hyper-V Server 2012 R2 on Nutanix Virtual Computing Platform", Citrix APAC Solutions, Jun. 25, 2014, pp. 1-94.
"Clustered Data Ontap 8.2 File Access Management Guide for CIFS", NetApp; (year 2014), Feb. 2014, pp. all.
"Configure a lifecycle management policy", https://learn.microsoft.com/en-us/azure/storage/blobs/lifecycle-management-policy-configure?tabs=azure-portal#optionally-enable-access-time-tracking, Aug. 31, 2023, p. 6.
"Configuring Active Directory Lookup for UNIX GID and UID Information", O'Reily Media, Inc. https://learning.oreilly.com/library/view/windows-server-2012/9780133116007/ch09lev2sec6.html; 2012; captured Apr. 15, 2021, 2012, 1-2.
"Configuring the alert rules options", https://techdocs.broadcom.com/us/en/symantec-security-software/endpoint-security-and-management/endpoint-security/sescloud/Alerts-and-Events/alerts-overview-v119868301-d4161e1703/Configuring-alert-rule-options.html, Retreived Dec. 15, 2023, p. 3.
"CryptoSpike Demo: Ransomware protection for NetApp files", https://www.youtube.com/watch?v=jdh-ehkHDMQ [youtube.com], Sep. 13, 2019.
"Data Protection with Veritas NetBackup, Backup Exec, and Enterprise Vault", https://cloudian.com/veritas/, Retrieved Apr. 8, 2024, pp. 1-3.
"Defeating Ransomware with EventSentry & Auditing (Part 3/3)", https://www.eventsentry.com/blog/2016/03/defeating-ransomware-with-eventsentry-auditing.html, Retrieved Jan. 23, 2024, p. 16.
"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, p. 34.
"Detect ransomware attacks with DataSecurity Plus", https://www.manageengine.com/data-security/file-audit/ransomware-detection-tool.html, Retrieved Dec. 15, 2023, p. 9.
"Detecting a ransomware attack—Tech Preview", https://www.ibm.com/docs/en/storage-insights?topic=resources-detecting-ransomware-attack-tech-preview, Dec. 7, 2023, p. 2.
"EMC Isilon OneFS Operating System; Powering scale-out storage for the new world of Big Data in the enterprise", www.EMC.com, Feb. 2020, pp. all.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.
"File Time Stamp Preservation with Object Storage", https://www.ibm.com/docs/en/ahts/4.0?topic=scias-file-time-stamp-preservation-object-storage, Sep. 25, 2023, p. 2.
"File-Based Primary Storage Ransomware Protection", https://www.storagenewsletter.com/2023/09/11/file-based-primary-storage-ransomware-protection/, Aug. 23, 2023, p. 20.
"FileCloud Launches Industry's First Enterprise File Share and Sync Solution with Built-In Ransomware Protection", https://www.filecloud.com/blog/2016/09/filecloud-launches-industrys-first-enterprise-file-share-and-sync-solution-with-built-in-ransomware-protection/, Sep. 28, 2016, p. 6.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.
"High Availability and Data Protection With Dell Emc Isilon Scale-Out Nas", Dell: Dell Inc., Jul. 2018, pp. all.
"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.
"How to Troubleshoot the 'Autolocation' feature in Clustered Data ONTAP—Results", NetApp https://kb.netapp.com/app/results/kw/autolocation/, Sep. 19, 2019, pp. all.
"Hybrid Cloud Storage with Cloudian HyperStore and Amazon S3", Cloudian Inc.; www.cloudian.com, 2014, pp. all.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.
"Incident Response Playbook: Ransom Response for S3", https://github.com/aws-samples/aws-customer-playbook-framework/blob/main/docs/Ransom_Response_S3.md, 2021, p. 10.
"Lifecycle rules based on the last access time", https://www.alibabacloud.com/help/en/oss/user-guide/lifecycle-rules-based-on-the-last-access-time, Jan. 30, 2024, p. 1.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.
"Nutanix AFS—Introduction & Steps For Setting Up", Retrieved from https ://virtual building blocks. com/2 0 1 8/01 /03/nutanix-afs-introduction-steps-for-setting-up/ (Year: 2018), Jan. 3, 2018, 1-23.
"Nutanix Files Guide", Nutanix, Sep. 14, 2018, pp. all.
"Optimize costs by automatically managing the data lifecycle", https://learn.microsoft.com/en-us/azure/storage/blobs/lifecycle-management-overview, Oct. 26, 2023, p. 15.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, p. 238.
"Preparing Storage Systems for Snapmirror Replication", NetApp ; NetApp, Apr. 2005, pp. all.
"Protect Your Data With Netapp Element Software", Solution Brief; NetApp, 2018, pp. all.
"Ransomeware Protection for NetApp", https://www.catalogicsoftware.com/products/cryptospike/ [protect-us.mimecast.com], 2021, Oct. 25, 2021, pp. all.
"Ransomware Detection", https://rmm.datto.com/help/en/Content/3NEWUI/RansomwareDetection.htm, Retrieved Dec. 15, 2023, p. 3.
"Ransomware detection overview", https://help.dropbox.com/security/ransomware-detection, Oct. 11, 2023, p. 6.

(56) References Cited

OTHER PUBLICATIONS

"Ransomware Protection", https://forum.photostructure.com/t/ransomware-protection/428, Mar. 2021, p. 3.
"Ransomware protection solutions", https://www.ibm.com/in-en/ransomware, Retrieved Feb. 8, 2023, pp. 1-2.
"Ransomware Recovery", https://wasabi.com/ransomware-recovery/, Retrieved Dec. 16, 2023, p. 11.
"Security best practices for Amazon S3", https://docs.aws.amazon.com/AmazonS3/latest/userguide/security-best-practices.html, Retreived Apr. 8, 2024, pp. 1-6.
"Setting up and Using Acropolis File Services (AFS) On Nutanix AOS 5.0", Virtual Dennis—Sharing Technical Tips Learned the Hard Way, Dec. 30, 2016, pp. all.
"Small office server and UID translation", Unix & Linux, https://unix.stackexchange.com/questions/373747/small-office-server-and-uid-translation, Jul. 2017, 1-5.
"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.
"Technical Overview and Best Practices", VMware vSphere VMFS ; a VMware Technical White Paper updated for VMware vSphere 5.1, Version 3.0, Nov. 27, 2012, pp. all.
"The rise of ransomware", https://www.cisco.com/c/dam/en/us/solutions/collateral/enterprise-networks/ransomware-defense/at-a-glance-c45-737465.pdf, 2017, pp. 1-2.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"Using Amazon S3 server access logs to identify requests", https://docs.aws.amazon.com/AmazonS3/latest/userguide/using-s3-access-logs-to-identify-requests.html, Retrieved Feb. 9, 2024, p. 8.
"Utilize AI and be one step ahead", https://www.flowmon.com/en/solutions/security-operations/ransomware-detection, Retrieved Dec. 16, 2023, p. 7.
"Virtual Disk Manager User's Guide: Virtual Disk Development Kit", vmware.com; https://www.vmware.com/pdf/VirtualDiskManager.pdf, 2008, 1-12.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.
"VMware VSAN 7.0 Release Notes", VMware; https://docs.vmware.com/en/VMware-vSphere/7.0/rn/vmware-vsan-70-release-notes.html, Mar. 8, 2021, pp. 1-12.
"vSAN 7.0 U2 Proof of Concept Guide", VMwareStorage; https://images.core.vmware.com/sites/default/files/resource/vsan_70_u2_proof_of_concept_guide_noindex.pdf, Apr. 2021, pp. 1-267.
"vSAN File Services Tech Note | VMware", Aug. 2021, 1-7.
"vSAN Health Service—File Service—File Server Health (77165)", VMware, Knowledge Base; https://kb.vmware.com/s/article/77165, May 15, 2021, pp. 1-5.
"vSAN Monitoring and Troubleshooting—VMware vSphere 7.0", https://docs.vmware.com/, Sep. 2018, 1-61.
"vSAN Performance Graphs in the vSphere Web Client (2144493)", Nov. 9, 2020, 1-42.
"vSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"vSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.
"vSphere Availability—VMware vSphere 6.7", https://docs.vmware.com/, Jan. 11, 2019, 1-105.
"vSphere Storage—VMware vSphere 6.7", https://docs.vmware.com/, Jan. 4, 2021, 1-382.
"Working with object metadata", https://docs.aws.amazon.com/AmazonS3/latest/userguide/UsingMetadata.html, Retrieved Feb. 9, 2024, p. 2.
Bazalgette, Tim , "Robust identification of ransomware encryption over SMB", Darktrace | https://darktrace.com/research/robust-identification-of-ransomware-encryption-over-smb, Before Mar. 11, 2022, p. 4.
Berger, Victor , "Anomaly detection in user behavior of websites using Hierarchical Temporal Memories", KTH Royal Institute of Technology | School of Computer Science and Communication http://www.diva-portal.org/smash/get/diva2:1094877/FULLTEXT01.pdf, 2017, pp. 1-40.
Bhardwaj, Rishi , "The Wonderful World of Distributed Systems and the Art of Metadata Management", Nutanix, Inc., https://www.nutanix.com/blog/the-wonderful-world-of-distributed-systems-and-metadata-management; captured Aug. 19, 2021, Sep. 24, 2015, pp. 1-8.
Bigler, , "Nutanix File Analytics", Dready's Blog, https://dreadysblog.com/2019/04/12/nutanix-file-analytics/, Apr. 12, 2019, 1-12.
Birk, Ryan , "How it Works: Understanding vSAN Architecture Components", altaro.com, Feb. 28, 2018, 1-10.
Bounds, Jay , "High-Availability (HA) Pair Controller Configuration Overview and Best Practices", NetApp, Feb. 2016, pp. all.
Cano, Ignacio et al., "Curator: Self-Managing Storage for Enterprise Clusters", University of Washington, Mar. 2017, pp. all.
Cormac, , "Native File Services for vSAN 7", CormacHogan.com; https://cormachogan.com/2020/03/11/native-file-services-for-vsan-7/, Mar. 11, 2020, 1-23.
Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.
Delaney, , "5 Methods For Detecting Ransomware Activity", https://www.rapid7.com/blog/post/2016/05/16/methods-for-detecting-ransomware-activity/ [protect-us.mimecast.com], May 16, 2016,.
Derschmitz, , "Ransomware protection for files with NetApp and CryptoSpike", https://derschmitz.com/2020/01/24/ransomware-protection-for-files-with-netapp-and-cryptospike/ [protect-us.mimecast.com], Jan. 24, 2020.
Feroce, Danilo , "Leveraging VMware vSAN for Highly Available Management Clusters", VMware, Inc., Version 2.9, VMware, Inc .; https://www.vmware.com/content/dam/digitalmarketing/vmware/en/pdf/vcat/vmware-leveraging-virtual-san-for-ha-management-clusters.pdf, Jan. 2018, 1-22.
Fojta, Tomas , "Quotas and Quota Policies in VMware Cloud Director", Tom Fojta's Blog; retrieved from: https://fojta.wordpress.com/2020/11/06/quotas-and-quota-policies-in-vmware-cloud-director/, Nov. 6, 2020, 1-4.
Fojta, Tomas , "vSAN File Services with vCloud Director—Tom Fojta's Blog", (wordpress.com) ("Fojta Blog"), Feb. 11, 2021, pp. 1-8.
Halbert, Lisa , "Enable or disable last access time updates", https://docs.netapp.com/us-en/storagegrid-116/tenant/enabling-or-disabling-last-access-time-updates.html, Jan. 15, 2022, p. 3.
Hibbard, Andrew , "Manage Autonomous Ransomware Protection attack detection parameters", https://docs.netapp.com/us-en/ontap/anti- ransomware/manage-parameters-task.html#how-attack-detection-works, Dec. 2023, pp. 2161-2163.
Hibbard, Andrew et al., "What ARP detects", https://docs.netapp.com/us-en/ontap/anti-ransomware/#what-arp-detects, Dec. 2023, pp. 2150-2152.
Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.
Jung, Young-Woo et al., "Standard-Based Vitrual Infrastructure Resource Management for Distributed and Heterogeneous Servers", ICACT, Feb. 15, 2009, pp. all.
Kaam, Bas V. , "New in AOS 5.0: Nutanix Acropolis File Services", basvankaam.com, Jan. 5, 2017, pp. all.
Kemp, Erik , "NetApp SolidFire SnapMirror Architecture and Configuration", Technical Report, NetApp, Dec. 2017, pp. all.

(56) References Cited

OTHER PUBLICATIONS

Kleyman, Bill , "How Cloud Computing Changes Storage Tiering", https://www.datacenterknowledge.com ; captured Jun. 4, 2019, Nov. 12, 2015, pp. all.
Lavoie, Tony , "ONTAP Essentials: Alerts", https://docs.netapp.com/us-en/cloudinsights/cs_alert_data.html#alert, Jul. 28, 2023, p. 8.
Leibovici, Andre , "Nutanix One-Click Upgrade now takes care of Firmware and Hypervisor too!", myvirtualcloud.net https://myvirtualcloud.net/nutanix-one-click-upgrade-now-takes-care-of- firmware-and-hypervisor-too/, Jul. 31, 2014, pp. 1-4.
Mantri, Aditya et al., "Pre-Encryption and Identification (PEI): An Anti-crypto Ransomware Technique", https://www.tandfonline.com/doi/abs/10.1080/03772063.2022.2048706, Retrieved Feb. 8, 2023, pp. 1-6.
Matos, David et al., "RockFS: Cloud-backed File System Resilience to Client-Side Attacks", INESC-ID, Instituto Superior Tecnico, Universidade de Lisboa, Portugal Technical University of Munich, Department of Informatics, Germany, DOI: 10.1145/3274808.3274817 ISBN: 978-1-4503-5702-9, Nov. 26, 2018, pp. 107-119.
Mazzoli, Robert , "Alert policies in Microsoft 365", https://learn.microsoft.com/en-us/purview/alert-policies, Jul. 21, 2023, p. 36.
McGhee, , "File Auditing and Analytics for your Nutanix Files Enterprise Cloud", Nutanix, Inc. https://next.nutanix.com/community-blog-154/file-auditing-and-analytics-for-your-nutanix-files-enterprise-cloud-31950#, Mar. 1, 2019, 1-9.
McGhee, , "Nutanix Files: File Analytics", Nutanix, Inc. https://next.nutanix.com/nutanix-files-71/nutanix-files-file-analytics-33179, Aug. 21, 2019, 1.
Mehnaz, Shagufta et al., "A Fine-grained Approach for Anomaly Detection in File System Accesses", Dept. of Computer Science | University of West Lafayette http://library.usc.edu.ph/ACM/SIGSAC%202017/codaspy/p3.pdf, DOI: http://dx.doi.org/10.1145/3029806.3029809, Mar. 24, 2017, pp. 1-12.
Mercier, , "Nutanix Files Analytics at-a-Glance (Part I)", World Wide Technology, https://www.wwt.com/article/nutanix-files-analytics-at-a-glance-part-i, May 23, 2019, 1-12.
Mercier, , "Nutanix Files Analytics at-a-Glance (Part II)", World Wide Technology, https://www.wwt.com/article/nutanix-files-analytics-at-a- glance-part-ii, May 31, 2019, 1-9.
Mercier, , "Nutanix Files Analytics at-a-Glance (Part III)", World Wide Technology, https://www.wwt.com/article/nutanix-files-analytics-at-a-glance-part-iii, Jun. 7, 2019, 1-12.
Mildenberge, Tobias , "How to Use Object Storage to Mitigate Ransomware Attacks", https://contabo.com/blog/how-to-use-object-storage-to-mitigate-ransomware-attacks/#:~: text=Object%20storage%20is%20a%20popular,most%20common%20ransomware%20attack%20vectors, Feb. 21, 2023, p. 3.
Mohan, Vinod et al., "Immutable Storage for Data Protection and Recovery", https://www.datacore.com/blog/immutable-storage-for-data-protection-and-recovery/, Dec. 20, 2021, p. 9.
O'Neil, Megan et al., "The anatomy of ransomware event targeting data residing in Amazon S3", https://aws.amazon.com/blogs/security/anatomy-of-a-ransomware-event-targeting-data-in-amazon-s3/, Feb. 6, 2023, p. 6.
O'Riordan, Finbarr , "Protect Against Potential Ransomware Attacks on ObjectStorage", https://infohub.delltechnologies.com/en-us/p/protect-against-potential-ransomware-attacks-on-object-storage/, Oct. 6, 2021, pp. 1-4.
Padioleau, Yoann et al., "A Logic File System", https://hal.archives-ouvertes.fr/hal-03214497/document, Jun. 2003, pp. 99-112.
Poitras, Steven , "The Nutanix Bible", https://www.nutanixbible.com, Jun. 23, 2023, pp. 1-263.
Poitras, Steven , "The Nutanix Bible", https://nutanixbible.com/, Apr. 9, 2019, pp. all.
Poitras, Steven , "The Nutanix Bible", http://stevenpoitras.com/the-nutanix-bible/ (Publication date based on indicated capture date by Archive.org; first publication date unknown), Jan. 11, 2014, pp. all.
Poitras, Steven , "The Nutanix Bible", https://nutanixbible.com/, Jan. 12, 2016, pp. all.
Poitras, Steven , "The Nutanix Bible", https://nutanixbible.com/, Jan. 3, 2017, pp. all.
Poitras, Steven , "The Nutanix Bible", https://nutanixbible.com/, Jan. 3, 2018, pp. all.
Poitras, Steven , "The Nutanix Bible", http://stevenpoitras.com/the-nutanix-bible/ (Publication date based on indicated capture date by Archive.org; first publication date unknown), Jan. 7, 2015, pp. all.
Poitras, Steven , "The Nutanix Bible", https://nutanixbible.com/, Jan. 8, 2019, pp. all.
Poitras, Steven , "The Nutanix Bible", https://nutanixbible.com/, Jul. 25, 2019, pp. all.
Poitras, Steven , "The Nutanix Bible", http://stevenpoitras.com/the-nutanix-bible/ (Publication date based on indicated capture date by Archive.org; first publication date unknown), Jun. 20, 2014, pp. all.
Poitras, Steven , "The Nutanix Bible", https://nutanixbible.com/, Jun. 25, 2018, pp. all.
Poitras, Steven , "The Nutanix Bible", https://nutanixbible.com/, Jun. 8, 2017, pp. all.
Poitras, Steven , "The Nutanix Bible", http://stevenpoitras.com/the-nutanix-bible/ (Publication date based on indicated capture date by Archive.org; first publication date unknown), Jun. 9, 2015, pp. all.
Poitras, Steven , "The Nutanix Bible", https://nutanixbible.com/, Jun. 9, 2016, pp. all.
Poitras, Steven , "The Nutanix Bible", https://nutanixbible.com/, Mar. 2, 2021, pp. all.
Poitras, Steven , "The Nutanix Bible", http://stevenpoitras.com/the-nutanix-bible/ (Publication date based on indicated capture date by Archive.org; first publication date unknown), Oct. 15, 2013, pp. all.
Poitras, Steven , "The Nutanix Bible", https://nutanixbible.com/, Sep. 1, 2020, pp. all.
Poitras, Steven , "The Nutanix Bible", https://nutanixbible.com/, Sep. 17, 2019, pp. all.
Poitras, Steven , "The Nutanix Bible", https://nutanixbible.com/, Sep. 3, 2021, pp. all.
Poitras, Steven , "The Nutanix Bible", https://nutanixbible.com/, Sep. 4, 2015, pp. all.
Poitras, Steven , "The Nutanix Bible", https://nutanixbible.com/, Duplicate of ref. No. 72511, Mar. 2, 2020, pp. all.
Poitras, Steven , "The Nutanix Bible—Classic Edition", https://nutanixbible.com/ (Mar. 1, 2023), Mar. 1, 2023, pp. all.
Poitras, Steven , "The Nutanix Bible—Classic Edition", https://nutanixbible.com/ (Sep. 9, 2022), Sep. 9, 2022, pp. all.
Poitras, Stevens et al., "The Nutanix Bible", https://nutanixbible.com, May 21, 2024, p. 268.
Poitras, Stevens , "The Nutanix Bible", https://nutanixbible.com/, Dec. 23, 2023, p. 282.
Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
Reich, Itzik , "Dell ObjectScale 1.2—Redefiing Object Storage Options", https://volums.blog/2023/07/11/dell-objectscale-1-2-redefining-object-storage-options/, Jul. 11, 2023, p. 20.
Ruth, Paul , "Autonomic Live Adaption of Virtual Computational Environments in a Multi-Domain Infrastructure", 2006 IEEE International Conference on Autonomic Computing, 2006, pp. 5-14.
Seaborn, Mark , "Protecting data against ransomware using IBM Cloud Object Storage", https://www.ibm.com/blog/protecting-data-against-ransomware-using-ibms-cloud-object-storage/, Oct. 14, 2022, p. 10.
Seget, Vladan , "VMware vSAN 7 now with native file services and quotas", 4sysops; https://4sysops.com/archives/vmware-vsan-7-now-with-native-file-services-and-quotas/, May 1, 2020.
Seget, Vladan , "VMware vSphere 7.0 and vSAN storage improvements", retrieved from: https://4sysops.com/archives/vmware-vsphere-7-0-and-vsan-storage-improvements/, Apr. 1, 2020, pp. 1-12.
Singireddy, Hareesh et al., "Expiring Amazon S3 Objects Based on Last Accessed Date to DecreaseCosts", AWS Architecture Blog | https://aws.amazon.com/blogs/architecture/expiring-amazon-s3-objects-based-on-last-accessed-date-to-decrease-costs/, Aug. 3, 2021, p. 3.

(56) References Cited

OTHER PUBLICATIONS

Sturniolo, Andy , "VMware vSAN File Services and Veeam", Veeam Blog, https://www.veeam.com/blog/veeam-backup-vsan-file-services.html, Jul. 22, 2020, 1-9.
Wang, Xiaobin et al., "An abnormal file access behavior detection approach based on file path diversity", Institution of Engineering and Technology https://ieeexplore.ieee.org/abstract/document/6913685, DOI: 10.1049/cp.2014.0632, Oct. 2014, pp. 1-5.
Werber, Mat , "Query Amazon S3 Analytics data with Amazon Athena", https://aws.amazon.com/blogs/storage/query-amazon-s3-analytics-data-with-amazon-athena/, Jan. 7, 2020, p. 7.
Young-Woo, , "Standard-based Virtual Infrastructure Resource Management for Distributed and Heterogeneous Servers", ICACT, Feb. 15, 2009.
Zemlyanaya, D. et al., "Virus signature detection algorithm", https://www.researchgate.net/publication/357414139_Virus_signature_detection_algorithm, 2021, pp. 1-8.
[Published as US-2021-0365257-A1] U.S. Appl. 17/169,137 titled "Virtualized File Server Data Sharing" filed Feb. 5, 2021.
[Published as US 20170235760 A1 on Aug. 17, 2017] U.S. Appl. No. 15/422,220, entitled Virtualized File Server filed Feb. 1, 2017, pp. all.
[Published as US 2018/0157521 on Jun. 7, 2018] U.S. Appl. No. 15/829,781, entitled "Virtualized Server Systems and Methods Including Load Balancing for Virtualized File Servers", filed Dec. 1, 2017, pp. all.
Timmerman, Arjan et al., "GigaOm Sonar Report for File-Based Primary Storage Ransomware Protection", https://gigaom.com/reprint/gigaom-sonar-report-for-file-based-primary-storage-ransomware-protection-237771-netapp/#post-id-1017085, Aug. 23, 2023.

* cited by examiner

DATA ANALYTICS SYSTEMS FOR FILE SYSTEMS INCLUDING TIERING

CROSS-REFERENCE TO RELATED APPLICATION(S)

This application claims priority to Indian Application No. 202211056304 filed Sep. 30, 2022, which is incorporated herein by reference, in its entirety, for any purpose.

TECHNICAL FIELD

Examples described herein relate to data analytics systems for file systems, including distributed file servers hosting file systems. Examples of analytics systems which may select files for tiering and/or recall operations are described herein.

BACKGROUND

Data, including files, are increasingly important to enterprises and individuals. The ability to store significant corpuses of files is important to the operation of many modern enterprises. Existing systems that store enterprise data may be complex or cumbersome to interact with in order to quickly or easily establish what actions have been taken with respect to the enterprise's data and what attention may be needed from an administrator. In addition, an incomplete catalog of the file system may result in an incomplete analysis of the enterprise data to determine usage characteristics and to detect anomalies.

DETAILED DESCRIPTION

Figure 1A:
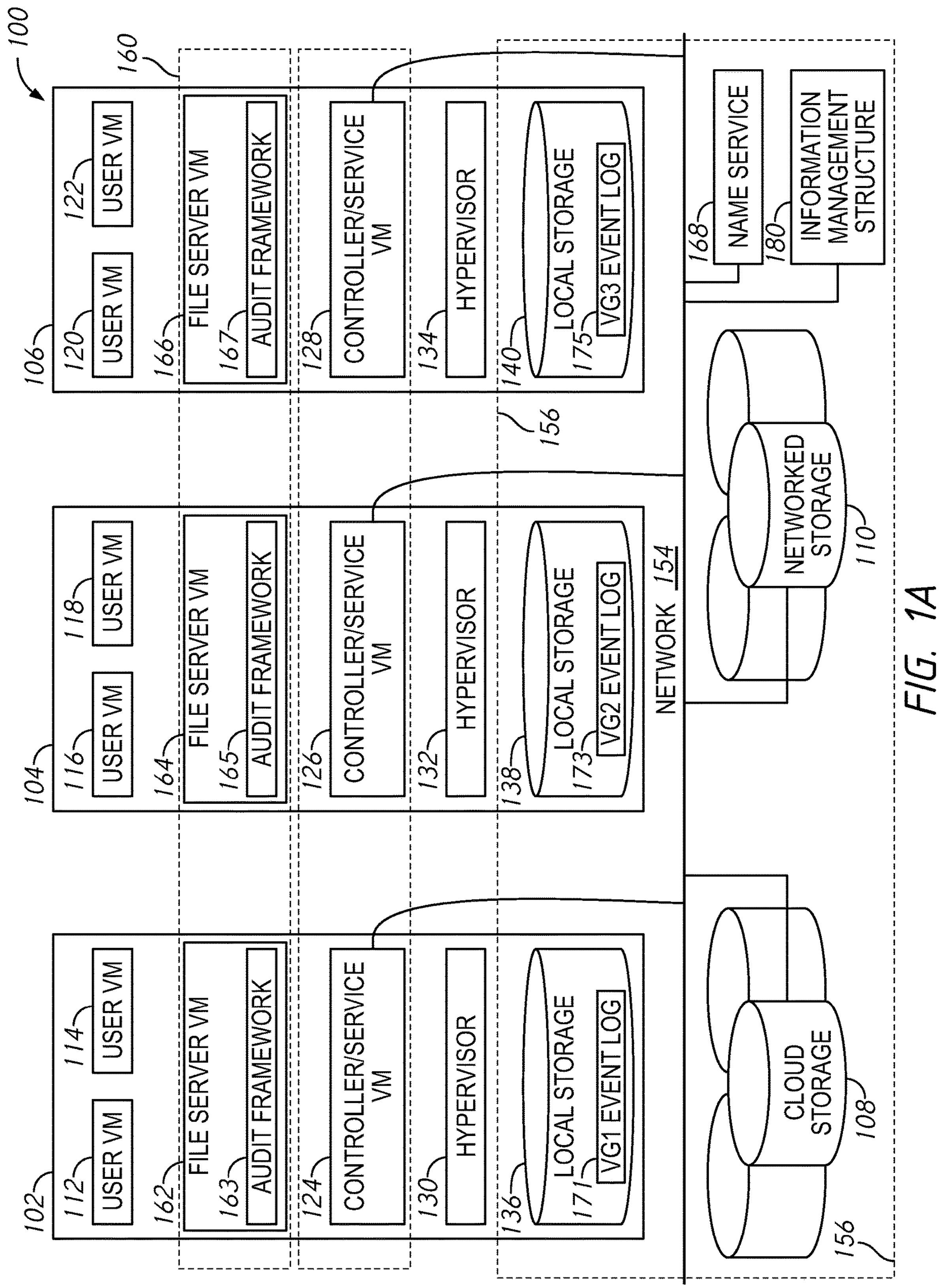
FIG. 1A is a schematic illustration of a distributed computing system hosting a virtualized file server arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Data analytics systems described herein may provide a cloud-hosted analytics and monitoring service for file servers. The file servers may be hosted on any number of architectures, such as Nutanix Files and/or Isilon and/or NetApp file servers. Data analytics systems described herein may centralize data from clusters connected to admin systems operating at various data center locations. Cloud resources may reduce scaling constraints, as the cloud is not dependent on the file server resources, which may provide near-real-time analytics and alerts even for load-heavy file servers of more than 250 million files and over 500 TB of storage. Hosting file analytics on premises may limit the service to local file servers only. In contrast, systems described herein may function on a global level, in a cluster-neutral environment, without being tied to a single cluster.

Examples described herein include metadata and events-based file analytics systems for file systems. In some examples, the file systems may be implemented using hyper-converged scale out distributed file storage systems. Embodiments presented herein include a file analytics system which may retrieve, organize, aggregate, and/or analyze information pertaining to a file system. Information about the file system may be stored in an analytics datastore. The file analytics system may query or monitor the analytics datastore to provide information (e.g., to an administrator) in the form of display interfaces, reports, and alerts and/or notifications. In some examples, the file analytics system may be hosted in a remote computing environment (e.g., in a cloud computing architecture). In some examples, the file analytics system may be hosted on a computing node, whether standalone or on a cluster of computing nodes. In some examples, the file analytics system may interface with a file system managed by a distributed virtualized file server (VFS) hosted on a cluster of computing nodes. An example VFS may provide for shared storage (e.g., across an enterprise), failover and backup functionalities, as well as scalability and security of data stored on the VFS.

Data analytics systems described herein may scan metadata from the file system, and/or receive event data from the file system, and may store the metadata and/or event data in a database, data warehouse, or other location. This data may be used to provide a variety of analytics for the file system.

Data analytics systems described herein may utilize the metadata and event data to provide tiering instructions to the file system. Tiering generally may refer to moving files or other amounts of data from one tier of storage to another tier of storage. Typically, "hot" or more frequently used data may be stored in a storage tier which may generally have higher performance and/or be more expensive than "cold" or less frequently used data. Determining which data to send to which tier, and moving the data, can be a large project—particularly when managing TBs of storage.

Data analytics systems described herein may be utilized to identify files to be moved from one tier of storage to another, and to schedule the files for tiering. The data analytics systems may additionally or instead be used to recall files or other data from one tier to another.

During operation, the file analytics system may retrieve metadata associated with the file system, configuration and/or user information from the file system, and/or event data from the file system.

In some examples, the file server may include an audit framework that manages event data in an event log. The audit framework may be configured to communicate with the analytics system to provide event data and/or metadata to the analytics system from the event log.

In some examples, the information retrieved or received by the analytics system may include event data records and metadata. The metadata collection process may include gathering the overall size, structure, and storage locations of parts of the file system managed by the file server, as well as details (e.g., file size, allocated storage quota, creation and/or modification information, owner information, permissions information, etc.) for each data item (e.g., file, folder, directory, share, etc.) in the file system. In some examples, the metadata collection process may rely on scanning one or more snapshots of the file system managed by the file server to gather the metadata, such as one or more snapshots generated by a disaster recovery application of the file server. The analytics tool may use the information gathered from the one or more snapshots to develop a comprehensive picture of the file system managed by the file server. In some examples, the analytics tool may employ multiple threads to perform scanning of the snapshots in parallel. The multiple threads may be employed to scan different shares in parallel, different files of a common share in parallel, or any combination thereof.

To capture configuration information, the file analytics system may use an application programming interface (API) architecture to request the configuration information. The configuration information may include user information, a number of shares, deleted shares, created shares, etc.

To capture event data, the VFS may include an audit framework with a connector that is configured to communicate the event data records and other information for consumption by a file analytics system. The event data records may include data related to various operations on the file system executed by the VFS, such as adding, deleting, moving, modifying, etc., a file, folder, directory, share, etc. The event data records may indicate an event type (e.g., add, move, delete, modify, a user associated with the event, an event time, etc.).

To capture event data, the file analytics system may interface with the file server to receive event data. Received event data may be stored by the file analytics system in an analytics datastore, which may be a database and/or data warehouse. The event data may include data related to various operations performed with the file system, such as creating, deleting, reading, opening, editing, moving, modifying, etc., a file, folder, directory, share, etc., within the file system. The event information may indicate an event type (e.g., create, read, edit, delete), a user associated with the event, an event time, etc. Examples of events which may be supported in some examples include file open, file write, file rename, file create, file read, file delete, security change, directory create, directory delete, file open/permission denied, file close, and/or set attribute. Events may include file server audit events (e.g., Server Message Block (SMB) audit events). Events as described herein may be for either a file, directory, share, or other item of the file server.

The file analytics system may generate reports, including predetermined reports and/or customizable reports. The reports may be related to aggregate and/or specific user activity; aggregate file system activity; specific file, directory, share, etc., activity; etc.; or any combination of thereof.

Examples described herein provide analytics which may be used, for example, to collect, analyze, and display data about a file system. Generally, data from any file system may be obtained and analyzed in accordance with techniques described herein. In some examples, the file system may be implemented as a virtualized file system, such as on a distributed virtualized file server which may host a file system. Virtualization may be advantageous in modern business and computing environments in part because of the resource utilization advantages provided by virtualized computing systems. Without virtualization, if a physical machine is limited to a single dedicated process, function, and/or operating system, then during periods of inactivity by that process, function, and/or operating system, the physical machine is not utilized to perform useful work. This may be wasteful and inefficient if there are users on other physical machines which are currently waiting for computing resources. To address this problem, virtualization allows multiple virtualized computing instances, such as virtual machines (VMs) and/or containers to share the underlying physical resources so that during periods of inactivity by one virtualized computing instance, other instances can take advantage of the resource availability to process workloads. This can produce efficiencies for the utilization of physical devices and can result in reduced redundancies and better resource cost management.

Furthermore, virtualized computing systems may be used to not only utilize the processing power of the physical devices but also to aggregate the storage of the individual physical devices to create a logical storage pool where the data may be distributed across the physical devices but appears to the virtual machines and/or containers to be part of the system that the virtual machine and/or container is hosted on. Such systems may operate using metadata, which may be distributed and replicated any number of times across the system, to locate the indicated data.

Examples of virtualized file servers that may be used in examples described herein are also described in U.S. Published Patent Application 2017/0235760, published Aug. 17, 2017, entitled "Virtualized File Server" on U.S. application Ser. No. 15/422,220 filed Feb. 1, 2017, which application and publication are hereby incorporated herein by reference in their entirety for any purpose.

Examples of analytics systems which may be integrated with virtualized file servers are also described in U.S. application Ser. No. 17/304,096, filed Jun. 14, 2021, and entitled "File Analytics Systems and Methods," which application is hereby incorporated by reference herein in its entirety for any purpose.

FIG. 1A is a schematic illustration of a distributed computing system hosting a virtualized file server arranged in accordance with examples described herein. The system 100, which may be a virtualized system and/or a clustered virtualized system, includes a virtualized file server (VFS) 160. While shown as a virtual machine, examples of analytics applications may be implemented using one or more virtual computing instances, which may be implemented for example as virtual machines, containers, or combinations thereof. In some examples an analytics system, which may include an analytics datastore, may be provided as a hosted solution in one or more cloud computing platforms, which may be in communication with the system 100 of FIG. 1A.

The system of FIG. 1A can be implemented using a distributed computing system. Distributed computing systems generally include multiple computing nodes (e.g., physical computing resources)—host machines 102, 106, and 104 are shown in FIG. 1A—that may manage shared storage, which may be arranged in multiple tiers. The storage may include storage that is accessible through network 154, such as, by way of example and not limitation, cloud storage 108 (e.g., which may be accessible through the Internet), network-attached storage 110 (NAS) (e.g., which may be accessible through a LAN), or a storage area network (SAN). Examples described herein may also or instead permit local storage 136, 138, and 140 that is incorporated into or directly attached to the host machine and/or appliance to be managed as part of storage pool 156. Accordingly, the storage pool may include local storage of one or more of the computing nodes in the system, storage accessible through a network, or both local storage of one or more of the computing nodes in the system and storage accessible over a network. In some examples, the storage pool 156 may include only the local storage of nodes in the cluster—e.g., local storage 136, 138, and 140. Examples of local storage may include solid state drives (SSDs), hard disk drives (HDDs, and/or "spindle drives"), optical disk drives, external drives (e.g., a storage device connected to a host machine via a native drive interface, or a serial attached SCSI interface), or any other direct-attached storage. These storage devices, both direct-attached and/or network-accessible, collectively form storage pool 156 in some examples. Virtual disks (or "vDisks") may be structured from the physical storage devices in storage pool 156. A vDisk generally refers to a storage abstraction that is exposed by a component (e.g., a virtual machine, hypervisor, and/or container described herein) to be used by a client (e.g., a user VM, such as user VM 112). In examples described herein, controller VMs—e.g., controller VM 124, 126, and/or 128 of FIG. 1A may provide access to vDisks. In other examples, access to vDisks may additionally or instead be provided by one or more hypervisors (e.g., hypervisor 130, 132, and/or 134). In some examples, the vDisk may be exposed via iSCSI ("internet small computer system interface") or NFS ("network file system") and may be mounted as a virtual disk on the user VM. In some examples, vDisks may be organized into one or more volume groups (VGs).

Each host machine 102, 106, 104 may run virtualization software. Virtualization software may include one or more virtualization managers (e.g., one or more virtual machine managers, such as one or more hypervisors, and/or one or more container managers). Examples of hypervisors include NUTANIX AHV, VMWARE ESX(I), MICROSOFT HYPER-V, DOCKER hypervisor, and REDHAT KVM. Examples of container managers include Kubernetes. The virtualization software shown in FIG. 1A includes hypervisors 130, 132, and 134 which may create, manage, and/or destroy user VMs, as well as manage the interactions between the underlying hardware and user VMs. While hypervisors are shown in FIG. 1A, containers may be used additionally or instead in other examples. User VMs may run one or more applications that may operate as "clients" with respect to other elements within system 100. While shown as virtual machines in FIG. 1A, containers may be used to implement client processes in other examples. Hypervisors may connect to one or more networks, such as network 154 of FIG. 1A, to communicate with storage pool 156 and/or other computing system(s) or components.

In some examples, controller virtual machines, such as CVMs 124, 126, and 128 of FIG. 1A, are used to manage storage and input/output ("I/O") activities according to particular embodiments. While examples are described herein using CVMs to manage storage I/O activities, in other examples, container managers and/or hypervisors may additionally or instead be used to perform described CVM functionality. The arrangement of virtualization software should be understood to be flexible. In some examples, CVMs act as the storage controller. Multiple such storage controllers may coordinate within a cluster to form a unified storage controller system. CVMs may run as virtual machines on the various host machines, and work together to form a distributed system that manages all the storage resources, including local storage, network-attached storage 110, and cloud storage 108. The CVMs may connect to network 154 directly, or via a hypervisor. Since the CVMs run independent of hypervisors 130, 132, 134, in examples where CVMs provide storage controller functionally, the system may be implemented within any virtual machine architecture since the CVMs of particular embodiments can be used in conjunction with any hypervisor from any virtualization vendor. In other examples, the hypervisor may provide storage controller functionality and/or one or more containers may be used to provide storage controller functionality (e.g., to manage I/O requests to and from the storage pool 156).

A host machine may be designated as a leader node within a cluster of host machines. For example, host machine 104 may be a leader node. A leader node may have a software component designated to perform operations of the leader. For example, CVM 126 on host machine 104 and/or file server VM 164 of host machine 104 may be designated to perform such operations. A leader may be responsible for monitoring or handling requests from other host machines or software components on other host machines throughout the virtualized environment. For example, a leader service may handle the distribution of requests to and from other instances of that service throughout the distributed environment. If a leader fails, a new leader may be designated. In particular embodiments, a management module (e.g., in the form of an agent) may be running on the leader node.

Virtual disks may be made available to one or more user processes. In the example of FIG. 1A, each CVM 124, 126, and 128 may export one or more block devices or NFS server targets that appear as disks to user VMs 112, 114, 116, 118, 120, and 122. These disks are virtual, since they are implemented by the software running inside CVMs 124, 126, and 128. Thus, to user VMs, CVMs appear to be exporting a clustered storage appliance that contains some disks. User data (e.g., including the operating system in some examples) in the user VMs may reside on these virtual disks.

Performance advantages can be gained in some examples by allowing the virtualization system to access and utilize local storage 136, 138, and 140. This is because I/O performance may be much faster when performing access to local storage as compared to performing access to network-attached storage 110 across a network 154. This faster performance for locally attached storage can be increased even further by using certain types of optimized local storage devices, such as SSDs.

As a user process (e.g., a user VM) performs I/O operations (e.g., a read operation or a write operation), the I/O commands may be sent to the hypervisor that shares the same server as the user process, in examples utilizing hypervisors. For example, the hypervisor may present to the virtual machines an emulated storage controller, receive an I/O command, and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 156. Additionally or alternatively, CVMs 124, 126, 128 may present an emulated storage controller either to the hypervisor or to user VMs to facilitate I/O operations. CVMs 124, 126, and 128 may be connected to storage within storage pool 156. CVM 124 may have the ability to perform I/O operations using local storage 136 within the same host machine 102, by connecting via network 154 to cloud storage 108 or network-attached storage 110, or by connecting via network 154 to local storage 138 or 140 within another host machine 104 or 106 (e.g., via connecting to another CVM 126 or 128). In particular embodiments, any computing system may be used to implement a host machine.

Examples described herein include virtualized file servers. A virtualized file server may be implemented using a cluster of virtualized software instances (e.g., a cluster of file server virtual machines). A virtualized file server 160 is shown in FIG. 1A including a cluster of file server virtual machines. The file server virtual machines may additionally or instead be implemented using containers. In some examples, the VFS 160 provides file services to user VMs 112, 114, 116, 118, 120, and 122. The file services may include storing and retrieving data persistently, reliably, and/or efficiently in some examples. The user virtual machines may execute user processes, such as office applications or the like, on host machines 102, 104, and 106. The stored data may be represented as a set of storage items, such as files organized in a hierarchical structure of folders (also known as directories), which can contain files and other folders, and shares, which can also contain files and folders. Generally, the file server virtual machines may present a single namespace of storage items to user VMs.

In particular embodiments, the VFS 160 may include a set of file server virtual machines (FSVMs) 162, 164, and 166 that execute on host machines 102, 104, and 106. The set of file server virtual machines (FSVMs) may operate together to form a cluster. The FSVMs may process storage item access operations requested by user VMs executing on the host machines 102, 104, and 106. The FSVMs 162, 164, and 166 may communicate with storage controllers provided by CVMs 124, 126, 128 and/or hypervisors executing on the host machines 102, 104, 106 to store and retrieve files, folders, SMB shares, or other storage items. The FSVMs 162, 164, and 166 may store and retrieve block-level data on the host machines 102, 104, 106, e.g., on the local storage 136, 138, 140 of the host machines 102, 104, 106. The block-level data may include block-level representations of the storage items. The network protocol used for communication between user VMs, FSVMs, CVMs, and/or hypervisors via the network 154 may be Internet Small Computer Systems Interface (iSCSI), Server Message Block (SMB), Network File System (NFS), pNFS (Parallel NFS), or another appropriate protocol.

Generally, FSVMs may be utilized to receive and process requests in accordance with a file system protocol—e.g., NFS, SMB. In this manner, the cluster of FSVMs may provide a file system that may present files, folders, and/or a directory structure to users, where the files, folders, and/or directory structure may be distributed across a storage pool in one or more shares. The cluster of FSVMs may present a single namespace of storage items of a file system stored in the storage pool.

For the purposes of VFS 160, host machine 106 may be designated as a leader node within a cluster of host machines. In this case, FSVM 166 on host machine 106 may be designated to perform such operations. A leader may be responsible for monitoring or handling requests from FSVMs on other host machines throughout the virtualized environment. If FSVM 166 fails, a new leader may be designated for VFS 160.

In some examples, the user VMs may send data to the VFS 160 using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 102, 104, 106 via network 154, e.g., using a network communication protocol such as iSCSI, CIFS, SMB, TCP, Internet Protocol (IP), or the like. When a read or write request is sent between two VMs located on the same one of the host machines 102, 104, 106 (e.g., between the user VM 112 and the FSVM 162 located on the host machine 102), the request may be sent using local communication within the host machine 102 instead of via the network 154. Such local communication may be faster than communication via the network 154 in some examples. The local communication may be performed by, e.g., writing to and reading from shared memory accessible by the user VM 112 and the FSVM 162, sending and receiving data via a local "loop-back" network interface, local stream communication, or the like.

In some examples, the storage items stored by the VFS 160, such as files and folders, may be distributed among storage managed by multiple FSVMs 162, 164, 166. In some examples, when storage access requests are received from the user VMs, the VFS 160 identifies FS VMs 162, 164, 166 at which requested storage items, e.g., folders, files, or portions thereof, are stored or managed, and directs the user VMs to the locations of the storage items. The FSVMs 162, 164, 166 may maintain a storage map, such as a sharding map, that maps names or identifiers of storage items to their corresponding locations. The storage map may be a distributed data structure of which copies are maintained at each FSVM 162, 164, 166 and accessed using distributed locks or other storage item access operations. In some examples, the storage map may be maintained by an FSVM at a leader node such as the FSVM 166, and the other FSVMs 162 and 164 may send requests to query and update the storage map to the leader FSVM 166. Other implementations of the storage map are possible using appropriate techniques to provide asynchronous data access to a shared resource by multiple readers and writers. The storage map may map names or identifiers of storage items in the form of text strings or numeric identifiers, such as file system paths, folder names, file names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application, e.g., executing in a user VM 112 on host machine 102 initiates a storage access operation, such as reading or writing data, the user VM 112 may send the storage access operation in a request to one of the FSVMs 162, 164, 166 on one of the host machines 102, 104, 106. An FSVM 164 executing on a host machine 102 that receives a storage access request may use the storage map to determine whether the requested file or folder is located on and/or managed by the FSVM 164. If the requested file or folder is located on and/or managed by the FSVM 164, the FSVM 164 executes the requested storage access operation. Otherwise, the FSVM 164 responds to the request with an indication that the data is not on the FSVM 164, and may redirect the requesting user VM 112 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 162 by sending a file service operation that creates the file or folder to a CVM, container, and/or hypervisor associated with (e.g., located on the same host machine as) the FSVM 162—the CVM 124 in the example of FIG. 1A. The CVM, container, and/or hypervisor may subsequently process file service commands for that file for the FSVM 162 and send corresponding storage access operations to storage devices associated with the file. In some examples, the FSVM may perform these functions itself. The CVM 124 may associate local storage 136 with the file if there is sufficient free space on local storage 136. Alternatively, the CVM 124 may associate a storage device located on another host machine 104, e.g., in local storage 138, with the file under certain conditions, e.g., if there is insufficient free space on the local storage 136, or if storage access operations between the CVM 124 and the file are expected to be infrequent. Files and folders, or portions thereof, may also be stored on other storage devices, such as the network-attached storage (NAS) 110 or the cloud storage 108 of the storage pool 156.

In particular embodiments, a name service 168, such as that specified by the Domain Name System (DNS) Internet protocol, may communicate with the host machines 102, 104, 106 via the network 154 and may store a database of domain names (e.g., host names) to IP address mappings. The domain names may correspond to FSVMs, e.g., fsvm1.domain.com or ip-addr1.domain.com for an FSVM named FSVM-1. The name service 168 may be queried by the user VMs to determine the IP address of a particular host machine (e.g., computing node) 102, 104, 106 given a name of the host machine, e.g., to determine the IP address of the host name ip-addr1 for the host machine 102. The name service 168 may be located on a separate server computer system or on one or more of the host machines 102, 104, 106. The names and IP addresses of the host machines of the VFS 160, e.g., the host machines 102, 104, 106, may be stored in the name service 168 so that the user VMs may determine the IP address of each of the host machines 102, 104, 106, or FSVMs 162, 164, 166. The name of each VFS instance, e.g., FS1, FS2, or the like, may be stored in the name service 168 in association with a set of one or more names that contains the name(s) of the host machines 102, 104, 106 or FSVMs 162, 164, 166 of the VFS 160 instance. The FSVMs 162, 164, 166 may be associated with the host names ip-addr1, ip-addr2, and ip-addr3, respectively. For example, the file server instance name FS1.domain.com may be associated with the host names ip-addr1, ip-addr2, and ip-addr3 in the name service 168, so that a query of the name service 168 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 168 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 168 for the address of the VFS instance for storage items for which the user VMs do not have a record or cache entry, as described below.

In particular embodiments, each FSVM may have two IP (Internet Protocol) addresses: an external IP address and an internal IP address. The external IP addresses may be used by SMB/CIFS clients, such as user VMs, to connect to the FSVMs. The external IP addresses may be stored in the name service 168. The IP addresses ip-addr1, ip-addr2, and ip-addr3 described above are examples of external IP addresses. The internal IP addresses may be used for iSCSI communication to CVMs, e.g., between the FSVMs 162, 164, 166 and the CVMs 124, 126, 128. Other internal communications may be sent via the internal IP addresses as well, e.g., file server configuration information may be sent from the CVMs to the FSVMs using the internal IP addresses, and the CVMs may get file server statistics from the FSVMs via internal communication.

Since the VFS 160 is provided by a distributed cluster of FSVMs 162, 164, 166, the user VMs that access particular requested storage items, such as files or folders, do not necessarily know the locations of the requested storage items when the request is received. A distributed file system protocol, e.g., MICROSOFT DFS or the like, may therefore be used, in which a user VM 112 may request the addresses of FSVMs 162, 164, 166 from a name service 168 (e.g., DNS). The name service 168 may send one or more network addresses of FSVMs 162, 164, 166 to the user VM 112. The addresses may be sent in an order that changes for each subsequent request in some examples. These network addresses are not necessarily the addresses of the FSVM 164 on which the storage item requested by the user VM 112 is located, since the name service 168 does not necessarily have information about the mapping between storage items and FSVMs 162, 164, 166. Next, the user VM 112 may send an access request to one of the network addresses provided by the name service, e.g., the address of FSVM 164. The FSVM 164 may receive the access request and determine whether the storage item identified by the request is located on the FSVM 164. If so, the FSVM 164 may process the request and send the results to the requesting user VM 112. However, if the identified storage item is located on a different FSVM 166, then the FSVM 164 may redirect the user VM 112 to the FSVM 166 on which the requested storage item is located by sending a "redirect" response referencing FSVM 166 to the user VM 112. The user VM 112 may then send the access request to FSVM 166, which may perform the requested operation for the identified storage item.

A particular VFS 160, including the items it stores, e.g., files and folders, may be referred to herein as a VFS "instance" and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients, such as user VMs, by name and/or path, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS may store different folders, files, or portions thereof at different locations, e.g., on different FSVMs, the use of different FSVMs or other elements of storage pool 156 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, may similarly be location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 160 determines the location, e.g., FSVM, at which to store a storage item when the storage item is created. For example, an FSVM 162 may attempt to create a file or folder using a CVM 124 on the same host machine 102 as the user VM 114 that requested creation of the file, so that the CVM 124 that controls access operations to the file folder is co-located with the user VM 114. While operations with a CVM are described herein, the operations could also or instead occur using a hypervisor and/or container in some examples. In this way, since the user VM 114 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 160 may also attempt to store the file on a storage device that is local to the CVM being used to create the file, such as local storage, so that storage access operations between the CVM and local storage may use local or short-distance communication.

In some examples, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In some examples, if a virtual machine, such as a user VM 112, CVM 124, or FSVM 162, moves from a host machine 102 to a destination host machine 104, e.g., because of resource availability changes, and data items such as files or folders associated with the VM are not locally accessible on the destination host machine 104, then data migration may be performed for the data items associated with the moved VM to migrate them to the new host machine 104, so that they are local to the moved VM on the new host machine 104. FSVMs may detect removal and addition of CVMs (as may occur, for example, when a CVM fails or is shut down) via the iSCSI protocol or other technique, such as heartbeat messages. As another example, an FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 160 may change the location of the file by, for example, copying the file from its existing location(s), such as local storage 136 of a host machine 102, to its new location(s), such as local storage 138 of host machine 104 (and to or from other host machines, such as local storage 140 of host machine 106 if appropriate), and deleting the file from its existing location(s). Write operations on the file may be blocked or queued while the file is being copied, so that the copy is consistent. The VFS 160 may also redirect storage access requests for the file from an FSVM at the file's existing location to an FSVM at the file's new location.

In particular embodiments, VFS 160 includes at least three file server virtual machines (FSVMs) 162, 164, 166 located on three respective host machines 102, 104, 106. To provide high-availability, in some examples, there may be a maximum of one FSVM for a particular VFS instance VFS 160 per host machine in a cluster. If two FSVMs are detected on a single host machine, then one of the FSVMs may be moved to another host machine automatically in some examples, or the user (e.g., system administrator) may be notified to move the FSVM to another host machine. The user may move an FSVM to another host machine using an administrative interface that provides commands for starting, stopping, and moving FSVMs between host machines.

In some examples, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which may be more disruptive and more difficult to recover from than loss of one-third of the FSVMs for the VFS instance.

In some examples, users, such as system administrators or other users of the system and/or user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as a name service.

In some examples, files hosted by a virtualized file server, such as the VFS 160, may be provided in shares—e.g., SMB shares and/or NFS exports. SMB shares may be distributed shares (e.g., home shares) and/or standard shares (e.g., general shares). NFS exports may be distributed exports (e.g., sharded exports) and/or standard exports (e.g., non-sharded exports). A standard share may in some examples be an SMB share and/or an NFS export hosted by a single FSVM (e.g., FSVM 162, FSVM 164, and/or FSVM 166 of FIG. 1A). The standard share may be stored, e.g., in the storage pool in one or more volume groups and/or vDisks and may be hosted (e.g., accessed and/or managed) by the single FSVM. The standard share may correspond to a particular folder (e.g., \\enterprise\finance may be hosted on one FSVM, \\enterprise\hr on another FSVM). In some examples, distributed shares may be used which may distribute hosting of a top-level directory (e.g., a folder) across multiple FSVMs. So, for example, \\enterprise\users\ann and \\enterprise\users\bob may be hosted at a first FSVM, while \\enterprise\users\chris and \\enterprise\users\dan are hosted at a second FSVM. In this manner a top-level directory (e.g., \\enterprise\users) may be hosted across multiple FSVMs. This may also be referred to as a sharded or distributed share (e.g., a sharded SMB share). As discussed, a distributed file system protocol, e.g., MICROSOFT DFS or the like, may be used, in which a user VM may request the addresses of FSVMs 162, 164, 166 from a name service (e.g., DNS).

Accordingly, systems described herein may include one or more virtual file servers, where each virtual file server may include a cluster of file server VMs and/or containers operating together to provide a file system. Examples of systems described herein may include a file analytics system that may collect, monitor, store, analyze, and report on various analytics associated with the virtual file server(s). By providing a file analytics system, system administrators may advantageously find it easier to manage their files stored in a file system, and may more easily gain, understand, protect and utilize insights about the stored data and/or the usage of the file system over time. Examples of file analytics systems are described as being provided in a hosted system (e.g., cloud computing system), however, it is to be understood that the analytics VM may be implemented in various examples using one or more virtual machines and/or one or more containers or other virtual computing instances.

Accordingly, an analytics system may be in communication with the system 100 of FIG. 1A. The analytics system may retrieve, organize, aggregate, and/or analyze information corresponding to a file system. The information may be stored in an analytics datastore. The analytics system may query or monitor the analytics datastore to provide information to an administrator in the form of display interfaces, reports, and alerts/notifications. The analytics system may be provided as a hosted analytics system on a computing system and/or platform in communication with the VFS 160. For example, the analytics system may be provided as a hosted analytics system in the cloud—e.g., provided on one or more cloud computing platforms.

During operation, the analytics system may perform multiple functions related to information collection, including a metadata collection process to receive metadata associated with the file system, a configuration information collection process to receive configuration and user information from the VFS 160, and an event data collection process to receive event data from the VFS 160.

The metadata collection process may include gathering the overall size, structure, and storage locations of the VFS 160 and/or parts of the file system managed by the VFS 160, as well as details for one or more (e.g., each) data item (e.g., file, folder, directory, share, etc.) in the VFS 160 and/or other metadata associated with the VFS 160. In some examples, the analytics system may communicate with each of the FSVMs 162, 164, 166 of the VFS 160 during the metadata collection process to retrieve respective portions of the metadata.

In some examples, the analytics system may make an initial scan of the VFS 160 to obtain initial metadata concerning the file system (e.g., number of files, directories, file names, file sizes, file owner ID and/or name, file permissions (e.g., access control lists, etc.)). The analytics system may provide an API call (e.g., SMB ACL call) to the VFS 160 to retrieve owner usernames and/or ACL permission information based on the owner identifier and the ACL identifier.

In some examples, the analytics system may communicate with each of the FSVMs 162, 164, 166 of the VFS 160 during the metadata collection process to retrieve respective portions of the metadata from the file system. In some examples, the metadata collection processes performed by the analytics system may include a multi-threaded breadth-first search (BFS) that involves performing parallel threaded file system scanning. The parallel threaded file system scanning may include parallel scanning of different shares, parallel scanning of different folders of a common share, or any combination thereof. In some examples, the metadata collection process may implement a parallel BFS with level order traversal of a directory tree to collect metadata. Level order traversal may include processing a directory tree one level at a time. For example, starting with a top-level directory, a first level of a directory tree is processed before moving onto a next level of the directory tree. The level order traversal includes a current queue, which includes each item in the level of the directory tree currently being processed, and a next queue, which includes children of the level of the directory tree currently being processed. When processing of the current queue is completed, the current queue may be loaded with the next queue entries. By performing level order traversal, a size of the two queues may be more manageable, as compared with a system where every item from a directory tree is loaded into a single queue. The parallel BFS may include starting a thread on each level, and letting processing of all the data items on that level be completed in the current queue before making a move to the next or child queue.

To capture configuration information, the analytics system may use an application programming interface (API) architecture to request the configuration information from the VFS 160. The API architecture may include representation state transfer (REST) API architecture. The configuration information may include user information, a number of shares, deleted shares, created shares, etc. In some examples, the analytics system may communicate directly with the leader FSVM of the FSVMs 162, 164, 166 of the VFS 160 to collect the configuration information. In some examples, the analytics system may communicate directly with another component (e.g., application, process, and/or service) of the VFS 160 or of the distributed computing system 100 (e.g., one or more storage controllers, virtualization managers, the CVMs 124, 126, 128, the hypervisors 130, 132, 134, etc.) to collect the configuration information. In some examples, the analytics system may communicate directly with another component (e.g., application, process, and/or service) of the VFS 160 or of the distributed computing system or in communication with the distributed computing system 100 (e.g., computing node, an administrative system, a storage controller, the CVMs 124, 126, 128, the hypervisors 130, 132, 134, etc.) to collect the configuration information.

To capture event data, the analytics system may interface with the VFS 160 to receive event data for storage in an analytics datastore. The VFS 160 may include or may be associated with an audit framework with a connector that is configured to provide the event data for consumption by the analytics system. For example, the FSVMs 162, 164, 166 of the VFS 160 may each include or may be associated with a respective audit framework 163, 165, 167 with a connector that may provide the event data to the analytics system. In some examples, while the audit framework 163, 165, 167 for each FS VM 162, 164, 166 is depicted as being part of the FSVMs 162, 164, 166, the audit framework 163, 165, 167 may be hosted by another component (e.g., application, process, and/or service) of the VFS 160 or of the distributed computing system 100 (e.g., one or more storage controller(s), the CVMs 124, 126, 128, the hypervisors 130, 132, 134, etc.) without departing from the scope of the disclosure. The audit framework generally refers to one or more software components which may be provided to collect, store, analyze, and/or transmit audit data (e.g., data regarding events in the file system). The event data may include data related to various operations performed with the VFS 160, such as adding, deleting, moving, modifying, etc., a file, folder, directory, share, etc., within the VFS 160. The event information may indicate an event type (e.g., add, move, delete, modify), a user associated with the event, an event time, etc. In some examples, once an event is written to the analytics datastore, it is not able to be modified. In some examples, the analytics system may aggregate multiple events into a single event for storage in the analytics datastore. For example, if a known task (e.g., moving a file) results in generation of a predictable sequence of events, the analytics system may aggregate that sequence into a single event.

In some examples, the analytics system and/or the corresponding VFS 160 may include protections to prevent event data from being lost. In some examples, the VFS 160 may store event data until it is provided to the analytics system. For example, if the analytics system becomes unavailable, the VFS 160 may persistently store the event data until the analytics system becomes available.

To support the persistent storage, as well as provision of the event data to the analytics system, the FSVMs 162, 164, 166 of the VFS 160 may each include or be associated with the audit framework that includes a dedicated event log (e.g., tied to an FSVM-specific volume group) that is capable of being scaled to store all event data and/or metadata for a particular FSVM until successfully sent to the analytics system. In some examples, the audit framework for each FSVM 162, 164, 166 may be hosted by another component (e.g., application, process, and/or service) of the VFS 160 or of the distributed computing system or in communication with the distributed computing system 100 (e.g., computing node, an administrative system, a storage controller, the CVMs 124, 126, 128, the hypervisors 130, 132, 134, etc.)

For example, each respective audit framework 163, 165, 167 may manage a separate respective event log via a separate volume group (e.g., the audit framework 163 manages the volume group 1 (VG1) event log 171, the audit framework 165 manages the volume group 2 (VG2) event log 173, and the audit framework 167 manages the volume group 3 (VG3) event log 175). The VG1-3 event logs 171, 173, and 175 may each be capable of being scaled to store all event data and/or metadata for parts of the VFS 160 that are managed by the respective FSVM 162, 164, 166. In some examples, the data may be persisted (e.g., maintained) until successfully provided to the analytics system. While the VG1-3 event logs 171, 173, 175 are each shown in the respective local storages 136, 138, and 140, the VG1-3 event logs 171, 173, 175 may be maintained anywhere in the storage pool 156 without departing from the scope of the disclosure.

Figure 1B:
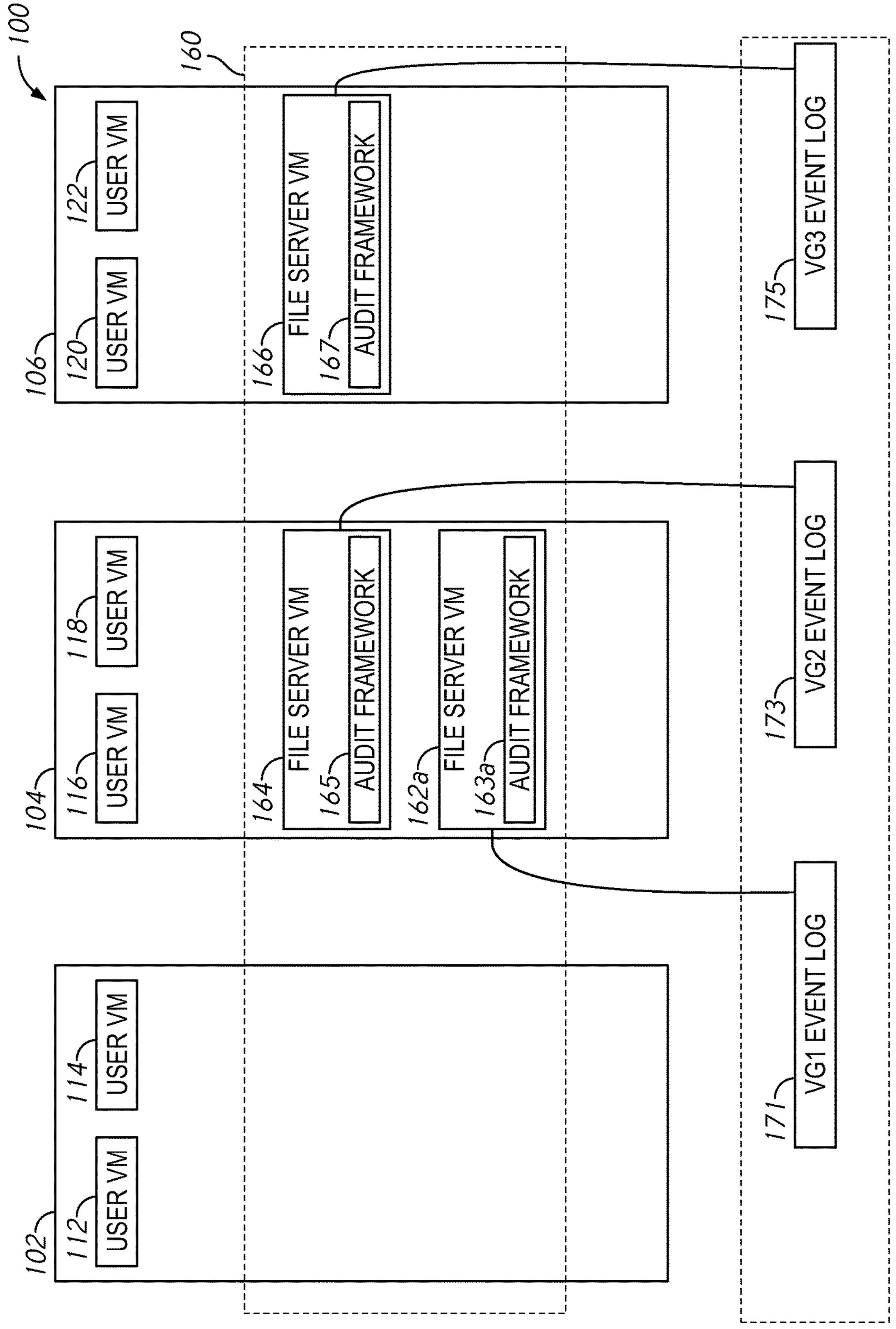
FIG. 1B is a schematic illustration of the distributed computing system of FIG. 1A showing a failover of a failed file server virtual machine (FSVM) in accordance with examples described herein.

In some examples, if one of the FSVMs 162, 164, or 166 fails, the failed FSVM may be migrated to another one of the host machines (e.g., computing nodes) 102, 104, or 106. In addition, the audit framework 163, 165, or 167 associated with the failed FSVM may also migrate over to the same computing node as the failed FSVM, and may continue updating the same VG1-3 event log 171, 173, or 175 based on the write index. FIG. 1B is a schematic illustration of the distributed computing system 100 of FIG. 1A showing a failover of a failed FSVM in accordance with examples described herein. As shown in FIG. 1B, the FSVM 162 has failed. In response to failure of the FSVM 162, the FSVM 162 may be migrated to the computing node 104 as FSVM 162*a*. In addition, the audit framework 163 may be migrated to the computing node 104 as the audit framework 163*a*. The FSVM 162 may mount the VG1 event log 171 to continue updating the event log based on a write index established by the audit framework 163. In some examples, rather than migrating as a separate VM, the file server VM 162's role may be assumed by the file server VM 164 and/or another file server VM. For example, responsive to failure of the FSVM 162, the FSVM 164 or an audit framework associated with the FSVM 164 may manage the VG1 event log 171. The VG1 event log 171 may be migrated to a volume group of the FSVM 164 and/or may otherwise be made accessible to the FSVM 164 and/or an audit framework associated with the FSVM 164.

The audit framework (e.g., each audit framework 163, 165, and/or 167) may include an audit queue, an event logger, an event log, and a service connector. The audit queue may be configured to receive event data and/or metadata from the VFS 160 via network file server or server message block server communications, and to provide the event data and/or metadata to the mediator (e.g., event logger). The event logger may be configured to store the received event data and/or metadata from the audit queue, as well as retrieve requested event data and/or metadata from the event log in response to a request from the service connector. The service connector may be configured to communicate with other services (e.g., such as the analytics VM system) to respond to requests for provision of event data and/or metadata, as well as receive acknowledgments when event data and/or metadata are successfully received by the analytics system. The events in the event log may be uniquely identified by a monotonically increasing sequence number, will be persisted to an event log, and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from an event log (e.g., the VG1-3 event logs 171, 173, 175) via their own service connectors (e.g., Kafka connectors). A service connector may have the responsibility of sending event data and metadata to the requesting service (e.g., such as the analytics system) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgment from its corresponding service and will periodically persist in-memory state. The persisted read index value may be read at start/restart (e.g., or after a service interruption) and used to set the in-memory read index to a value from which to start reading from. In some examples, when an event data record is read from the event log by a particular service, the event logger may stop maintenance of the event data record (e.g., allow it to be overwritten or removed from the event log).

During service start/recovery, a service connector may detect its presence and initiate an event read by communicating the read index to the event logger to read from the event log as part of the read call. The event logger may use the read index to find the next event to read and send to the requesting service (e.g., the analytics system) via the service connector.

The analytics system and/or the VFS 160 may further include architecture to prevent event data from being processed out of chronological order. For example, the service connector and/or the requesting service may keep track of the message sequence number it has seen before failure, and may ignore any messages which have a sequence number less than and equal to the sequence it has seen before failure. An exception may be raised by the message topic broker of the requesting service if the event log does not have the event for the sequence number expected by the service connector or if the message topic broker indicates that it has received a message with a sequence number that is not consecutive. In order to use the same event log for other services, a superset of all the proto fields will be taken to create a common format for an event record. The service connector will be responsible for filtering the required fields to get the ones it needs.

Other mechanisms can be used to implement an audit framework in other examples.

In some examples, the audit framework and event log may be tied to a particular FSVM and its own volume group. Thus, if an FSVM is migrated to another computing node, the event log may move with the FSVM and be maintained in the separate volume group from event logs of other FSVMs.

In some examples, the VFS 160 may be configured with denylist policies to denylist or prevent certain types of events from being analyzed and/or sent to the analytics system, such as specific event types, events corresponding to a particular user, events corresponding to a particular client IP address, events related to certain file types, or any combination thereof. The denylisted events may be provided from the VFS 160 to the analytics system in response to an API call from the analytics system. In addition, the analytics system may include an interface that allows a user to request and/or update the denylist policy, and send the updated denylist policy to the VFS 160. In some examples, the analytics VM 170 may be configured to process multiple channels of event data in parallel, while maintaining integrity and sequencing of the event data such that older event data does not overwrite newer event data.

In some examples, the analytics system may perform the metadata collection process in parallel with receipt of event data. The analytics system may reconcile information captured via the metadata collection process with event data information to prevent older data from overwriting newer data. In cases of reconciliation of the file system state caused by triggering an on demand scan, the state of the files index may be updated by both the event flow process and the scan process. To avoid the race condition, and maintain data integrity, when a metadata record corresponding to a storage item is received, the analytics system may determine if any records for the storage item exist, and if so, may decline to update those records. If no records exist, then the analytics system may add a record for the storage item.

The analytics system may process the metadata, event data, and configuration information to populate the analytics datastore. The analytics datastore may include an entry for each item in the VFS 160. In some examples, the event data and the metadata may include a unique user identifier that ties back to a user, but may not be used outside of the event data generation in some examples. In some examples, the analytics system may retrieve a user ID-to-username relationship from an active directory of the VFS 160 by connecting to a lightweight directory access protocol (LDAP) (e.g., for SMB, perform LDAP search on configured active directory, or on NFS, perform PDAP search on configured active directory or execute an API call if RFC2307 is not configured). In addition, rather than requesting a username or other identifier associated with the unique user identifier for every event, the analytics system may maintain a username-to-unique user identifier conversion table (e.g., stored in cache) for at least some of the unique user identifiers, and the username-to-unique user identifier conversion table may be used to retrieve a username, which may reduce traffic and improve performance of the VFS 160. Any mechanism to provide user context for active directory enabled SMB shares may help an administrator understand which user performed which operation as well as ownership of the file.

The analytics system may generate reports, including standard or default reports and/or customizable reports. The reports may be related to aggregate and/or specific user activity; aggregate file system activity; specific file, directory, share, etc., activity; etc.; or any combination of thereof. If multiple report requests are submitted at a same time and/or during at least partially overlapping times, examples of the analytics VM may queue report requests and process the requests sequentially and/or partially sequentially. The status of report requests in the queue may be displayed (e.g., queued, processing, completed, etc.). In some examples, the analytics system may manage and facilitate administrator-set archival policies, such as time-based archival (e.g., archive data based on a last-accessed date being greater than a threshold), storage capacity-based archival (e.g., archiving certain data when available storage falls below a threshold), or any combination thereof.

Although some examples for generating and providing metadata and event data are described herein, other mechanisms for obtaining and/or communicating metadata and/or event data from a file server may be used in other examples.

In some examples, the analytics system may be configured to analyze the received event data to detect irregular, anomalous, and/or malicious activity within the file system. For example, the analytics system may detect malicious software activity (e.g., ransomware) or anomalous user activity (e.g., deleting a large amount of files, deleting a large share, etc.).

Figure 2:
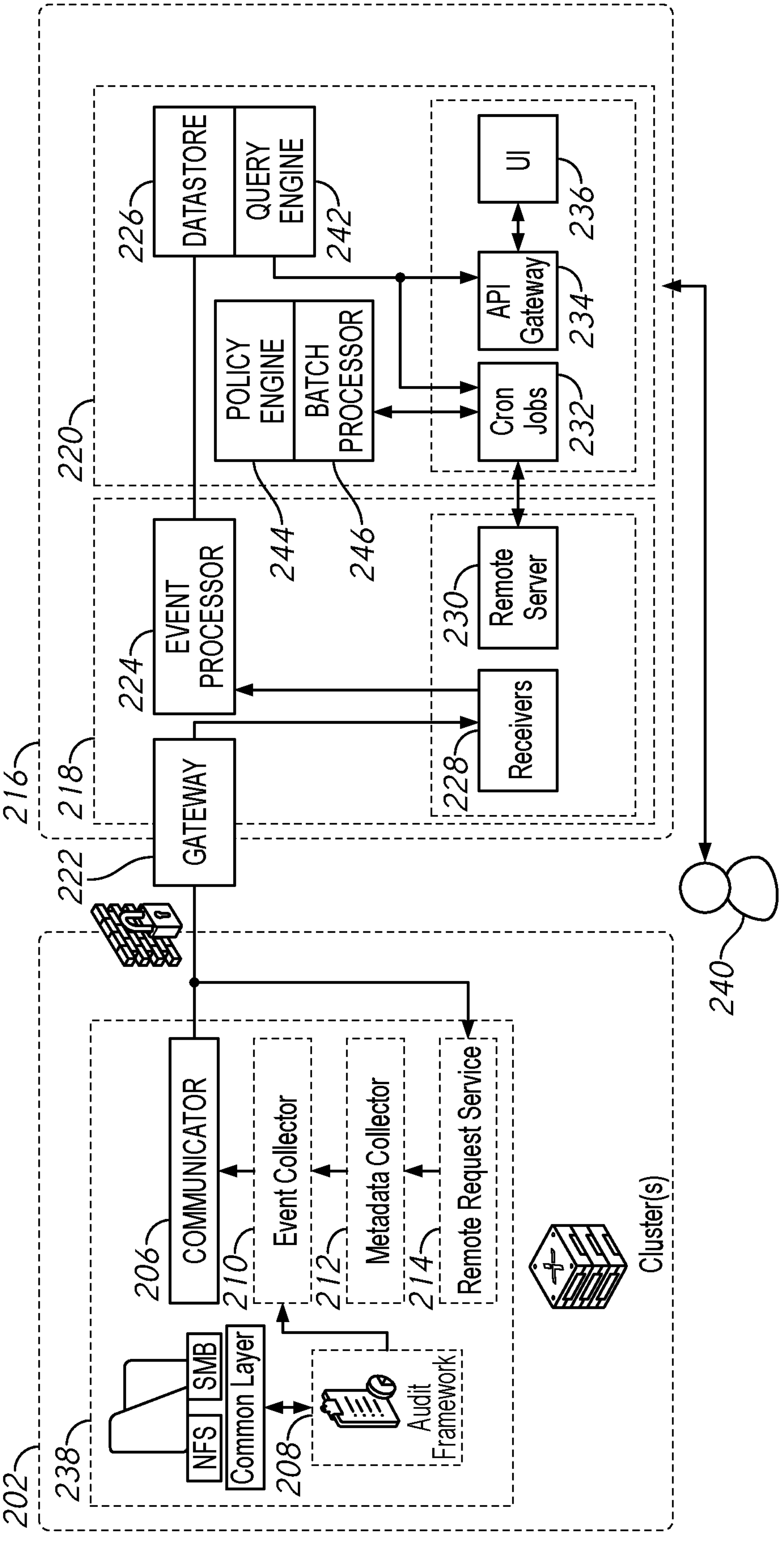
FIG. 2 is a schematic illustration of an analytics system in communication with a file server arranged in accordance with examples described herein.

FIG. 2 is a schematic illustration of an analytics system in communication with a file server arranged in accordance with examples described herein. The system includes a file server 202 in communication with analytics system 216. The file server 202 includes FSVM 238. The FSVM 238 may include protocol layer 204, communicator 206, audit framework 208, event collector 210, metadata collector 212, and remote request service 214. The file server 202 may be hosted on a cluster of computing nodes. The analytics system 216 may be a hosted system on one or more cloud service providers. The analytics system 216 may include gateway 222, virtual network 218, and virtual network 220. The virtual network 218 may include event processor 224, receivers 228, and server 230. The virtual network 220 may include batch processor 246, policy engine 244, datastore 226, query engine 242, job scheduler 232, API gateway 234, and user interface 236.

The components shown in FIG. 2 are exemplary. Additional, fewer, and/or different components may be used in other examples. Examples of the analytics system 216 are described herein as provided on AMAZON WEB SERVICES (AWS), although other cloud providers may be used in other examples. The file server 202 is illustrated as including an FSVM (e.g., FSVM 238), however, other file servers which may not include FSVMs may be used in other examples.

The file server 202 of FIG. 2 may be implemented by file servers described herein, such as the virtualized file server described with reference to FIG. 1A and FIG. 1B. For example, the FSVM 238 may be implemented by, or used to implement, one or more of the FSVMs 160, 162, or 164 of FIG. 1A. However, in other examples, other file servers may be used to provide metadata and event data to the analytics system 216.

File servers may collect metadata and event data and provide the metadata and event data to file analytics systems described herein. The metadata for a file system provided by a file server generally may include overall size, structure, and storage locations of parts of the file system managed by the file server, as well as details for each data item (e.g., file, folder, directory, share, owner information, and/or permission information). The details for each data item may include, for example, an identification of the data item, size, name, file type, owner, and/or permissions information. The metadata may be used by file analytics systems described herein to provide analytics regarding the file system. In the example of FIG. 2, the metadata may be collected by metadata collector 212, which may be a service operating within the FSVM 238. The metadata collector 212 for example, may be software (e.g., executable instructions configured to be executed by one or more processors of a host machine hosting the FSVM 238, for example). In some examples, the file server 202 may include a cluster of FSVMs, and each FSVM may include a metadata collector which may collect the metadata of the share, or portion of share, that is associated with that FSVM. The metadata from each FSVM may be communicated to the analytics system from each FSVM, and/or the metadata from each FSVM may be communicated to a leader FSVM on a leader node and provided to the analytics system. The metadata collector 212 may scan the file system, or a portion of the file system accessible to the FSVM 238, and may collect metadata associated with the files in the file system. Other mechanisms may be used to gather file system metadata in other examples.

Example file servers may include event collector(s), such as event collector 210 of FIG. 2. The event collector 210 may be implemented as software (e.g., executable instructions configured to be executed by one or more processors of a host machine hosting the FSVM 238, for example). File servers may utilize event collector(s) to record events that effect the file system. Examples of events include add, move, delete, modify, and rename. An event record may be made for each event which may include an identification of the item associated with the event (e.g., a file, folder, share), a user associated with the event, and an event time. Other attributes of the event may be included in the event record in other examples. In the example of FIG. 2, the event collector 210 may generate the event record and may include events for a share or portion of share associated with the FSVM 238. The event data from each FSVM may be communicated to the analytics system from each FSVM, and/or the metadata from each FSVM may be communicated to a leader FSVM on a leader node and provided to the analytics system.

In some examples, the file server may act to collect and/or transmit metadata and/or event data at the request of the analytics system. For example, the file server 202 may perform a metadata scan responsive to a request from analytics system 216. The remote request service 214 may be provided in the file server 202 to receive a request from the analytics system 216, which may be, for example, an API call, to initiate a metadata scan and/or to provide event data. The metadata collector 212 and/or event collector 210 may act in response to a request from analytics system 216 to perform a metadata scan and/or to provide event data. The analytics system 216 may request a metadata scan and/or may request event data using remote request service 214 in some examples.

File servers described herein may accordingly provide one or more file systems. A file system generally refers to an arrangement of files in folders which may be accessed in accordance with a namespace. For example, a path in the namespace may be used to access a particular file. Generally file servers described herein may have an ability to receive and respond to requests formulated in accordance with a file server protocol, such as NFS and/or SMB. So, the example file server 202 in FIG. 2 may include protocol layer 204. The protocol layer 204 may include an ability to receive an NFS and/or SMB request for files. In some examples, a common layer may be provided in the protocol layer 204 which may allow for the receipt of both NFS and SMB requests to access the namespace of files provided by the file server.

File servers described herein may include an audit framework, such as audit framework 208 of FIG. 2. The audit framework 208 may be one or more software services provided by the audit framework 208, such as by the FSVM 238 of audit framework 208. The audit framework 208 may include a dedicated event log (e.g., tied to an FSVM-specific volume group). The event log may be capable of being scaled to store all event data records and/or metadata for a particular FSVM or other portion of the file system, and may be stored according to a retention policy. The audit framework may include an audit queue, an event logger, an event log, and a service connector. The audit framework may receive event data records and/or metadata from the file server and to provide the event data records and/or metadata to the event collector 210 and/or metadata collector 212. In some examples, the event data records may be stored with a unique index value, such as a monotonically increasing sequence number, which may be used as a reference by the requesting services to request a specific event data record. The event logger may keep the in-memory state of the write index value in the event log, and may persist it periodically to a control record (e.g., a master block). When the audit framework is started or restarted, the master record may be read to set the write index.

File servers described herein may include a communication component, such as communicator 206. The communicator 206 may be implemented using a software service operating on a host machine that forms part of the file server 202. The communicator 206 may provide event and/or metadata to the analytics system 216. For example, the communicator 206 may provide data from the event collector 210 and/or metadata collector 212 to the analytics system 216. The communicator 206 may connect to the analytics system 216 over a network, such as the Internet. For example, the analytics system 216 may be a hosted solution residing in a cloud service provider, and the file server 202 may be an on premises file server which may communicate with the cloud service provider using communicator 206.

In this manner, during operation of a file server, metadata and event data regarding files and other items in a file system may be collected by the file server. The metadata and/or event data may be provided to an analytics system, such as the analytics system 216 of FIG. 2. The analytics system 216 may receive the metadata and/or events data at a gateway 222.

Analytics systems described herein may include one or more receiver processes, such as receivers 228 of FIG. 2. The receivers 228 may receive the metadata and/or event data provided by the file server through the gateway 222. Metadata and/or event data may be provided to an event processor 224. The event processor 224 may be implemented using a software process in the hosted cloud environment. For example, the event processor 224 may be implemented using AWS KINESIS and/or AWS LAMBDA. The event processor 224 may process a data stream from the file server and store metadata in a datastore, such as datastore 226. The metadata may be used, for example, to create a record in datastore 226 for each item in the file system. The records in the datastore 226 may be updated by the event processor 224 in response to event data from the file server.

Accordingly, file analytics systems described herein may maintain a datastore, such as datastore 226 of FIG. 2, which may contain records corresponding to data items in a file system. The records may be populated using metadata from the file system, and may be updated (e.g., maintained) based on event data from the file system. For example, a rename event from the file system may cause the event processor 224 to update a name of a data item in the datastore 226 in accordance with the event. The records in the datastore 226 may include, by way of example, an ID of the item (e.g., an inode number), a name, size, file type, owner, and most recent user. Other information may be included in other examples. In some examples, the datastore 226 may additionally or instead include a record associated with each event received from the file system. For example, the datastore 226 may include a record of an event including an ID of a data item (e.g., a file) involved in the event, a type of event, and updated information regarding the data item following the event (e.g., new name and/or location). The datastore 226 may be implemented using a database in some examples (e.g., an elastic search database). In some examples, the datastore 226 may be implemented using a data warehouse. For example, SNOWFLAKE may be used to implement datastore 226 in some examples.

A data warehouse generally refers to a data management system that may be used to store enterprise data and provide an analytical processing function to access the data. Accordingly, query engine 242 is depicted in FIG. 2 to represent processing functionality that may be used to query, access, write, or otherwise manipulate data in the datastore 226. The query engine 242 may be integral to the datastore 226 in some examples. The query engine 242 may be implemented using software, such as in a virtual machine or container or other virtualized computing system provided by a cloud provider. The query engine 242 may be implemented using computer readable media encoded with executable instructions which, when executed, cause one or more processors to perform the query engine functionality described herein. Generally, the query engine 242 may provide an analytical processing function of a data warehouse, including an ability to iteratively query the data in the data warehouse. A data warehouse may include a relational database and extraction, loading, and/or transformation software processes to prepare data in the data warehouse for analysis. The data warehouse may provide other functions for querying and/or analyzing data in some examples. Generally, a data warehouse may not include traditional indexes that may historically be used in relational databases to speed up access to the data. Rather, a system of iterative queries may be used to access the data in a data warehouse. These iterative queries and other functionality may be performed by query engine 242 in some examples.

Examples of analytics systems described herein may include a batch processor that may be utilized to execute batch operations on the file system based on the metadata and event data obtained by the file analytics system. For example, the analytics system 216 of FIG. 2 includes batch processor 246. The batch processor 246 may be implemented using AWS BATCH, for example. The batch processor 246 may be a software service that facilitates batch operations using data from the datastore 226. In some examples, the jobs that may be executed by the batch processor 246 are generated and/or scheduled by a scheduler, such as job scheduler 232 of FIG. 2.

Examples of analytics systems described herein may include a user interface. For example, the analytics system 216 of FIG. 2 may include user interface 236. The user interface 236 may allow a user, such as user 240 of FIG. 2, to access one or more reports or data based on data in the datastore 226. The user interface 236 may include a display and/or one or more input and/or output device(s) including an interface to receive text and/or click or other touch inputs. The user 240 may be a human user and/or may be one or more other software processes or computing systems which may interact with analytics system 216.

In some examples, data tiering policies may be determined, changed, and/or updated based on metadata and/or events data collected by file analytics systems. For example, the VFS 160 of FIG. 1A and/or FIG. 1B may implement data tiering. Data tiering generally refers to the process of assigning different categories of data to various levels or types of storage media, typically with the goal of reducing the total storage cost. Tiers may be determined by performance and/or cost of the media, and data may be ranked by how often it is accessed. Tiered storage policies typically may place the most frequently accessed data on the highest performing storage. Rarely accessed data may be stored on low-performance, cheaper storage. Storage tiers are often aligned with a stage in the data lifecycle. The main benefits of tiering data may be around how data is managed through its lifecycle. This is in line with best practice data management policies and can also contribute towards data center and storage management; often the success of tiering will be measured by cost impact.

Virtualized file servers, such as VFS 160 of FIG. 1A and/or FIG. 1B may implement storage tiering. For example, data may be stored in particular media in the storage pool 156 based on a tiering policy. For example, less frequently accessed data may be stored on a lower performing media. The file server VMs and/or controller VMs and/or hypervisors shown in FIG. 1A and/or FIG. 1B may be used to implement a tiering policy and determine on which media to store various data. For example, a tiering engine may be implemented using one or more of the nodes of the VFS 160 and may direct the storage and/or relocation of files to a preferred tier of storage. In one example, a first tier of storage may be local storage of each of the nodes. In some examples, the storage pool 156 may only, or primarily, include the local storage of each of the nodes, such as local storage 136, local storage 138, and local storage 140. Accordingly, in some examples, during normal operation, the data (e.g., files and folders) of the file system may be stored on local storage of the nodes. In some examples, another tier of storage may be networked storage, such as networked storage 110. Networked storage 110 may not be part of the storage pool during normal operation in some examples, although in other examples it may be. In some examples, another tier of storage may be cloud storage, such as cloud storage 108. Generally, each tier of storage may be associated with a particular access time and a particular cost.

File analytics systems may provide information to the file server based on captured metadata and/or events data regarding the stored files. The information provided by analytics based on metadata and events may be used by the VFS 160 to implement, create, modify, and/or update tiering policies and/or to tier data.

Individual files may be tiered as objects in a tiered storage (e.g., implemented as part of and/or as an extension of storage pool 156 of FIG. 1A and/or FIG. 1B). When a file is moved to the tiered storage, for example at the direction or request of a tiering engine implemented in VFS 160, the data may be truncated from the primary storage in order to save space. The truncated file remains on the primary storage containing the metadata, e.g., ACLs, extended attributes, alternative data stream, and tiering information. For example, pointers (such as URLs) to access the objects in the tiered storage containing the file data may be stored. When the truncated file on the primary storage is accessed by a client (e.g., by a user VM), the data is available from the tiered storage.

In some examples, the decision to tier and/or how and/or when to tier may be made at least in part by a policy engine implemented by an analytics system described herein. For example, policy engine 244 of FIG. 2 may be used. The policy engine may determine what files and when to tier based on the tiering policies, file access patterns, and/or attributes (e.g., metadata and/or event data obtained by the file server 202 and stored in datastore 226). The policy engine may keep track of the results of the tiering and untiering executions. For example, when the data is tiered or recalled by a tiering engine of the virtual file server, an event may be generated (e.g., Op code=kTier or kRecall). The tiering event may be sent through the data pipeline (e.g., by communicator 206 to gateway 222). In this manner, the file analytics system may store indications in the analytics datastore 226 that certain data has been tiered, and on which tier the data (e.g., files) reside. Reports and other displays may then be accurate as to the tiering status of files in the file server.

User interfaces (e.g., user interface 236 of FIG. 2) may provide an interface for a user to view, set, and/or modify the tiering profile. The user interface may be used to obtain information about tiering targets and credentials to be used by the virtualized file server (e.g., VFS 160) to connect and upload files to the tiers. The captured profile details may be communicated to the virtualized file server (e.g., to the tiering engine) via remote command. The user may also set the tiering policy and/or desired free capacity via the UI and this may be stored on an analytics datastore (e.g., datastore 226). Tiering criteria may be defined. For example, exclusion criteria may be defined (e.g., for file size, particular shares, and/or file types, such as categories or extensions) to specify certain items that may not be subject to the tiering policy. Another tiering criteria may be file size and priority for tiering. Another tiering criteria may be tier threshold age. Another tiering criteria may be file type (e.g., category and/or extension) and priority. The policy engine (e.g., policy engine 244) may be implemented using a cron job that may run periodically and may be based on tiering policy and desired capacity. The policy engine may wholly and/or partially determine the candidate files for moving to a particular tier. For example, job scheduler 232 may include and/or may be used to implement policy engine 244. The files which meet the criteria for a particular tier may be communicated to the tiering engine of the VFS via a remote command (e.g., to remote request service 214).

The tiering engine of the VFS (which may be hosted, e.g., on node 102, node 104, and/or node 106 of FIG. 1A and/or FIG. 1B) may tier the files to the specified tiering targets responsive to instructions from the analytics policy engine. For example, the policy engine of the analytics system may evaluate a capacity of the VFS. If a capacity threshold is exceeded, the analytics system may itself identify and/or communicate with the VFS (e.g., with the tiering engine) to identify files in accordance with the tiering policy for tiering. The files may be grouped for tiering by ID in each share and a task entry may be made for each group. The tasks may be executed by the tiering engine of the VFS, which may in some examples generate the tasks, and in some examples may receive the tasks from the analytics system (e.g., the policy engine). Once the files have been tiered the tiering engine may send audit events for each of the tiered files to the analytics system. The audit events may contain the object identifier (e.g., object ID and/or file ID) and the target to which the file is tiered. The tier audit event may be stored in the datastore (e.g., datastores 226 of FIG. 2) and the state of the file ID may be updated to "Tiered" when tiered. The audit event indicative of tiering failure may contain a reason for failure, and a file table entry for that file may be updated with the reason.

A user may (e.g., through user interface 236) set an automatic recall policy while setting up the tiering policy and/or at another time. A recall policy may specify when a file may be recalled from a tier back into the main storage pool and/or other tier. The recall policy may, for example, be based on how many accesses (e.g., reads and/or writes) within a period may trigger a recall. Other users (e.g., admins) may also initiate the recall of specific tiered files, according to the users' requests. In case of manual recall, a user may provide a file, directory and/or a share for recall. The request may be saved in an analytics datastore (e.g., datastore 226 of FIG. 2) and accessed by a backend recall process.

In some examples, the tiering engine of the file server may collect file server statistics used to make a tiering decision (e.g., network bandwidth, pending tiering requests). The analytics system may receive the file server statistics collected by the tiering engine, e.g., through one or more API calls and/or audit events. The file server statistics may be used by the analytics system (e.g., the policy engine 244) to control the number of tiering instructions provided to the file server.

Based on the collected information and current state of the objects, the analytics system (e.g., analytics system 216, such as by using policy engine 244) may calculate the projected storage savings using a particular tiering selection on a time scale. This information may aid users to configure snapshot and tiering policies for most effective utilization of the file server, balancing between performance and cost in some examples.

Accordingly, tiering engines in a file server may utilize file analytics determined based on collected metadata and/or events data from the file server to make decisions on which files to tier and subsequently truncate in some examples from the primary storage. File analytics systems may additionally or instead decide to untier files based on user defined recall policy (e.g., based on access pattern as determined using collected event data and metadata) and/or based on manual trigger. The policy engine of an analytics system may generally include a collection of services which may work together to provide this functionality. The policy engine may execute the tiering policy in the background, and call file server APIs to tier and recall files. The policy engine may keep track of tiered files and/or the files in the process of being tiered or recalled.

Figure 3:
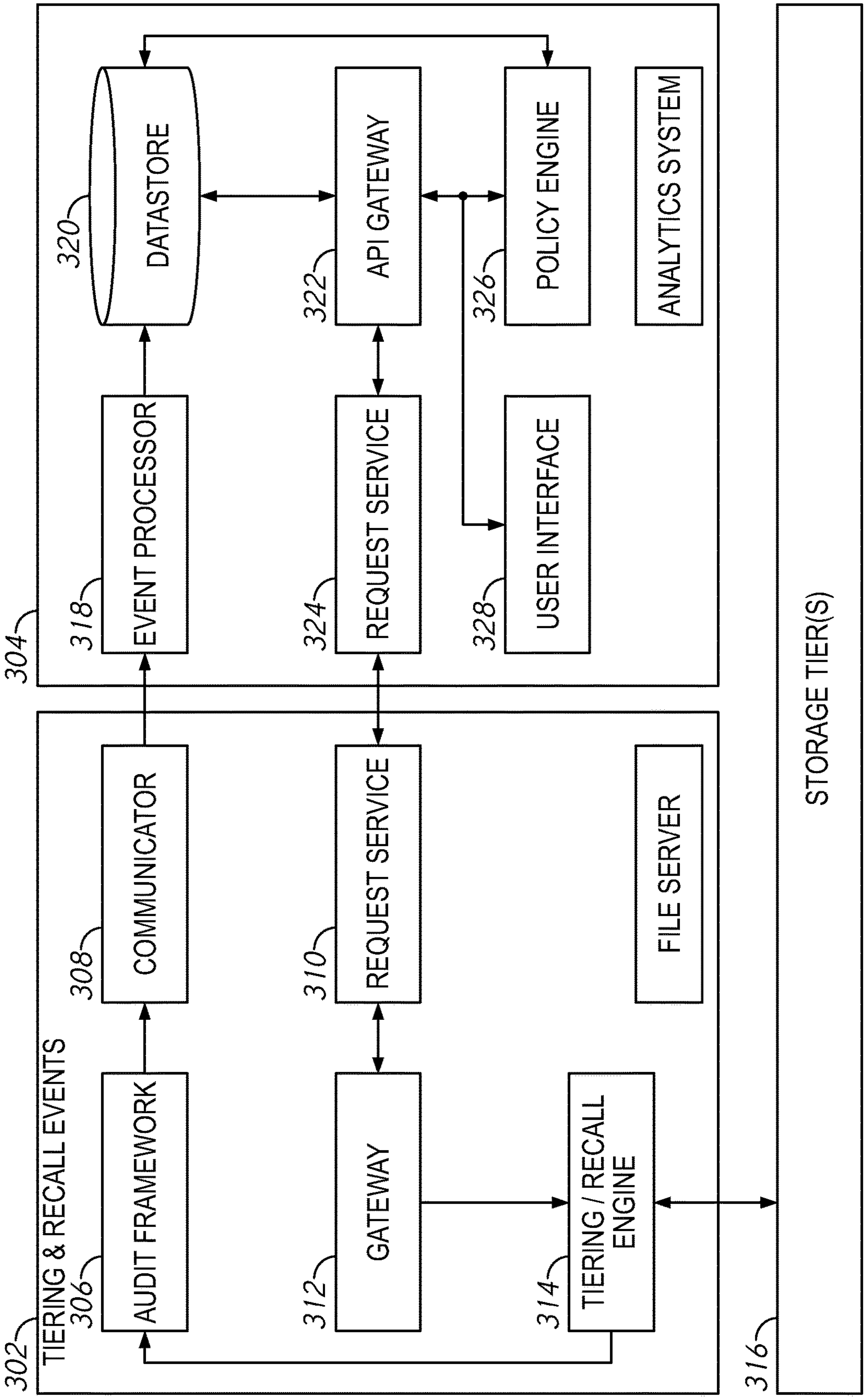
FIG. 3 is a schematic illustration of a system arranged in accordance with examples described herein.

FIG. 3 is a schematic illustration of a system arranged in accordance with examples described herein. The system of FIG. 3 includes file server 302 in communication with analytics system 304. The file server 302 includes audit framework 306, communicator 308, request service 310, gateway 312, and tiering engine 314. The analytics system 304 includes event processor 318, datastore 320, API gateway 322, request service 324, policy engine 326, and user interface 328. The file server 302 is additionally in communication with storage tier(s) 316.

The components shown in FIG. 3 generally may be implemented using software (e.g., executable instructions, which, when executed, cause one or more processors to perform the functions described). The components in FIG. 3 are exemplary only. Additional, fewer and/or different components may be used in other examples. The file server 302 of FIG. 3 may be implemented by and/or used to implement one or more file servers described herein, such as the system described with respect to FIG. 1A and FIG. 1B, and/or file server 202 of FIG. 2. For example, the components of file server 302 may be implemented on each file server virtual machine (FSVM) used to provide a distributed file server in some examples, such as the file server virtual machines shown in FIG. 1A and FIG. 1B. The analytics system 304 may be used to implement and/or may be implemented by analytics systems described herein, such as the analytics system 216 of FIG. 2.

Generally, file servers described herein may support tiering. In the example of FIG. 3, the file server 302 may include audit framework 306. The audit framework 306 may operate in an analogous manner as the audit framework 208 described with respect to FIG. 2. Generally, the audit framework 306 may track events that occur in a file system hosted by the file server 302. The audit framework 306 may provide these events to communicator 308 for transmission to analytics system 304. In addition to events involving user manipulation of files in the file system (e.g., read, write, rename, delete, create), the audit framework 306 may track tiering and recall events. For example, the audit framework 306 may provide events relating to the tiering and/or recall of a file. Examples of tiering and recall events include that a particular file was tiered to a particular tier of storage and/or that a particular file was recalled to a particular tier of storage. These tiering and recall events may also be communicated by communicator 308 to the analytics system 304. The communicator 308 may generally be implemented using any communications service that may be used to communicate with another computing system such as analytics system 304.

The file server 302 of FIG. 3 further includes a request service 310. The request service 310 may be implemented using a service for receiving requests from a computing system, such as an API call in some examples. The request service 310 may receive requests from the analytics system 304. The requests from analytics system 304 may be based on the file system metadata and/or event data analyzed by the analytics system 304. In some examples, the requests may include requests to tier particular files and/or a schedule for tiering files. In this manner, the analytics system 304 may provide requests to the file server 302 to tier one or more files during one or more time periods. The request service 324 and/or request service 310 may be implemented using one or more remote command clients, e.g., RCC. The file server 302 of FIG. 3 may include a gateway 312 that may receive requests from the request service 310 and provide commands or other instructions to a tiering engine 314. The gateway 312 may be optional in some examples and may function to translate or otherwise communicate information from the request service 310 into actionable commands for the tiering engine 314.

Examples of file servers described herein may include a tiering engine which may tier files to a particular target(s). The tiering engine 314 of FIG. 3 may be a software service which may conduct the tiering—may move files from one tier of storage to another and/or may recall files from one tier of storage to another. The tiering engine 314 may additionally truncate tiered files, such that a truncated version of the tiered file remains in primary storage. The tiering engine 314 may be in communication with the audit framework 306 to provide tiering event data. The tiering engine 314 may send audit events for each of the tiered files that contain an object identifier that has been tiered to a target tier. The audit events may be processed by audit framework 306 and sent to the analytics system 304. The tiering audit event may be stored in an audit table, for example, the event processor 318 may store the tiering audit event in an audit table in datastore 226. In some examples, the tiering engine 314 may provide an indication that a file was successfully tiered to a target tier and/or that tiering failed. The indication may be provided with the event data to audit framework 306 and provided to analytics system 304. Responsive to an indication of a successful tiering event, a state may be updated to indicate successful tiering (e.g., 'tiered') in the datastore 320. For example, the datastore 320 may contain a variety of attribute information associated with files (e.g., a files table). One attribute associated with the files may be a tiering status (e.g., tiered and/or failed tiering attempt). In some example, a reason for the tiering failure may also be provided by tiering engine 314 and stored in datastore 320.

File servers described herein, such as file server 302 of FIG. 3, may additionally collect operational statistics and provide the statistics to an analytics system, such as analytics system 304 of FIG. 3. Examples of operational statistics include network bandwidth and/or number of pending tiering requests. These operational statistics may be obtained by analytics system 304 using API calls in some examples and/or may be provided as audit events and stored in datastore 320.

The file server 302 of FIG. 3 may include storage tier(s) 316. Generally, any number of storage tiers may be used, including 1, 2, 3, 4, 5, 6, or more storage tiers. Each storage tier may generally be a location and/or type of storage that may be associated with a particular capacity, access time, and/or cost, in some examples. Data (e.g., files) may be identified for tiering based on an evaluation of the system performance under various tiering configurations—generally system operators may endeavor to optimize access time while reducing the overall cost of the storage solution and remaining within the capacity constraints of the various tiers. In some examples, a first (e.g., primary) tier may be local storage devices of computing nodes used to host the file server 302. The local storage nodes may have generally fast access time for accessing the storage items, but may generally be a higher cost storage option. In some examples, another storage tier may be networked storage—e.g., storage available on one or more networked storage devices. The access time may be less for networked storage than for the local storage devices, for example, due to the time used to send and receive requests over the network. However, the networked storage may in some examples be cheaper and/or more abundant. In some examples, another storage tier may be cloud storage—e.g., storage available from one or more cloud service providers. In some examples, the cloud storage may have a longer, less desirable, access time than local storage, but may be cheaper and/or more abundant. Various different types or kinds of cloud storage and/or networked storage may also be used, and may make up additional tiers.

In examples described herein, analytics systems may analyze file system metadata and/or event data and may transmit requests to a file server to tier selected files in accordance with a particular schedule and/or at particular times in some examples.

The analytics system 304 includes event processor 318. The event processor 318 may be analogous to the event processor 224 of FIG. 2, for example. The event processor 318 may receive metadata and/or event data from the file server 302 and may process those events for storage in datastore 320. The datastore 320 may accordingly maintain a variety of data based on the metadata and/or event data received from the file server 302. For example, the datastore 320 may maintain a file table which includes information about each file in the file server 302, including events involving the file. Other information which may be stored in the file table include, file ID (e.g., inode ID), file name, file type, file extension, file size, owner, and/or most recent event. The datastore 320 may be analogous to the datastore 226 and may be implemented using, for example, one or more databases and/or data warehouses, such as SNOWFLAKE.

The analytics system 304 may include API gateway 322. The API gateway 322 may be utilized to generate API calls, or other requests or queries, that may be provided to request service 324 and/or datastore 320. The analytics system 304 may include request service 324 which may generate requests for transmission to the file server 302. For example, the request service 324 of analytics system 304 may communicate with the request service 310 of file server 302. The request service 324 may receive communications from the file server 302, such as from the request service 310.

The analytics system 304 may include a user interface 328. The user interface 328 may be analogous to the user interface 236 of FIG. 2 and may provide an input mechanism for a user (e.g., a human user or another software process) to input information to the analytics system 304. The user interface 328 may cause the display of one or more search fields, text entry fields, buttons, or other selectors, to receive information from one or more users. The user interface 328 may cause the display of analytics information—such as tiering status, estimated tiering results, or other information about the file system provided by file server 302.

In some examples, the user interface 328 may be used for a user to establish a tiering policy. The user may provide, through user interface 328, information about tiering targets, such as storage tier(s) 316 (e.g., names, types, costs, access times, and capacity of each tier). The user may provide access credentials for file server 202 and/or storage tier(s) 316 to the analytics system 304 using user interface 328. In some examples, a user may provide a tiering policy and/or desired free capacity for each tier through the user interface 328. In some examples, the tiering policy and/or desired free capacity for each tier may be predetermined. The tiering policy and/or desired free capacity for each tier may be stored, for example, in datastore 320. The tiering policy may include information regarding a target access time or overall storage cost for the system. The tiering policy may include information about the files which may be tiered and/or may be excluded from tiering. For example, certain file types, shares, and/or owners may be excluded from tiering. Those files may not be tiered in accordance with the operation of the tiering engine 314. The exclusion criteria may be stored, for example, in datastore 320. The tiering policy may describe a threshold file access frequency for tiering (e.g., files last accessed greater than a threshold time ago may be eligible for tiering).

Examples of file analytics systems described herein may have a policy engine, such as policy engine 326 which may be implemented by and/or used to implement policy engine 244 of FIG. 2. The policy engine 326 may access data in the datastore 320 (e.g., through API gateway 322 and/or using one or more queries). The datastore 320 may include data regarding the files in the file server 302—e.g., object ID, name, size, age, and/or a variety of other data regarding the each file. The policy engine 326 may identify files for tiering using a variety of selection criteria. The identification of files for tiering may be based on data in the datastore 320—e.g., data based on metadata and/or event data received from the file server. Files may be selected by the policy engine 326 for tiering based on one or more factors. One example factor is age. Age of the file (e.g., based on creation date and/or last accessed date) may be used by the policy engine 326 as a factor for selecting a file for tiering. The age of the file may be accessed by the policy engine 326 from the datastore 320. The datastore 320 may include, for example, a file table which may include a last access time for the file and a creation date of the file. Another example factor is size. Files may be selected by the policy engine 326 for tiering based on their size. In some examples, the policy engine 326 may select files having greater than a threshold size or a size within a range. The size of the file may be accessed by the policy engine 326 from the datastore 320. The datastore 320 may include, for example, a file table which may include a size for each file in the file server. Another example factor is exclusion criteria. Exclusion criteria may be established by a user, for example through user interface 328. Exclusion criteria may refer to criteria for files that should not be selected for tiering, even if the file otherwise meets the tiering criteria. Examples of exclusion criteria include MIME type, file type, file owner, permissions on the file, and/or particular shares.

Examples of file analytics systems described herein may include user behavior as one or more factors in selecting files for tiering. For example, analytics systems described herein may access data based on the metadata and/or event data received from a file server. Accordingly, the analytics system may access audit events relating to user behavior regarding files, and this information may be used, e.g., by policy engine 326, in selecting files for tiering. Examples of user behavior which may be used include whether specified actions have occurred (and/or not occurred) for a file within a particular time period. For example, files that have not been accessed by particular users within a particular time frame (e.g., 5 days) may be selected for tiering. As another example, files that have only been read (e.g., not modified) within a particular time frame (e.g., 5 days). Generally, any particular time frame and/or user action may be used as a factor in selecting files for tiering by the policy engine 326. For example, the policy engine 326 may access the datastore 320 which may contain audit records for actions performed by particular users on the files in the file server. This information may be used by the policy engine 326 to select files for tiering.

In some examples, content of the file may be used as a factor by the policy engine 326 in selecting files for tiering. For example, files containing personal identifiable information (PII) may be selected (or excluded) by the policy engine 326 for tiering. The policy engine 326 may access information in datastore 320 regarding the files. In some examples, certain file content, such as PII, may be indicated in the datastore 320 and used by the policy engine 326 as a factor in selecting files for tiering.

In some examples, the policy engine 326 may be implemented using a cron job that may run periodically and/or at scheduled times on the analytics system 304. For example, the policy engine 326 may be scheduled to run at times when the file server 302 is predicted to have processing capacity for tiering (e.g., less busy times). For example, the policy engine 326 may run on weekend days or overnight in some examples. In some examples, the policy engine 326 may be wholly and/or partially implemented using a batch processor, such as batch processor 246 of FIG. 2. In some examples, the batch processor may aid in identifying batches of files and/or instructing the file server to tier batches of files. The policy engine 326 may utilize a variety of methods to implement a tiering policy. In this manner, the policy engine 326 may identify files for tiering. Requests to tier the files may be provided by the request service 324 to the request service 310 (e.g., using remote commands or other communication techniques), and the files tiered using the tiering engine 314.

Examples of policy engines described herein may select files for recall and provide requests to recall files to file servers. For example, the policy engine 326 may access the datastore 320 and select files for recall from tiered storage (e.g., from secondary storage) back to primary storage. It may be tedious for system administrators to manually identify files for recall from tiered storage; accordingly, it may be advantageous for a policy engine to utilize recall techniques described herein to select files automatically for recall.

In some examples, a recall policy may also be set through user interface 328 and/or provided by policy engine 326. The recall policy may specify, for example, how many accesses (e.g., reads) may occur to trigger a recall. For example, a threshold number of accesses may be specified. After a file has been tiered, if it is accessed the threshold number of times and/or the threshold number of times within a particular time period, the policy engine 326 may request a recall of the file. The request for recall may be provided to the file server 302, and the tiering engine 314 may implement the recall. In some examples, a user may initiate a manual recall through the user interface 328, for example by providing a file, folder (e.g., directory), and/or share. The request may be stored in datastore 320 and may be acted on by the policy engine 326 when the policy engine 326 runs.

In some examples, analogous criteria may be used by a policy engine described herein to select files for recall as the criteria for selecting files for tiering. For example, policy engines described herein may select files for recall based in some examples on particular users. In some examples, the policy engine 326 may select files (e.g., files whose ID and/or other associated data is stored in datastore 320) owned by and/or last acted on by users from a particular enterprise group (e.g., accounting group and/or human resource group). In some examples, other files owned by and/or last acted on by other users may not be recalled, even if they otherwise meet the criteria for recall (e.g., number of attempted accesses within a particular time period). In some examples, a policy engine may select files for recall based on particular shares. Files belonging to particular shares may be selected for recall. In some examples, a policy engine may select files for recall based on file extension (e.g., .doc, .docx, .xls, .ppt). In some examples, files belonging to other shares may not be selected for recall, even if they otherwise meet the criteria (e.g., number of accesses) for recall. In some examples, a policy engine may select files for recall, based on file size. For example, files less than a threshold size may be eligible for recall, or within a particular size range. Accordingly, the policy engine 326 may select files for recall when they are eligible files (e.g., in accordance with particular users, extensions, shares, and/or file sizes) and they meet the recall criteria (e.g., accessed more than a threshold number of times within a predetermined time period).

In some examples, the analytics system 304 may provide a user with information used to provide, set, and/or update a tiering policy. For example, the user interface 328 may be used to display information useful in setting a tiering policy. Examples of such information include a calculated projected storage savings, storage savings over time, and/or overall cost of storage in different tiering configurations. This may aid a user in setting a tiering policy. The user may input a tiering policy to the user interface 328 based on information provided through the user interface 328 in some examples.

Examples of systems described herein may accordingly include a policy engine which may implement a tiering policy. Analytics systems described herein may leverage analytics based on metadata and event data received from a file server to make decisions regarding which files to tier and truncate from primary storage. The analytics system may additionally or instead decide to untier (e.g., recall) files based on recall policies and/or manual trigger. Tiering engines described herein may execute a tiering policy in the background, and may communicate with the file server to tier and recall files—e.g., by calling APIs of the file server. Tiering engines may maintain a record of the tiered files, and/or the status of the tiering process for each file (e.g., tiering in process, tiering complete, tiering failed).

Figure 4:
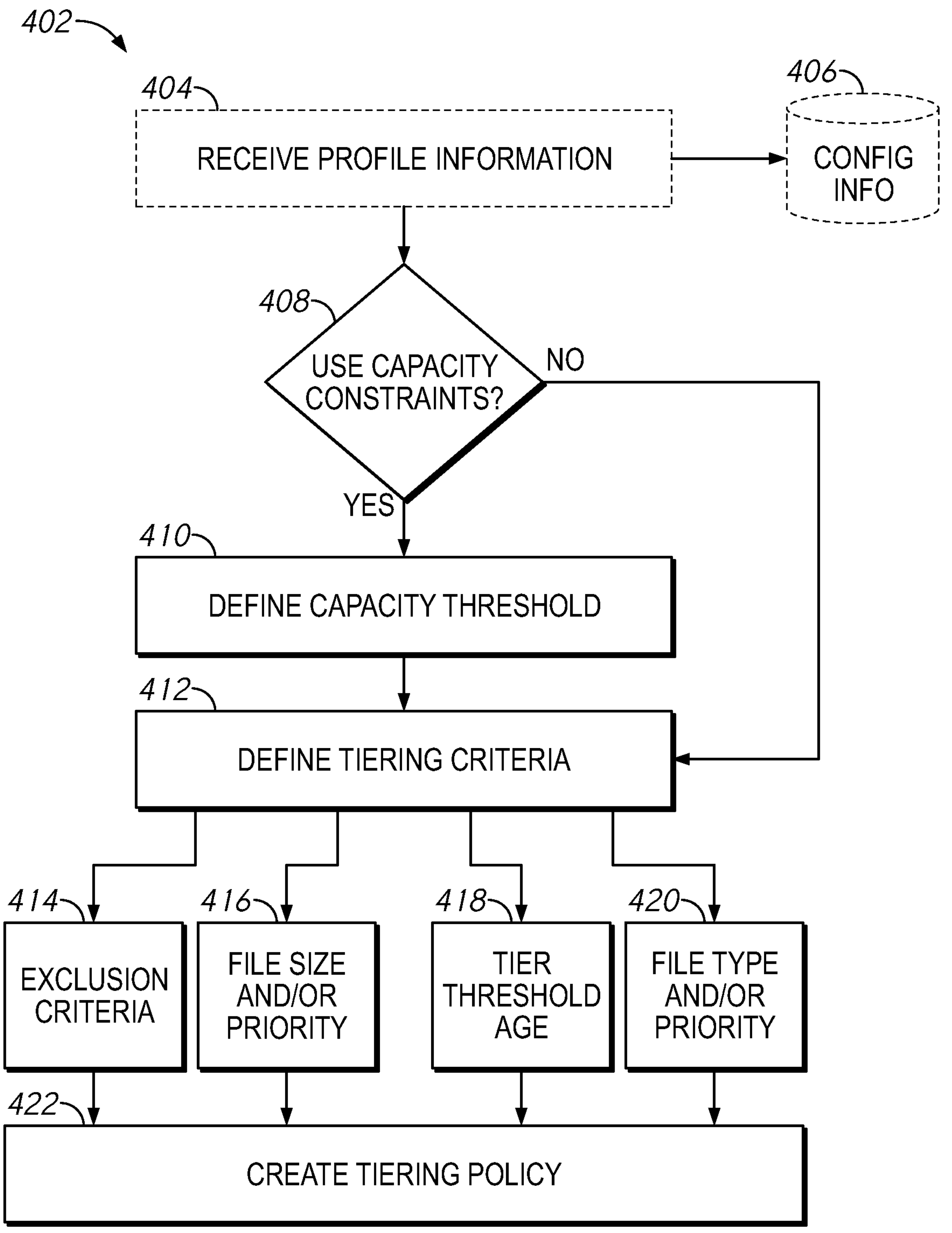
FIG. 4 is a flowchart illustrating a method of setting a tiering policy in accordance with examples described herein.

FIG. 4 is a flowchart illustrating a method of setting a tiering policy in accordance with examples described herein. The method 402 includes block 404, “receive profile information.” The method 402 may store information in configuration database 406. Block 404 may be followed by block 408, “use capacity constraints?”. If capacity constraints are used, the method 402 may include block 410, “define capacity threshold.” If capacity constraints are not used, the method 402 may move to block 412 “define tiering criteria.” If capacity constraints are used and capacity threshold defined, the method 402 may move to block 412. The tiering criteria may include values and/or parameters for block 414 “exclusion criteria,” block 416, “file size and/or priority,” block 418 “tier threshold age,” and/or block 420 “file type and/or priority.” Following definition of tiering criteria, the method 402 may include block 422, “create tiering policy.” The blocks shown in FIG. 4 are exemplary only. Additional, fewer, and/or different blocks may be used in other examples. The blocks may occur in other orders in other examples. Any number of tiering criteria may be defined in block 412 including some, all, or none of those shown in FIG. 4.

The method 402 of FIG. 4 may be implemented, for example, using analytics system 216 of FIG. 2, and/or analytics system 304 of FIG. 3. The user interface 236 and/or user interface 328 may be utilized to implement method 402, for example. The configuration database 406 may be used to implement and/or may be implemented by datastore 226 and/or datastore 320, for example. While examples of method 402 described herein may be described with reference to receipt of user input, in some examples, the information gathered during method 402 may be predetermined and/or stored as an initial configuration in the configuration database 406. In some examples, some or all of the information gathered during method 402 may be requested and/or received from a file server described herein.

In block 404, profile information may be received, for example, through user interface 236 and/or user interface 328. Examples of profile information which may be generated and/or received in block 404 may include profile id, profile name, user id, share IDs, access key ID, access certificates and/or credentials for file server(s) used in the tiering process, names and/or locations of any data stores to be used in tiering processes. In some examples, some or all of the profile information may not be provided by an external user, but an analytics system may obtain the profile information from one or more file servers in block 404. For example, the analytics system 304 may communicate with file server 302 to obtain some or all of the profile information.

Profile information may be stored in configuration database 406. The configuration database 406 may additionally be used by policy engines described herein to store and/or track a status of tiering requests (e.g., queued, submitted, failed, completed).

In block 408, a determination may be made whether a tiering policy may utilize capacity restraints. For example, a user may be prompted (e.g., through a display including a selection box, or other selector) to indicate whether capacity constraints will be used. If yes, in block 410 a capacity threshold may be defined. Capacity constraints generally refer to a capacity threshold below which tiering will not be implemented—e.g., a capacity threshold above which tiering may be permitted and/or triggered. For example, the capacity threshold may refer to a percentage of file server capacity that may trigger tiering operations. In this manner, when primary storage (e.g., local storage) is below the capacity threshold (e.g., 80% in some examples, 75% in some examples, 50% in some examples), tiering may not be used. This may save computational time and expense in situations where the primary storage may not be full enough to justify tiering.

Tiering criteria may be defined in block 412. For example, a user may be prompted (e.g., through a display including a selection box, text input box, or other input mechanism) to provide various tiering criteria. Examples of criteria include exclusion criteria in block 414. Exclusion criteria may refer to criteria for files that will not be requested to tier, even if the files otherwise meet the criteria for tiering. For example, a threshold file size may be set as an exclusion criteria. Files below the threshold file size may not be tiered. This may avoid overhead in the tiering process for tiering small files. In some examples, a size criteria may be 64 KB—e.g., files having a size less than 64 KB may not be tiered. Other thresholds may be used in other examples. In some examples, the exclusion criteria may include one or more particular shares. Files located on the share(s) specified in the exclusion criteria may not be tiered. This may allow a system (e.g., a user) to specify a high-value or complex share as excluded from the tiering process, ensuring that access to files in that share will not be impacted by the tiering processes described herein. In some examples, the exclusion criteria may include file type. File types may include, for example, file extensions, MIME types, applications used to generate the files, and/or categories of files (e.g., images, videos, text, encrypted files, etc.). Certain file types may be excluded from tiering, to ensure those file types are not impacted by tiering processes described herein and remain located on a primary storage tier. In some examples, multiple exclusion criteria may be used. In some examples, no exclusion criteria may be used. While described as exclusion criteria, the exclusion criteria may in some examples be expressed as inclusion criteria—e.g., the criteria may be expressed as those attributes of files which are eligible to be tiered, rather than those that are ineligible for tiering.

The tiering criteria may be used to create a tiering policy in block 422. The tiering policy may be created, for example, by storing the tiering criteria and/or capacity constraints in storage accessible to a policy engine described herein. For example, the configuration database 406 may store tiering criteria and/or capacity constraints.

During operation, policy engines described herein, such as policy engine 244 and/or policy engine 326, may utilize tiering policies created in accordance with method 402 to identify files for tiering. The policy engine may implement tiering on an automatic and/or manual schedule. The schedule may additionally be set during method 402 in some examples.

Accordingly, examples of policy engines described herein may identify files for tiering in accordance with one or more tiering policies. The files may be identified based on metadata and/or event data received from a file server and stored in a datastore. Data in the datastore may be maintained in accordance with the metadata and/or event data. For example, the datastore may include a file size, age, and/or last access time for the files of the file system.

File systems which may be used in accordance with examples described herein may be large. It may not be unusual, for example, for millions of files to be included in a file server with different sizes and varying ages. When a tiering engine communicates with a file server to request that files be tiered, one or more remote API calls or other communication may be used. When the file server tiers files, again some computational overhead is incurred, such as one or more PUT calls to tier the files. When tiering, there may also be metadata overhead on the file server as the metadata for files is changed. Complex logic which may be used to identify files for tiering may also utilize significant resources (e.g., compute and/or memory) to apply weighted logic, for example, based on time and/or size—particularly when the number of files may be large.

Accordingly, examples of policy engines described herein may select files for tiering in a manner which may more efficiently utilize the resources available for tiering. In some examples, policy engines described herein may implement a selection technique which may identify an oldest and/or least recently accessed batch of files. Within that batch of files, a subset of largest files may be selected for tiering. In a next run, the policy engine may again select a batch of next oldest and/or least recently accessed files. Within that batch of files, a subset of largest files may be selected for tiering. In this manner, overhead may be reduced for tiering decisions while providing more effective use of the tiering resources of the file server.

Moreover, file servers may constantly be undergoing changes during use (e.g., write, append, truncate) and the age and/or last access time (e.g., time of last read and/or write) of files may be constantly changing. There may be a time gap between when a file is selected for tiering and when the actual tiering is implemented. During this time, the attributes of the file may have changed, making it a less desirable tiering target in some examples. Accordingly, policy engines described herein may advantageously in some examples process batches of files for tiering (e.g., files from a first-time window, largest files in that batch, then files from another time window). In this manner, a gap between a time a file is selected for tiering and when the file is tiered may be reduced, because multiple smaller tiering decisions may be made over time (e.g., one for each time window) rather than a single decision time.

Figure 5:
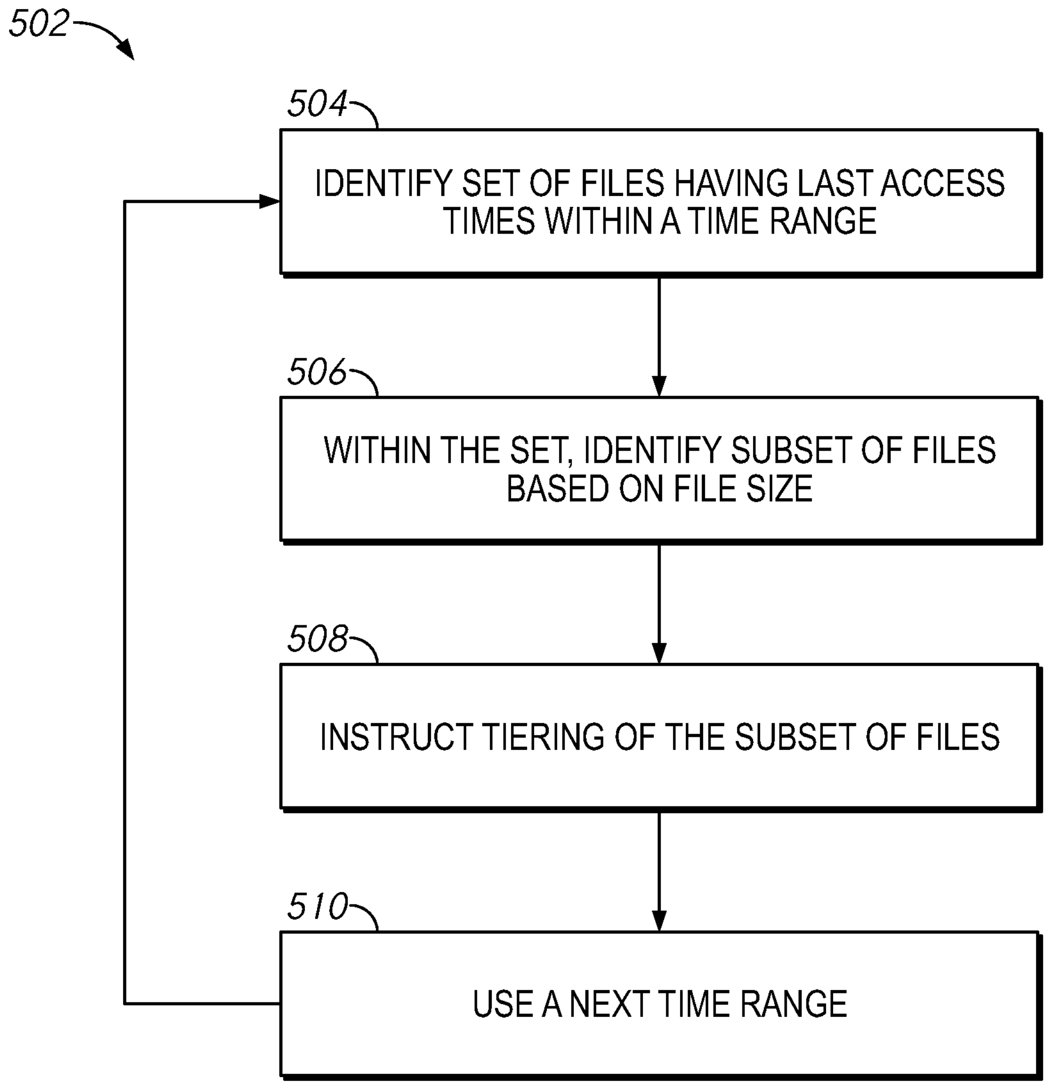
FIG. 5 is a flowchart of a method for selecting files for tiering in accordance with examples described herein.

FIG. 5 is a flowchart of a method for selecting files for tiering in accordance with examples described herein. The method 502 includes block 504 which recites "identify set of files having last access times within a time range." Block 504 may be followed by block 506, "within the set, identify subset of files based on file size." Block 504 may be followed by block 508, "instruct tiering of the subset of files." Block 508 may be followed by block 510, "use a next time range." Block 510 may be followed by block 504, e.g., the method may be repeated using another time range. The blocks of FIG. 5 are exemplary only. Additional, fewer, and/or different blocks may be used in other examples, and the blocks may be differently ordered in other examples.

The method 502 of FIG. 5 may be performed, for example, by a policy engine and/or other components of an analysis system described herein. For example, the policy engine 244 of the analytics system 216 of FIG. 2 may perform method 502. The policy engine 244 may be implemented using executable instructions stored on computer readable media, which, when executed by one or more processor(s), perform file selection for tiering in accordance with method 502. Similarly, the policy engine 326 of the analytics systems 304 of FIG. 3 may perform method 502. The policy engine 326 may include executable instructions stored on computer readable media, which, when executed by one or more processor(s), perform file selection for tiering in accordance with method 502.

In block 504, a set of files having last access times within a time range may be identified. For example, the policy engine 326 of FIG. 3 may identify files having last access times greater than a threshold time (e.g., more than one year ago in some examples, more than two years ago in some examples, more than one month ago in some examples). Other time thresholds may be used in some examples. In some examples, the policy engine may identify in block 504 files having last access times and/or ages within a range (e.g., between one month and one year ago). Generally, the time thresholds and/or ranges used in FIG. 5 may be subsets of a tier threshold age which may have been set in a tiering policy, for example in accordance with FIG. 4 in block 418. For example, a tiering policy (e.g., set by a user or other process) may specify to tier files having last access times more than one month ago. The time range used in FIG. 5 may be a portion of this tiering threshold—e.g., the time range used in block 504 may be files having access times more than one year ago. Accordingly, the method 502 may start with the oldest set of files (or oldest accessed set of files) in an overall group of files eligible for tiering in accordance with a tiering policy. The files having an age and/or last access time within the time range may be identified, for example, by accessing data stored based on metadata and/or event data received from a file server. For example, the policy engine 326 of FIG. 3 may access datastore 320. The datastore 320 may include a files table which may store, in association with each object ID for each file, a creation date and/or last access date. The policy engine may identify files having creation dates and/or last access dates within the range used in block 504.

In some examples, block 506 may optionally additionally and/or instead be used. In block 506, the policy engine (e.g., policy engine 326 and/or policy engine 244) may identify files having a particular size. A size range and/or size threshold may be used. In some examples, a size threshold is used, and the policy engine may identify files within the sub set having a file size greater than the threshold. In this manner, a batch or group of files may be identified (e.g., by a policy engine) that meet a particular size threshold and/or range. That batch or group of files may also have an access time and/or age that meet a particular size threshold and/or range. The size threshold used in block 506 may be equal to or less stringent than a size threshold set for a tiering policy, e.g., in FIG. 4. For example, a user may set a tiering policy that may allow for tiering of files over 64 KB. However, the size threshold in FIG. 5 in block 506 may be files over 1 MB or other threshold—a threshold that is different but within those set by the tiering policy in some examples.

In block 508, the subset of files may be instructed to be tiered. For example, a policy engine described herein may request that the subset of files identified in block 506 may be tiered by a file system. Referring to FIG. 3, the policy engine 326 may utilize API gateway 322 and/or request service 324 to provide one or more requests to the file server 302 (e.g., to request service 310) to tier the identified subset of files. The files may then be tiered by the file server—for example file server 302 may tier the files using tiering engine 314 to move the identified files to a tier of the storage tier(s) 316. The files may be moved out of primary storage to a tier of storage tier(s) 316. In some examples, the tier to move the files to may be included in the requests provided by the analytics system 304. In some examples, truncated copies of the tiered files may remain in primary storage. Note that, in block 508 (or in any earlier block), the policy engine may exclude from tiering instruction and/or evaluation any files that meet exclusion criteria, such as exclusion criteria set and/or provided in accordance with FIG. 4.

In block 510, a next time range may be used. For example, during a next time a policy engine described herein evaluates files for tiering, another time range may be used, and the process of block 504, block 506, and/or block 508 may be repeated. In some examples, consecutive (e.g., adjacent) time ranges may be used in each repetition. The time range used in each repetition may be referred to as a window, and the process of repetition may be referred to as a sliding window. For example, in a first evaluation, files having last access times greater than 2 years may be evaluated for tiering, and a set of largest files in that window may be instructed for filing. In a second evaluation, files having last access times between 1 and 2 years may be evaluated for tiering, and a set of largest files in that window may be instructed for filing. In a next evaluation, files having last access times between 6 months and 1 year may be evaluated for tiering, and a set of largest files in that window may be instructed for filing. Different time windows and different size thresholds and/or ranges may be used during each repetition. The repetitions may continue until a capacity constraint on the primary storage is met (e.g., until a sufficient number of files have been tiered that the capacity available on the primary storage is no longer indicative of tiering). The repetitions may continue in some examples until batches of files from a full-time range of the available time range for tiering have been identified. In some examples, after processing all time windows, the capacity constraints may still not have been met on the primary storage (e.g., the capacity is such that further tiering is indicated). Accordingly, in some examples, policy engines described herein may again perform selections in accordance with the method 502 of FIG. 5 but may repeat evaluation of files in each time window using a lower size threshold in block 506. In this manner, smaller files may be instructed for tiering, but this may occur after the largest files from each time window had already been instructed for tiering.

In some examples, during the process of tiering and/or recalling files, various kinds of failures can be encountered. Examples of failures include remote storage credentials are invalid, low storage space on primary storage, intermittent network failures, and/or timeouts. Other failures may also be encountered. File servers described herein may conduct the tiering and/or recalling of files, such as using tiering engine 314 of file server 302 in FIG. 3 and/or file server 202 in FIG. 2. Accordingly, errors may be reported by file servers and/or tiering engines described herein. The failures may be classified into categories such as—worth retrying, do not retry, and/or critical errors which need debugging/intervention. It is not feasible for a manual administrator to identify the failures and re-select files for tiering and/or recall operations; for example there may be millions of files on the file server. Examples of file analytics systems described herein may identify files which are the subject of tiering and/or recall errors and resends requests to tier and/or recall such files. Identification of the files for which tier/recall operation has failed may be persisted across multiple executions of the tier/recall operation, so that the process does not lose track of such files and selects them again.

Figure 6:
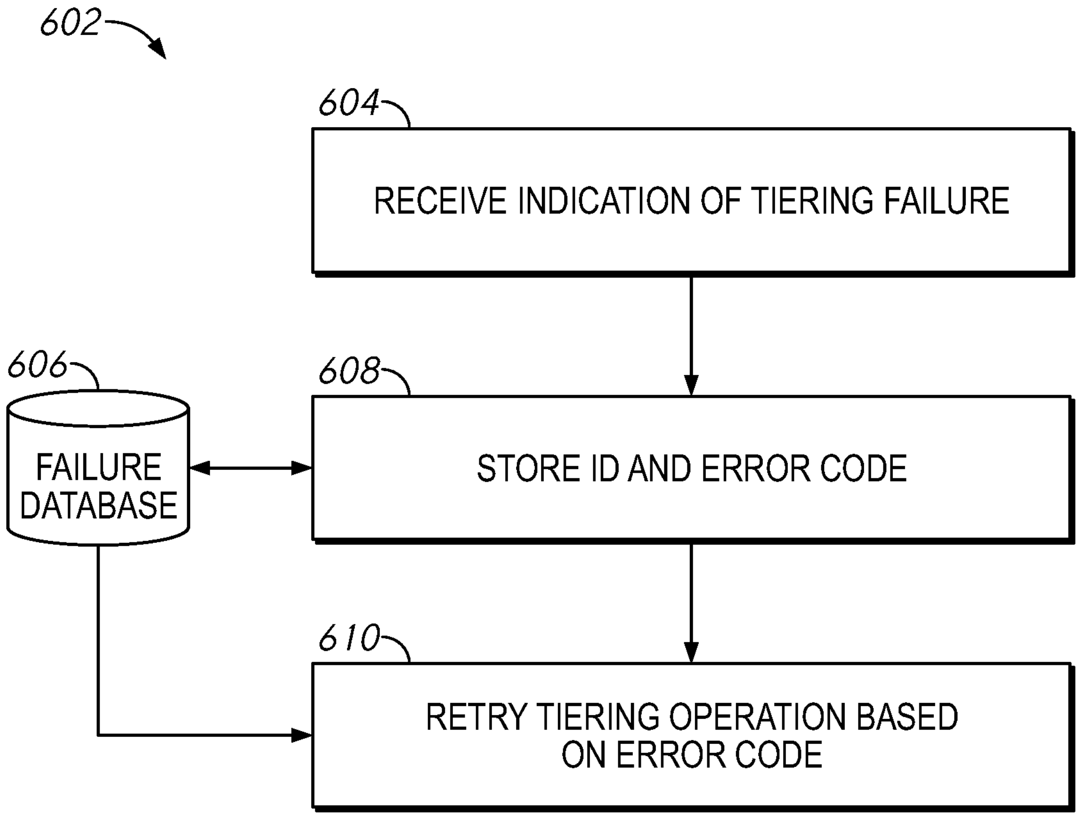
FIG. 6 is a flowchart illustrating an example of an adaptive retry method for tiering and/or recall operations arranged in accordance with examples described herein.

FIG. 6 is a flowchart illustrating an example of an adaptive retry method for tiering and/or recall operations arranged in accordance with examples described herein. The method 602 includes block 604, "receive indication of tiering failure." Block 604 may be followed by block 608, "store ID and error code." The ID and error code may be stored in failure database 606. Block 608 may be followed by block 610, "retry tiering operation based on error code." The operations shown in FIG. 6 are exemplary only. Additional, fewer, and/or different blocks may be used in other examples.

The method 602 of FIG. 6 may be performed by file analytics systems described herein. For example, the analytics system 216 of FIG. 2 or analytics systems 304 of FIG. 3 may be used to implement method 602. For example, the failure database 606 may be implemented using the datastore 226 and/or datastore 320. The policy engine 244 and/or policy engine 326 may perform the method 602, including block 610. In some examples, other components of the analytics system may perform all or portions of the method 602. For example, the event processor 224 and/or event processor 318 may perform block 608 and/or block 604.

Examples of analytics systems described herein may receive indication(s) of tiering failure, such as in block 604 of FIG. 6. Additionally or instead, indication(s) of recall failure may be received. For example, the analytics system 304 of FIG. 3 may request tiering and/or recall of one or more files by file server 302. The file server 302, using tiering engine 314, may attempt to tier and/or recall files in accordance with the requests. Errors may be encountered. The tiering engine 314 may provide an event to the audit framework 306 indicative of tiering and/or recall being complete, or of an error. The event indicative of an error may include an error code or other identification of the error. Tiering and/or recall events may be provided to the analytics system 304, such as to the event processor 318.

Examples of analytics systems described herein may track the progress of tiering and/or recall requests. For example, event data received by the analytics system may indicate that a tiering request (and/or a recall request) is completed or has an error. In block 608, an error code may be stored and associated with an ID of a file which failed to tier and/or failed to recall. In other examples, an indication of tiering and/or recall complete may be stored in association with the ID of the file which tiered and/or was recalled. The indications of tiering and/or recall status may be stored in failure database 606. The failure database 606, for example, may be implemented using datastore 226 of FIG. 2 and/or datastore 320 of FIG. 3. A table or other data structure may associate files with tiering and/or recall status, including error code or other error identifier where an error has occurred.

Example of analytics systems described herein may retry tiering and/or recall operations after failure of an attempted operation. In block 610, a tiering operation may be retried based on the error code. The frequency, timing, and/or schedule of retries may vary based on the error code and/or type of error encountered. In some examples, recall policy engines described herein may select files for tiering and/or recall and may send requests to a file server to tier and/or recall files. The policy engine, such as policy engine 244 and/or policy engine 326, may be implemented using a process that is active at particular times and/or for particular lengths. As an example, a policy engine may be implemented using a process which is active during evenings and/or on weekends. In this manner, tiering and/or recall requests may be received by a file server and serviced during periods where the load on the file server is expected to be relatively light. However, the process may end at the end of the allotted period. Because tiering and/or recall status is stored in failure database 606, however, it may be persisted across different instances of the policy engine process. Accordingly, if the policy engine is implemented using a process that ends on, for example, Sunday afternoon, when the process next runs, for example, starting on a Saturday morning, it may have access to the tiering and/or recall status to initiate retries where appropriate. In some examples, the policy engine may retry any tiering and/or recall operation that is associated with a failed state. To retry the operation, the policy engine may re-send a request to tier and/or recall the file to the file server.

In some examples, the timing, frequency, and/or schedule of the retrying may be based on the error. Some example errors and their associated retry behavior are described herein; however, other errors and retry behaviors may be used in other examples.

In some examples, a tiering and/or recall operation may fail due to one or more intermittent or other network failures. Accordingly, an error code or other identification associated with a network failure may be stored in failure database 606 and associated with the file name or ID that failed to tier or recall. A policy engine, such as policy engine 326, may periodically access the failure database 606 and retry the tiering and/or recall operations that failed due to network failure. A count of a number of retries may be stored in the failure database 606. The policy engine may retry the request a threshold number of times before ceasing to retry the request in some examples. In some examples, the policy engine may wait a predetermined amount of time between retry attempts.

In some examples, a tiering and/or recall operation may fail due to the presence of a sparse file. A sparse file generally refers to a file which has a larger logical file size than the file's actual physical size. For example, an application may request a particular size allotment for a file, but the file may not yet have reached that size. In some examples, tiering engines described herein, such as tiering engine 314, may return an error if requested to tier a sparse file. The error may be returned because it may not be desirable to tier the sparse file due to its small physical size and/or the nature of the sparse file is such that additional accesses are expected, or some other reason. The analytics system may store an indication of the sparse file error and tiering failure in failure database 606. A policy engine may wait a predetermined period of time before initiating a retry of a tiering request associated with a sparse file. For example, the policy engine may not retry the tiering request for files having sparse file errors until a predetermined amount of time has passed (e.g., 2 hours, 2 days, or other time period). In this manner, different error codes may cause the policy engine to retry tiering requests after failure at different time period and/or a different number of times depending on the error code.

Figure 7:
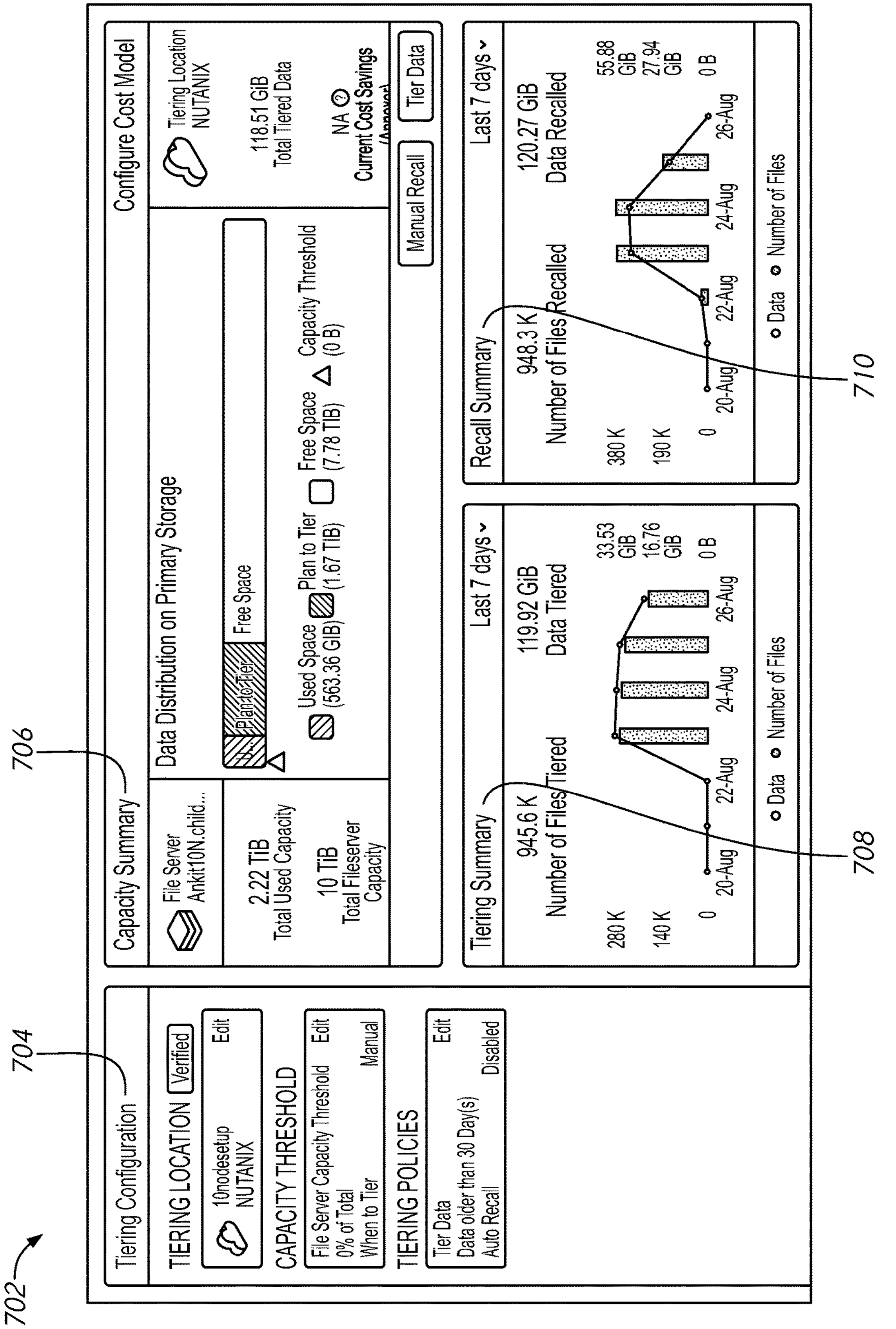
FIG. 7 is a schematic illustration of an example user interface display which may be generated in part by analytics systems described herein.

FIG. 7 is a schematic illustration of an example user interface display which may be generated in part by analytics systems described herein. The user interface 702 may wholly and/or partially implemented using user interface 236 of FIG. 2 and/or user interface 328 of FIG. 3 in some examples. The user interface 702 may include a display of tiering configuration 704, capacity summary 706, tiering summary 708, and/or recall summary 710. The display of FIG. 7 is exemplary only—additional, fewer, or other data may be displayed in other examples.

Examples of user interfaces described herein may display tiering configuration information, such as tiering configuration 704 of FIG. 7. The tiering configuration 704 includes a display of a tiering location (e.g., an identification of secondary storage and/or storage tiers). In the example of FIG. 7, the tiering location is a named NUTANIX server. The tiering configuration 704 further includes a display of capacity threshold. In the example of FIG. 7, the capacity threshold is 0% (e.g., tiering may be initiated regardless of storage capacity); however, other capacity thresholds may be used in other examples, such as described with reference to FIG. 4 and/or FIG. 5. The tiering may be manual and/or automatic, as indicated in tiering configuration 704 and as may be set in a tiering policy by a user or other process. The tiering configuration 704 further includes a display of tiering policies. In the example of FIG. 7, the tiering policy is to tier data older than 30 days. In other examples, other ages may be used and/or last access time may be used in addition to or instead of data age.

Examples of user interfaces described herein may display capacity summaries, such as capacity summary 706. The capacity summary 706 may be a summary of capacity of a file server (e.g., file server 202 of FIG. 2 and/or file server 302 of FIG. 3). In the example of FIG. 7, a name of the file server is shown, as well as total used capacity and total capacity. A graphic is included having a portion indicative of used space on primary storage, storage that is planned for tiering, and free space. The capacity threshold may be depicted as an indicator on the graphic, allowing for a view of where the overall state of tiering is for the system and what capacity savings are planned through tiering. The capacity summary 706 may further include an indication of tiering location (e.g., NUTANIX in FIG. 7), an indication of total tiered data, and in some examples a calculated and/or estimated cost savings achieved through the tiering process.

Examples of user interfaces described herein may display a tiering summary, such as tiering summary 708. The tiering summary 708 provides a graph of total amount of data tiered over time. The tiering summary 708 additionally displays a bar graph of each date or other time interval showing number of files tiered in each time interval. Other depictions of tiering summary may be used in other examples. Note that the amount of data and files tiered (and accordingly displayed by the user interface 702) may be determined in accordance with tiering techniques described herein, including sliding window techniques described with reference to FIG. 5.

Examples of user interfaces described herein may display a recall summary, such as recall summary 710. The recall summary 710 provides a graph of total amount of data recalled over time. The recall summary 710 additionally displays a bar graph of each date or other time interval showing a number of files recalled in each time interval. Other depictions of recall summaries may be used in other examples.

Figure 8:
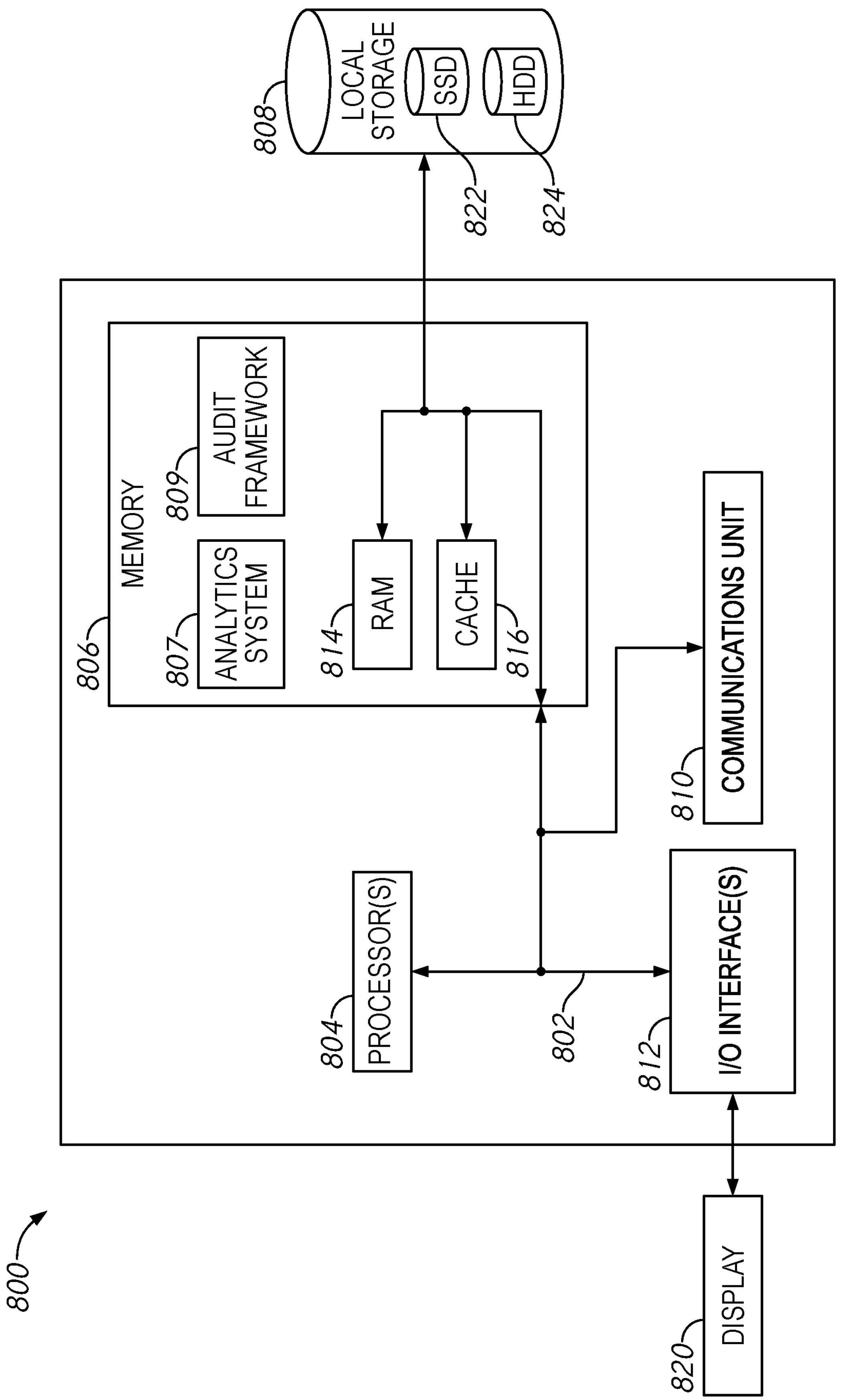
FIG. 8 is a schematic illustration of components of a computing node (e.g., computing device or computing system) in accordance with embodiments of the present disclosure.

FIG. 8 depicts a block diagram of components of a computing node (e.g., computing device or computing system) 800 in accordance with embodiments of the present disclosure. It should be appreciated that FIG. 8 provides only an illustration of one implementation and does not imply any limitations with regard to the environments in which different embodiments may be implemented. Many modifications to the depicted environment may be made. The computing node 800 may be implemented as at least part of the file server 160 of FIG. 1A, file server 202 of FIG. 2, analytics system 216 of FIG. 2, and/or any other computing device and/or system described herein. In some examples, the computing node 800 may be a standalone computing node or part of a cluster of computing nodes configured to host a distributed file server (e.g., any of the file server virtual machines described herein).

The computing node 800 includes a communications fabric 802, which provides communications between one or more processor(s) 804, memory 806, local storage 808, communications unit 810, and I/O interface(s) 812. The communications fabric 802 can be implemented with any architecture designed for passing data and/or control information between processors (such as microprocessors, communications and network processors, etc.), system memory, peripheral devices, and any other hardware components within a system. For example, the communications fabric 802 can be implemented with one or more buses.

The memory 806 and the local storage 808 are computer-readable storage media. In this embodiment, the memory 806 includes random access memory RAM 814 and cache 816. In general, the memory 806 can include any suitable volatile or non-volatile computer-readable storage media. In an embodiment, the local storage 808 includes an SSD 822 and an HDD 824.

Various computer instructions, programs, files, images, etc. may be stored in local storage 808 for execution by one or more of the respective processor(s) 804 via one or more memories of memory 806. In some examples, local storage 808 includes a magnetic HDD 824. Alternatively, or in addition to a magnetic hard disk drive, local storage 808 can include the SSD 822, a semiconductor storage device, a read-only memory (ROM), an erasable programmable read-only memory (EPROM), a flash memory, or any other computer-readable storage media that is capable of storing program instructions or digital information.

The media used by local storage 808 may also be removable. For example, a removable hard drive may be used for local storage 808. Other examples include optical and magnetic disks, thumb drives, and smart cards that are inserted into a drive for transfer onto another computer-readable storage medium that is also part of local storage 808. The local storage may be configured to store executable instructions for an analytics system 807 and/or executable instructions for an audit framework 809. The analytics system 807 may perform operations described with reference to the analytics system 216 and/or analytics system 304 in some examples. The audit framework 809 may perform operations described with reference to the audit framework of the file server 202 of FIG. 2 and/or the audit framework 208 in some examples. In some examples, the memory 806 may be encoded with executable instructions for a query engine 242, policy engine and/or tiering engine as described herein, such as policy engine 244, policy engine 326, and/or tiering engine 314. In some examples, the computing node 800 may host one or more virtual machines and/or containers described herein.

Communications unit 810, in these examples, provides for communications with other data processing systems or devices. In these examples, communications unit 810 includes one or more network interface cards. Communications unit 810 may provide communications through the use of either or both physical and wireless communications links.

I/O interface(s) 812 allows for input and output of data with other devices that may be connected to computing node 800. For example, I/O interface(s) 812 may provide a connection to external device(s) 818 such as a keyboard, a keypad, a touch screen, and/or some other suitable input device. External device(s) 818 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 808 via I/O interface(s) 812. I/O interface (s) 812 also connect to a display 820.

Display 820 provides a mechanism to display data to a user and may be, for example, a computer monitor. In some examples, a GUI associated with the user interface 236 of FIG. 2 and/or user interface 328 of FIG. 3 may be presented on the display 820.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals or communications may be provided directly to and/or received directly from the recited components without intervening components, but also may be provided to and/or received from the certain components through intervening components.

What is claimed is:

1. At least one non-transitory computer readable medium encoded with instructions which, when executed, cause a system to perform operations comprising:

receive a tiering policy, at a virtualized file server, provided by a user, the tiering policy specifying a tiering policy time range for tiering files stored in a file system;

implement the tiering policy based at least on selection identifying one or more of the files associated with the tiering policy time range;

identify a first set of files in the file system having last access times within a first time range, the first time range within the tiering policy time range;

identify a subset of the first set of files based on file size;

request tiering of the subset of the first set of files;

identify a second set of files in the file system having last access times within a second time range, the second time range within the tiering policy time range;

identify a subset of the second set of files based on file size; and request tiering of the subset of the second set of files, after said request tiering of the subset of the first set of files.

2. The non-transitory computer readable medium of claim 1, wherein the first time range and the second time range are adjacent time ranges.

3. The non-transitory computer readable medium of claim 1, wherein said identify the first set of files comprises access a datastore containing information about the first set of files in the file system based on metadata, event data, or combinations thereof, received from the file system.

4. The non-transitory computer readable medium of claim 1, wherein said identify the subset of the first set of files based on file size comprises identify the subset of the first set of files having a file size larger than a threshold file size.

5. The non-transitory computer readable medium of claim 1, wherein said request tiering of the subset of the first set of files comprises sending a tiering request for the subset of first set of files to a file server hosting the file system.

6. The non-transitory computer readable medium of claim 1, wherein the file system is hosted by a distributed file server, and wherein the distributed file server includes a plurality of file server virtual machines, each of the plurality of file server virtual machines providing a single namespace of storage items in the file system.

7. The non-transitory computer readable medium of claim 1, wherein the file system includes a plurality of computing nodes, and wherein storage items of the file system are stored in a storage pool including local storage of the plurality of computing nodes.

8. The non-transitory computer readable medium of claim 1, wherein the first time range and the second time range are within a larger third time range provided by a user as the tiering policy.

9. The non-transitory computer readable medium of claim 1, wherein the operations further comprise:

receive the tiering policy, the tiering policy including at least one factor based on user behavior in the file system;

run a process configured to access a datastore regarding files in the file system and select particular files for tiering based on the tiering policy, and wherein the datastore includes a record of the user behavior in the file system; and request tiering of the particular files.

10. The non-transitory computer readable medium of claim 9, wherein the at least one factor comprises files which have not been accessed by a particular user within a particular third time range.

11. The non-transitory computer readable medium of claim 9, wherein the at least one factor comprises files which have only been read within a particular third time range.

12. The non-transitory computer readable medium of claim 11, wherein the particular files include files whose only user operations during the particular third time range were read operations.

13. The non-transitory computer readable medium of claim 9, wherein the tiering policy further includes at least one factor based on content of files in the file system.

14. The non-transitory computer readable medium of claim 9, wherein the tiering policy includes one or more exclusion criteria.

15. The non-transitory computer readable medium of claim 1, wherein the operations further comprise:

receive an audit event from a file server hosting at least a portion of the file system, the audit event indicative of failure of a requested tiering operation, the audit event including an indication of an error associated with the failure;

store a status of the requested tiering operation in a datastore associated with an identification of a target file of the requested tiering operation;

run a process configured to select files for tiering, wherein the process evaluates information in the datastore regarding files in the file server, and select a target file associated with the failed requested tiering operation; and request tiering of the selected files, including the target file associated with the failed requested tiering operation.

16. The non-transitory computer readable medium of claim 15, wherein the process selects the target file associated with the failed requested tiering operation based on a threshold time after the failure.

17. The non-transitory computer readable medium of claim 16, wherein the threshold time is based on the error.

18. The non-transitory computer readable medium of claim 17, wherein the error comprises network failure, and the threshold time is particular to network failure errors.

19. The non-transitory computer readable medium of claim 17, wherein the error comprises a sparse file error, and the threshold time is particular to sparse file errors.

20. The non-transitory computer readable medium of claim 15, wherein the status of the requested tiering operation is configured to be persistently stored between operations of the process.

21. A method comprising:

receiving a tiering policy, at an analytics system, provided by a user, the tiering policy specifying a tiering policy time range for tiering files stored in a file system;

implementing, at the analytics system, the tiering policy based at least on selection criteria identifying one or more of the files associated with the tiering policy time range;

identifying, at the analytics system, a first set of files in the file system, hosted at least partially by a file server, the first set of files having last access times within a first time range, the first time range within the tiering policy time range;

requesting, by the analytics system, tiering of a subset of the first set of files based on file size;

identifying, at the analytics system, a second set of files in the file system having last access times within a second time range;

requesting, by the analytics system, tiering of a subset of the second set of files based on file size, after said requesting tiering of the subset of the first set of files;

tiering the subset of the first set of files at the file server responsive to said requesting the tiering of the subset of the first set of files; and tiering the subset of the second set of files at the file server responsive to said requesting tiering of the subset of the second set of files.

22. The method of claim 21 further comprising wherein said identifying the first set of files comprises accessing a datastore at the analytics system, the datastore containing information about the first set of files in the file system based on metadata, event data, or combinations thereof, received from the file system.

23. The method of claim 21 wherein the first time range and the second time range are adjacent time ranges.

24. The method of claim 21, further comprising:

accessing a datastore at the analytics system, the datastore including a record of user behavior in the file system;

identifying, based on the datastore, particular files for tiering based on the user behavior in the file system; and requesting the file server tier the particular files.

25. The method of claim 24, wherein the particular files include files whose only user operations during a particular third time range were read operations.

26. The method of claim 21, further comprising:

receiving, at the analytics system, an audit event from the file server, the audit event indicative of failure of a requested tiering operation, the audit event including an indication of an error associated with the failure; and storing a status of the requested tiering operation in a datastore associated with an identification of a target file of the requested tiering operation.

27. The method of claim 26, further comprising:

evaluating information in the datastore of the analytics system regarding files in the file server, and selecting a target file associated with the failed requested tiering operation; and requesting tiering of the selected files, including the target file associated with the failed requested tiering operation.

28. The non-transitory computer readable medium of claim 1, wherein said determine files further comprises:

receive file server statistics; and control a number of tiering instructions responsive, at least in part, of the file server statistics.

29. The non-transitory computer readable medium of claim 28, wherein said control is further responsive to current state of files.

30. The method of claim 21, wherein said determining files further comprises:

receive file server statistics; and controlling a number of tiering instructions responsive, at least in part, of the file server statistics.

31. The method of claim 30, wherein said controlling is further responsive to current state of files.

32. The non-transitory computer readable medium of claim 28, wherein the file server statistics include a network bandwidth, a number of pending tiering requests, or a combination thereof.

33. The method of claim 30, wherein the file server statistics include a network bandwidth, a number of pending tiering requests, or a combination thereof.

* * * * *